Feb. 21, 1967 M. SCHWARTZ 3,305,841

PATTERN GENERATOR

Filed Sept. 30, 1963 20 Sheets-Sheet 1

INVENTOR.
Milton Schwartz
BY Carmil P. Spucens
ATTORNEY

Feb. 21, 1967 M. SCHWARTZ 3,305,841

PATTERN GENERATOR

Filed Sept. 30, 1963 20 Sheets-Sheet 3

Feb. 21, 1967 M. SCHWARTZ 3,305,841

PATTERN GENERATOR

Filed Sept. 30, 1963 20 Sheets-Sheet 5

Feb. 21, 1967 M. SCHWARTZ 3,305,841

PATTERN GENERATOR

Filed Sept. 30, 1963 20 Sheets-Sheet 8

Feb. 21, 1967 M. SCHWARTZ 3,305,841

PATTERN GENERATOR

Filed Sept. 30, 1963 20 Sheets-Sheet 10

Feb. 21, 1967 M. SCHWARTZ 3,305,841

PATTERN GENERATOR

Filed Sept. 30, 1963 20 Sheets-Sheet 14

ELEMENT AREA LOCATOR EAL

Feb. 21, 1967 M. SCHWARTZ 3,305,841

PATTERN GENERATOR

Filed Sept. 30, 1963

20 Sheets-Sheet 15

Feb. 21, 1967 M. SCHWARTZ 3,305,841

PATTERN GENERATOR

Filed Sept. 30, 1963 20 Sheets-Sheet 16

ASSEMBLY REGISTER SWITCH ARS

ASSEMBLY REGISTER AR

Feb. 21, 1967 M. SCHWARTZ 3,305,841

PATTERN GENERATOR

Filed Sept. 30, 1963 20 Sheets-Sheet 17

CONTROL CHARACTER REGISTER CCR

Feb. 21, 1967 M. SCHWARTZ 3,305,841

PATTERN GENERATOR

Filed Sept. 30, 1963 20 Sheets-Sheet 19

CHARACTER GENERATOR CG

United States Patent Office 3,305,841
Patented Feb. 21, 1967

3,305,841
PATTERN GENERATOR

Milton Schwartz, Roslyn Harbor, N.Y., assignor to Alphanumeric Incorporated, Jericho, N.Y., a corporation of Delaware Filed Sept. 30, 1963, Ser. No. 312,405
24 Claims. (Cl. 340—172.5)

This invention is related to pattern generators and more particularly to the generation at a very high speed of high-quality patterns such as characters on an electromagnetic radiation sensitive medium.

Pattern generators have many applications such as display devices, computer output devices, etc. Of these applications the ones which produce the greatest amount of end result output are character generators used in the graphic arts and printing fields. Although these fields are very old the best automated line casting machines available today are electromechanical devices which can produce fifteen to twenty characters per second.

In order to increase the rate of generating characters, there have been attempts to utilize light beams and photosensitive films. Some early approaches were to use the controlled trace of a cathode ray tube which was driven by figure eight bar generators which produced intelligible symbols by appropriate combinations of barlike elements. However, such characters in no way approached the quality of the characters produced by conventional metal type lugs. To produce more shape into the characters, the bar generators were replaced by dot generators which formed characters by the controlled selection of specific dots in a matrix of possible dots. However, this still suffered from poor quality due to the limits of resolution between adjacent dots. Vector generators were also employed to drive the cathode ray tube beams with a slight improvement in quality.

About fifteen years ago a cathode ray tube was introduced which included a stencil of a plurality of characters equivalent to a degenerate type font. The electron beam was first aimed on the region of the stencil having the outline of the character selected for output and further deflection circuits deflected the beam to the desired position on the face of the tube. Although the quality of the output characters greatly improved, only one type font was available per tube. In addition, the circuits and the stencils are relatively expensive.

Other approaches included a multicharacter stencil having controllably ignitable light sources behind each character outline with optical focusing to direct the image to a particular portion of the output media. However, the proposal suffered from all the defects of the cathode ray tube-stencil systems and was even more expensive.

A further approach included the video scanning of a stencil and using the video signal to intensity modulate the beam of a cathode ray tube. Such a system demanded very precisely engraved stencils which are prohibitively expensive to initially fabricate and to reproduce.

The field has tried dispensing with mechanical stencils and has tried using prewired control circuits and magnetic core matrices, one per character, to generate patterns of signals to intensity modulate a cathode ray tube beam. However, the prewired control circuits and core matrices are exorbitantly expensixe when high-quality characters are required.

It is accordingly a general object of the invention to provide an improved pattern generator having none of the disadvantages of the above described systems.

It is another object of the invention to provide an improved character generator which produces high graphic arts quality characters having very fine resolution.

It is another object of the invention to provide a high-speed character generator which is highly versatile.

It is yet another object of the invention to provide a character generator which generates lines of characters selectable from hundreds of styles and sizes.

Generally, the invention contemplates a system for presenting a pattern to an electromagnetic radiation-sensitive medium wherein said pattern includes an area divisible into columnar regions. The area has a first visual state such as but not limited to the color white, and has included thereon an array of linear portions of a second visual state such as but not limited to the color black. Apparatus is provided for storing a coded representation of the character as a plurality of coded combinations of indicia wherein at least one of each of the coded combinations of indicia is respectively associated with one of the columnar regions. Each of the coded combinations of indicia includes at least a first coded group of indicia for indicating where in the associated columnar region a column segment having the second visual state begins and at least a second coded group of indicia for indicating the columnar extent of the column segment. Electromagnetic radiation source means scans in a sequential columnar manner the electromagnetic radiation sensitive medium. Means are responsive to the first coded groups of indicia for energizing the electromagnetic radiation source means, and means are responsive to the second coded groups of indicia for deenergizing the electromagnetic radiation source means during each columnar scan.

A feature of the invention is the means for generating a line of characters with proportional spacing.

A further feature of the invention is means for selecting the characters from a plurality of type fonts.

Other objects, features and advantages of the invention will be apparent from the following detailed description of the invention when read with the following drawings wherein.

Figure 2:
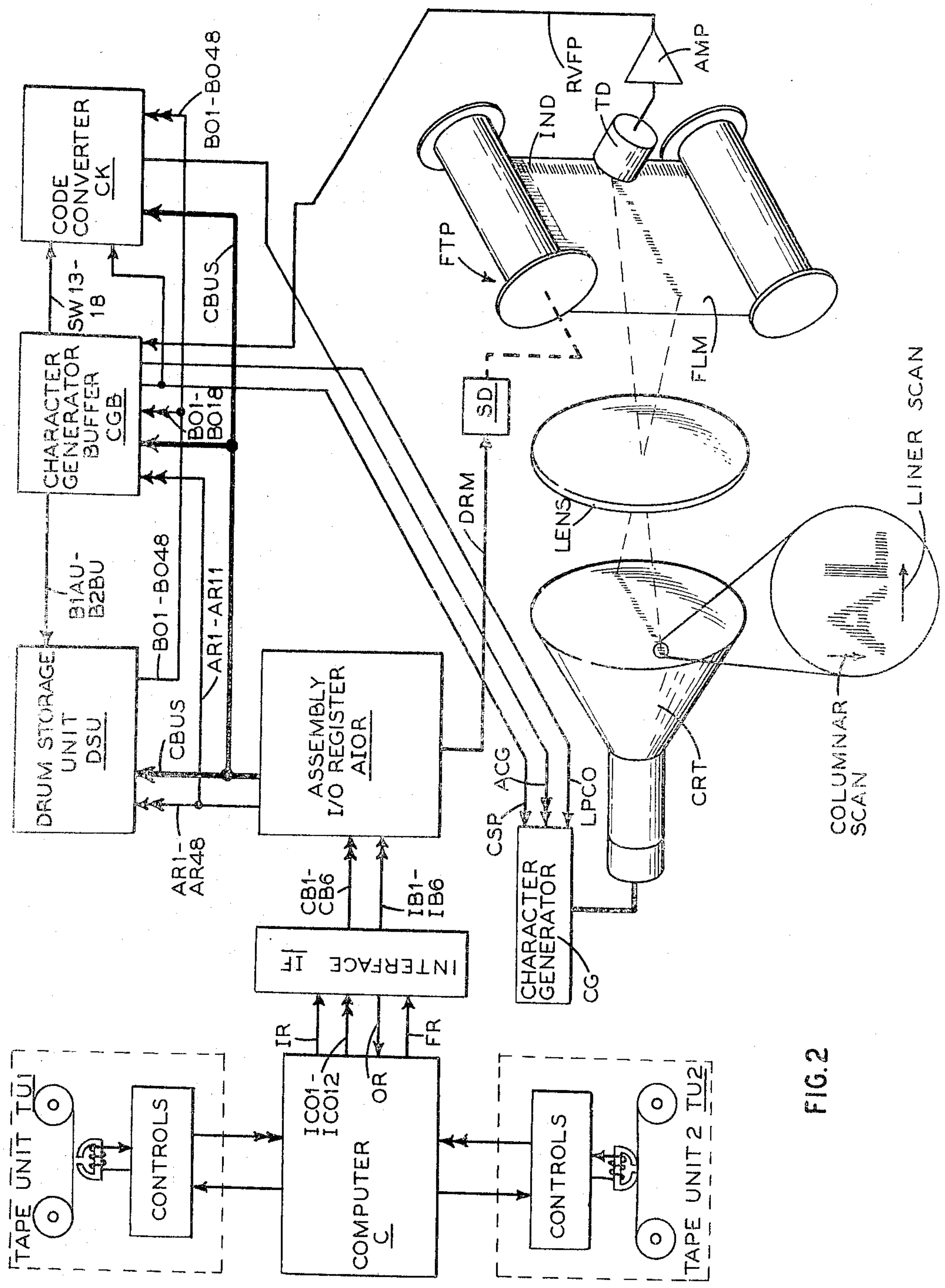
FIGURE 2 shows a block diagram representation of a system for generating characters on an electromagnetic radiation sensitive medium.
Figure 16:
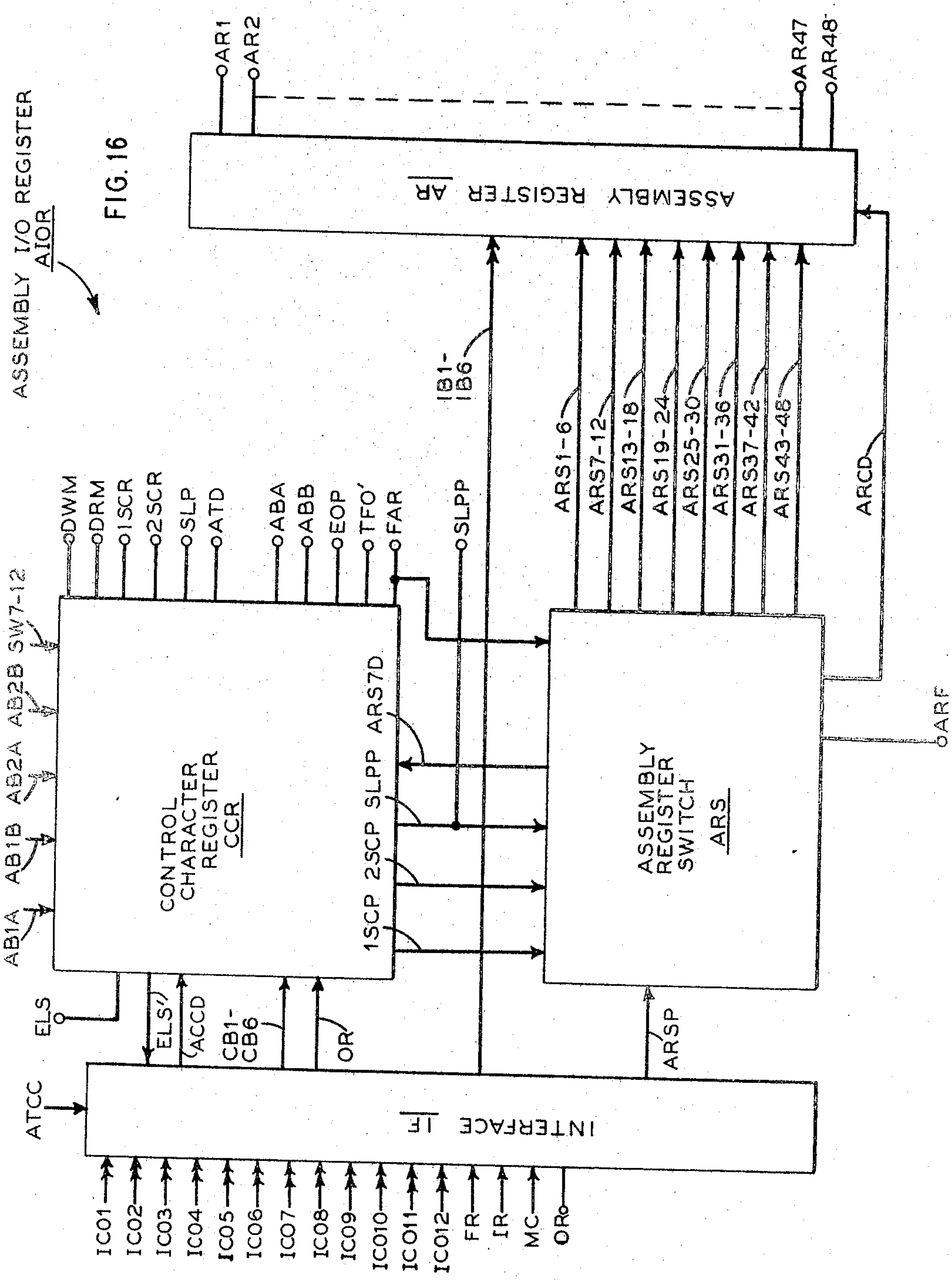
FIGURE 16 is a block diagram of the assembly I/O register of FIGURE 2.
Figure 19:
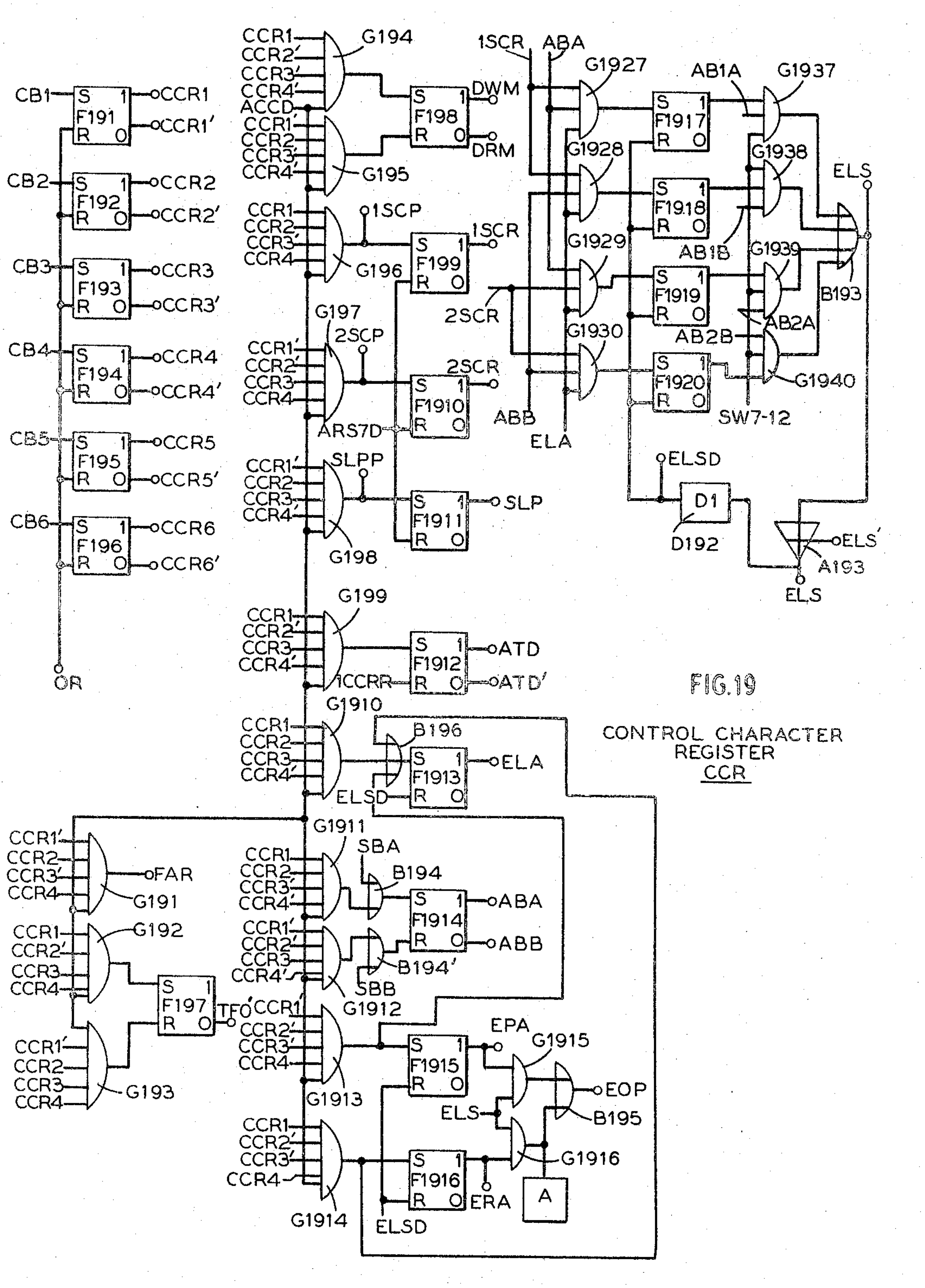
Figure 20:
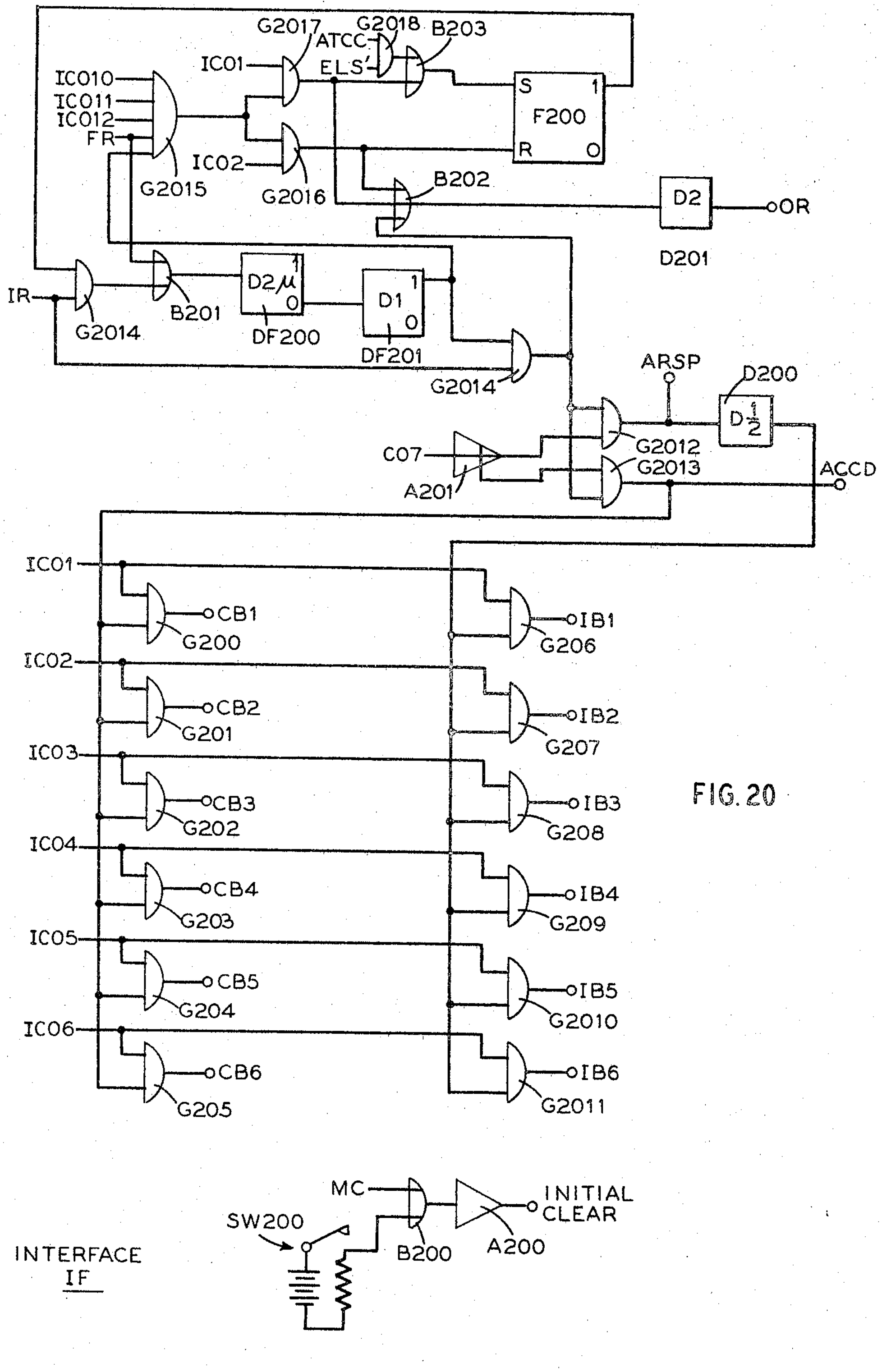
Figure 21:
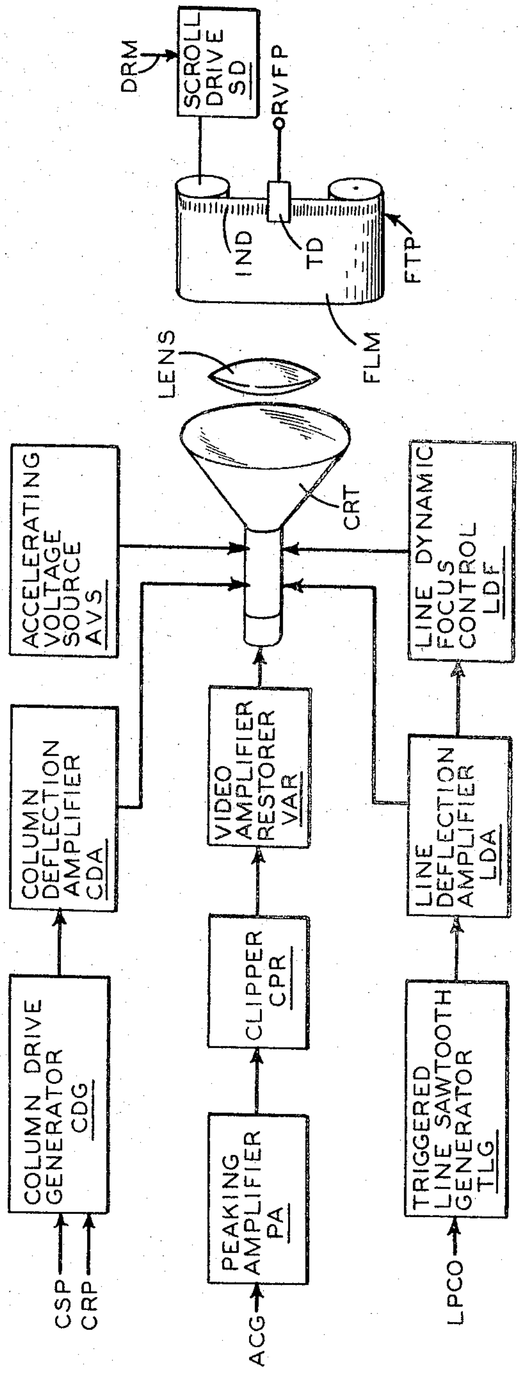

FIGURE 19 logically shows the control character register of the assembly I/O register of FIGURE 16;

FIGURE 20 logically shows the interface of FIGURE 16;

FIGURE 21 is a block diagram of the character generator of FIGURE 2; and

Figure 22:
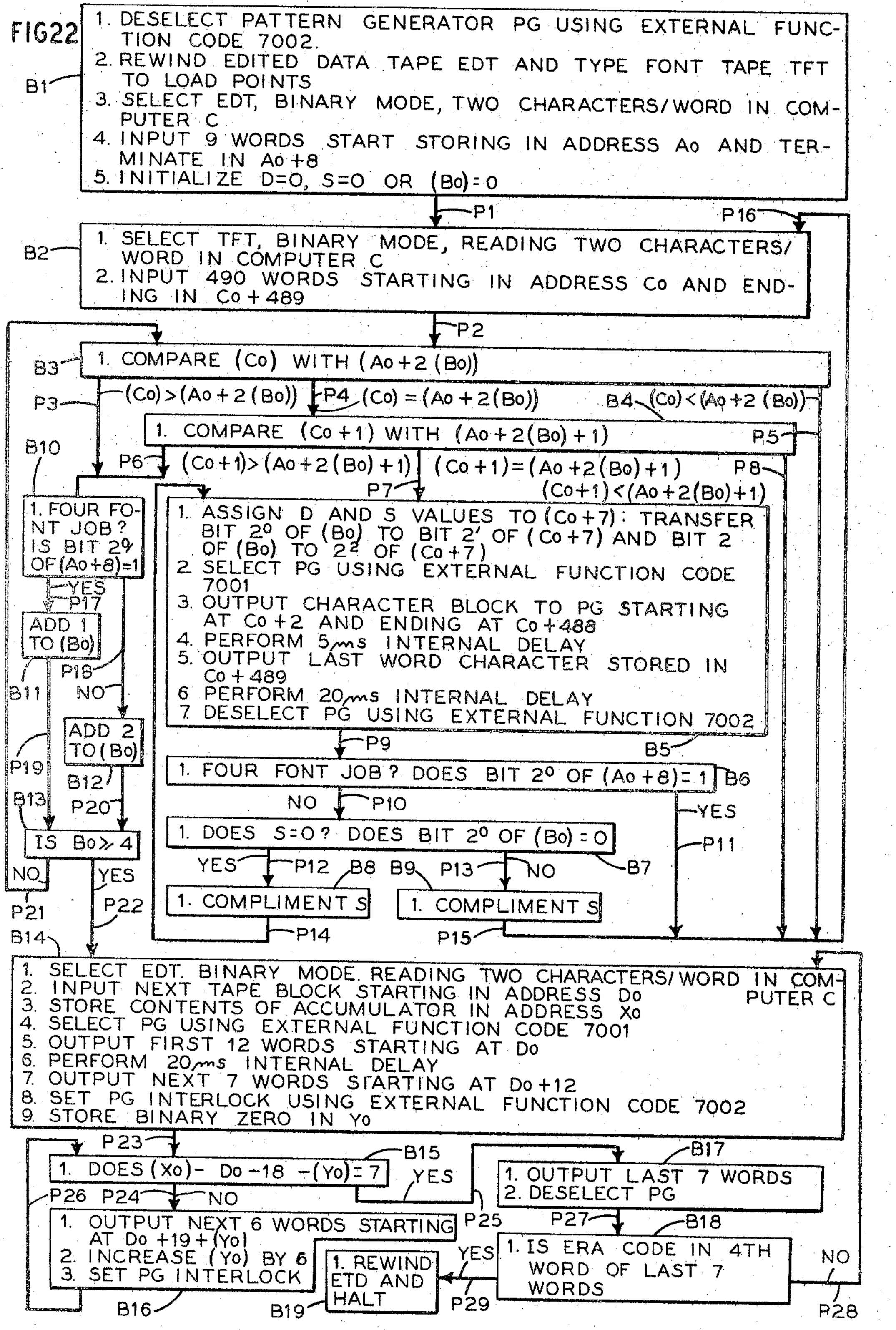

FIGURE 22 is a flow chart of a program used by the computer of FIGURE 2.

*Introduction*

In general, the photoprinter or photo typesetter will generate a line of characters at a time wherein the characters are serially generated along the line. When one line is completely generated, the photoprinter can start generating the next line of characters. The lines of characters will, in being generated, energize a light source which creates visual representations of the characters for exposure onto a light sensitive medium such as a photographic film. The film thereafter can be used as a negative for creating printing plates. Therefore, each character will be recorded on an area of one visual state such as one color and the character itself will comprise line portions in a second visual state such as a contrasting color.

Not only are the characters generated serially along a line, but each of the actual characters are generated by a plurality of serially generated columns of elements.

Figure 1:
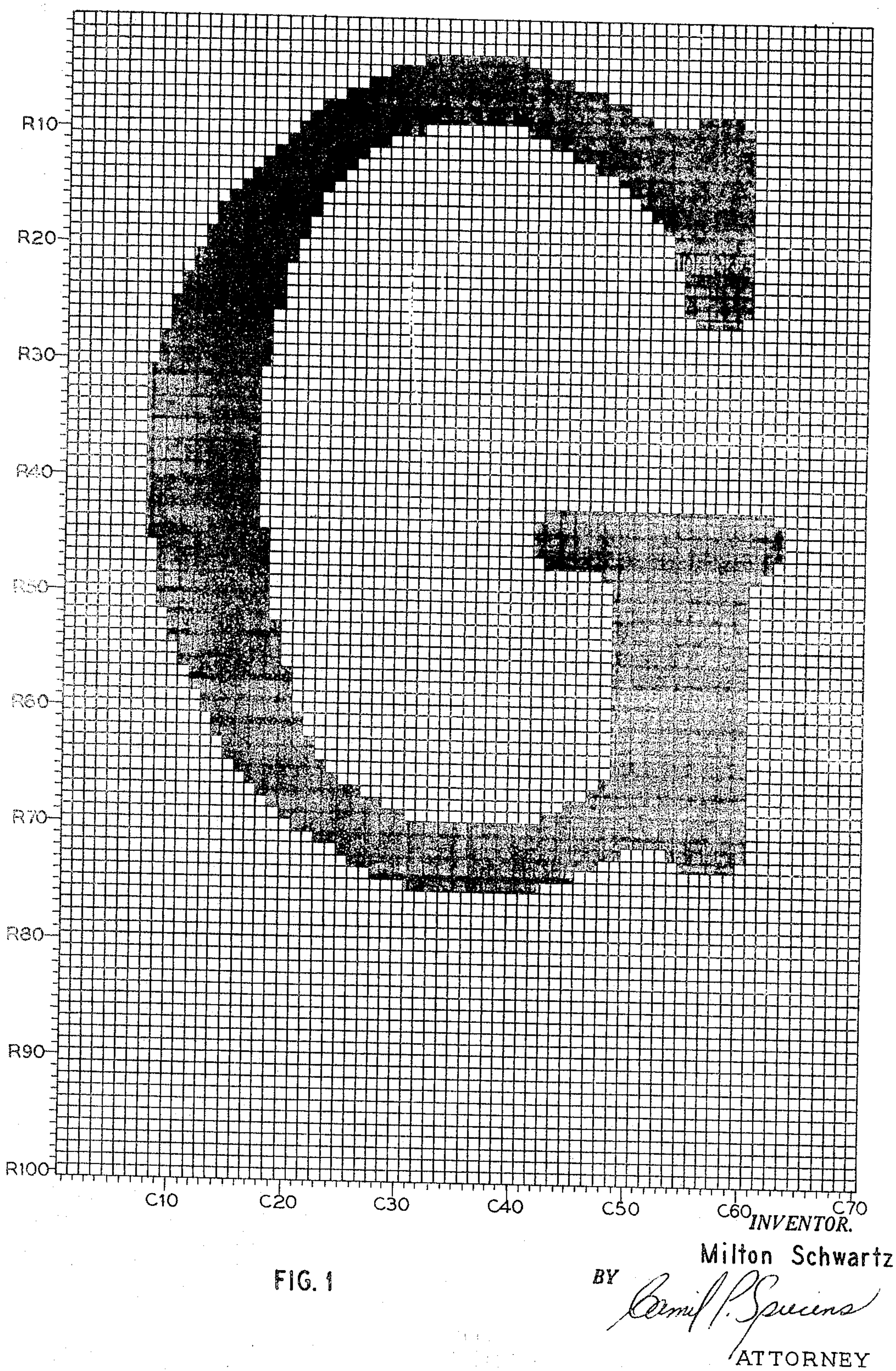
FIGURE 1 shows in detail a character superimposed on a coordinate system for explaining the invention.

FIGURE 1 shows a character slug which comprises a matrix of one hundred rows and seventy columns of elements. Each character (a unit of type) that is recorded will fit within such a character slug; however, not every chaarcter of the same or similar type font that is recorded will have maximum row and column dimensions which approach the overall dimensions of a character slug. Wide characters such as M and W will be represented by the elements of a character slug having more columns of elements than a narrow character such as I or 1. Therefore, the width of each character slug varies with each character it represents so as to allow proportional spacing of the characters along a line. Similarly, the number of rows of elements in each character represented by a character slug will vary. The first control on the number of rows of elements in a character slug is the actual type size. For example, 12 point type will on the average utilize twice as many rows of elements as 6 point type. Of course, type size will have the same influence on the number of columns of elements. In addition, within a type font (a set of all units of type of the same style and point size including capital and small letters, digits and symbols) the number of rows of elements utilized varies from character to character. However, each such character slug will have the hundred rows of elements and the character will occupy the appropriate vertical position within the slug. For example, a small or lower case g will underhang a capital or upper case G. Therefore, it is seen that a character slug will comprise one hundred rows of elements and a variable number of columns of elements dependent on the width of the character.

FIGURE 1 shows by way of example a greatly enlarged version of a 12 point upper case G. This character will now be analyzed. It is seen that it occupies the region between columns C8 and C63, and between rows R4 and R75. However, it should be noted that columns C5, C6 and C7 are blank. Similarly, columns C64, C65 and C66 are blank. These columns are space columns to the left and right of the pattern columns C7 to C63 inclusive. A pattern column is a column of the character slug which includes at least one "black" element. Accordingly, the columns defining the 12 point G include three blank columns followed by 56 pattern columns followed by three blank columns.

Now consider typical pattern columns. Column C8 scanned from top to bottom comprises an area of "white" extending from row R1 to row R30, an area of black extending from row R31 to row R45, and an area of white from row R46 to row R100. Column C34 comprises a first area of white extending from row R1 to row R3, a first area of black extending from row R4 to row R9, a second area of white extending from row R10 to row R69, a second area of black extending from row R70 to row R75, and a third area of white extending from row R76 to row R100. Column C44 has three areas of black interspersed between four areas of white. If any area of black within a pattern column is defined as a column segment, it is seen that each pattern column includes at least one column segment. In fact, it has been found that the majority of available type font styles have characters which comprise no more than four column segments.

From the above analysis of the pattern columns it is possible to define a method of defining the pattern within the column. In particular, it is only necessary to indicate the starting row of an area of black of column segment and to indicate the length in rows of the column segment. Accordingly, the pattern in column C7 can be defined as a column segment starting at row R31 and extending for fifteen rows. Similarly, the pattern of column C34 can be defined as: a first column segment starting at row R4 and extending six rows, and a second column segment starting at row R70 and extending six rows. The pattern of column C44 would be similarly defined. Therefore, any pattern column can be defined with four groups of two units of information, wherein the first unit indicates an element address (the row at which the column segment starts) and an element area (the length of the column segment).

It has been found convenient to assign a seven-bit binary number to an element address and a five-bit binary number to an element area. Therefore, each pattern column will be defined as four groups each comprising a seven-bit number and a five-bit number. The so-arranged forty-eight bits is called a pattern blockette. It should be noted that, if a pattern colunm includes less than four column segments, the unrequired element address portions of a pattern blockette will always be assigned a number such as binary zero. It should also be noted that the element length is defined by a five-digit binary number; therefore, if the column segment is greater than sixty-three elements in length, it will be necessary to consider the column segment as two adjacent or abutting column segments and the extra large segment will be defined as two column segments in the pattern blockette. Accordingly, the pattern portion of the character slug can be defined by a plurality of pattern blockettes.

However, it should be recalled that a column slug included both pattern columns and blank columns on either side of the pattern column. Therefore, to completely define the character slug, all the columns and their relation to each other must be defined. Accordingly, there is established a format blockette comprising three six-bit binary numbers. The first of these numbers indicates the number of blank columns on one side of the character slug; the second of these numbers indicates the number of blank columns on the other side of the character slug; and the third of these numbers indicates the number of pattern columns in the character slug. It should be noted by making at least the third of these numbers equal to zero, a space character slug can be defined.

Therefore, any character slug can be defined by a format blockette and a plurality of pattern blockettes, hereafter called a character block. Ninety different character blocks comprise a type font wherein each character block represents a different unit of type such as upper or lower case alphabetic characters, decimal digits and symbols. Since there are ninety different character blocks to a type font, each different character block can be represented by a nine-bit binary word called a character code. Although only a seven-bit binary word would be needed to represent the character block, nine bits are used by virtue of the mode of the working storage for the type fonts.

During a type setting operation, up to four type fonts are stored on a magnetic drum in two bands with two sectors to each band. Therefore, one of the two extra bits is used to select a band and the other may be used to select a sector. The seven remaining bits of the character code are used to select the actual character block. For simplicity, the same character in each type font has the same combination of seven bits to represent it.

In the back-up storage of all the type fonts, called a type font tape, the type fonts are stored serially and each character slug or character block is preceded by a header block bearing an identification as to style and size.

*Description of the system*

In the description of the system the following conventions will be employed:

(1) Each signal line has a reference character equal to the signal designation; i.e., the CB1 signal line carries the CB1 signal;

(2) Quite often, simultaneous with the generation of a signal, its inverse is generated; i.e., the CMP and CMP′ signals are simultaneously generated. Generally only the signal itself will be mentioned but it should be understood that its inverse is also implied. In particular, with respect to the block diagrams only one signal line is usually shown. However, that signal line can often be considered as a two-lead cable, one lead carrying the signal and the other its inverse. In the logical diagrams the actual phase of the signals and their inverses is unambiguously shown. It should be noted that when a signal is generated it is considered present and equivalent to logical 1 or +, its inverse however, even though it is being generated, is considered absent and equivalent to logical 0 or —. On the other hand, when a signal is not being generated it is considered absent and equivalent to logical 0 or —, its inverse however, at that time is considered present and equivalent to logical 1 or +. In short, the presence of a signal implies the absence of its inverse; and vice versa;

(3) Words are transferred through the system with their bits in parallel. For example, an information word is transferred from the interface IF on the IB1, IB2, . . ., IB6 signal lines. However, to simplify the block diagrams these six signal lines are generalized into a single line labeled IB1–IB6 which implies a cable of at least six signal lines. From the range of the numbers in the reference character it is immediately known what the minimum number of signal lines are in the cable;

(4) Information signal lines are shown by double arrow-headed lines and control signal lines by single arrow-headed lines;

(5) The signals transmitted throughout the system fall into two classes:

(a) pulses such as the CP pulses of short duration, and (b) signals such as DWM signal of long duration, generally generated by a bistable device;

(6) Throughout the description terminology such as "words or digits are transferred" is employed; it should be understood that binary coded combinations of signals representing the words or digits are actually transferred;

(7) Terminology such as "setting a flip-flop" means switching or triggering it to its on or 1 state wherein it generates a signal such as 1SCR; and "unsetting a flip-flop" means switching it to its off or 0 state wherein it generates a signal such as 1SCR′;

(8) Generally, terminology such as "signals cooperate with other signals" to produce another signal or to change the state of a flip implies an "and" or coincidence function.

*General system description*

The system includes a general purpose computer C with a core memory and operates as an overall control unit to which is connected: a tape unit 1 carrying a type font tape; a tape unit 2 carrying an edited data tape; and a pattern generator. The type font tape has recorded thereon in blocks, representations of all the possible type font character blocks according to size and style which may be used on a job and control and information words whereby the pattern generator can store the character blocks in the magnetic drum in the drum storage unit DSU. The edited data tape has recorded thereon information for indicating the type fonts to be employed on a job, the character codes of the characters to be generated interpersed with control words which indicate the beginning and end of lines of characters that are generated, and other control words which control the sequence of operation of the pattern generator. The pattern generator includes: an interface IF which controls the flow of information and control words (data words) between the computer C and the pattern generator; an assembly I/O register AIOR which includes means for generating control signals in response to received control words and an assembly register and related switch for assembling information words received from the computer C into formats appropriate for transfer to other units of the pattern generator; a drum storage unit DSU which includes a working storage in the form of a magnetic drum having two bands with two sectors for storing the character block representations of the type fonts required for a given job, and buffer storages of character block capacity for providing a buffering means between the magnetic drum and other units of the system; the character generator buffer CGB which controls the generating of column scans by locating the required line positions and column positions in response to line position codes and format blockettes; the code converter CK which converts the pattern blockettes into signals for driving the cathode ray tube of the character generator CG; and the character generator CG which includes a film transport for moving photosensitive film past the face of a cathode ray tube and sprocketing means for indicating line positions along the film.

The computer C, after initial clearing, reads into its core memory the first tape block from the edited data tape on tape unit 2, TU2, which indicates the type fonts to be used and the number of type fonts (2 or 4) for the job. The computer C then searches for the first of the indicated type fonts by reading into the core memory from tape unit 1, TU1, tape blocks, one at a time and determining whether the read in tape block contains the desired type font. When the desired type font is located, the computer C enters into a routine to transfer the type font, a character block at a time, via its core memory to either one sector of one band (for 4 fonts to be stored) or two sectors of one band (for 2 fonts to be stored) of the magnetic drum working storage in the drum storage unit DSU.

The computer C transmits an external function word as a coded combination of ICO1 to ICO12 signals with an FR signal to interface IF selecting the pattern generator as its output. This is followed by the sequential transmission of data words as coded combinations of ICO1 to ICO6 signals with associated IR signals to the interface IF for transmission as control words coded combinations of CB1 to CB6 signals to the assembly I/O register AIOR where they are decoded to become control signals fed via control bus CBUS to the various units of the pattern generator. It should be noted that receipt of each external function word and each data word is acknowledged by the interface IF by feeding an OR signal to the computer C. The control signals are a DWM signal which indicates the magnetic drum is to be loaded with character blocks, a TFO′ signal if only two type fonts are to be used, an ABA signal, a 1SCR signal and an FAR signal all fed from the assembly I/O register AIOR to the drum storage unit DSU via the control bus CBUS to prime it for receiving the first character block of the selected type font for recording on the magnetic drum.

The computer C then sequentially transmits first 2 then 480 data words as coded combinations of the ICO1 to ICO6 signals along with IR and ICO7 signals to the interface IF which sequentially transmits the first 2 then the 480 information words as coded combinations of IB1 to IB6 signals to the assembly I/O register AIOR. The 2 first data words are assembled into a 9-bit character code and then transferred via the AR1 to AR9 signal lines to a character code register CCR1 in the drum storage unit DSU. Then, each eight sequentially received information words from the 480 are assembled into a 48-bit character blockette and transferred via the AR1 to AR48 signal lines to a buffer storage in the drum storage unit DSU. The character code in the character code register CCR1 indicates the address on the magnetic drum where the character block is to be stored. The computer C then waits 5 milliseconds and transmits a data word (control word) which when decoded in the assembly I/O register AIOR results in the transmission of an ATD signal via the control bus CBUS to the drum storage unit DSU. The computer C then waits 20 milliseconds while the storage register on the magnetic drum is located and the character block stored therein.

During the 20 milliseconds the computer C first transmits an external function word to interface IF when disconnects the pattern generator from the computer C and then reads into its core memory the next tape block on the type font tape, i.e., the next character block. After 20 milliseconds the interface IF receives an external function word which connects the computer C to the pattern generator. Four hundred eighty information words are again transferred to the assmbly I/O register AIOR where they are assembled into 48-bit character blockettes which are again sequentially fed to the buffer storage in the drum storage unit DSU for loading in the indicated storage register in the usual manner. This process continues until the ninety character blocks representing the selected type font are loaded on the indicated sector and band of the magnetic drum.

The computer C then searches the type font tape for the second desired type font and when found, loads it on a different sector-band combination of the magnetic drum in the same manner as the first selected type font. After the four type fonts have been loaded in this manner, the computer C reads in the second tape block on the edited data tape of tape unit 2, TU2, which will result in the recording on the film FLM of the first line of characters.

The computer C first transmits an external function word to the interface IF for selecting the pattern generator as the output unit; and then transmits several data words via the ICO1 to ICO6 lines to the interface IF which transmits these data words as control words via the CB1 to CB6 lines to the assembly I/O register AIOR which starts generating, the DRM signal characteristic of pattern recording on the film FLM, and ABA signal allowing the A buffer storages in the DSU to be loaded from the drum, and a TFO′ signal, is only two fonts will be used.

The DRM signal is transmitted particularly to the scroll drive SD causing the film FLM to start moving past the face of the cathode ray tube CRT. As the film FLM moves, the transducer TD converts "sprocket" indicia IND disposed on its edge to RVFP pulses which are counted in the character generator buffer CGB to indicate the vertical position of the film FLM.

The computer C then transmits sequentially three data words which are converted in the assembly I/O register AIOR into an SLP control signal and a coded combination or AR1 to AR11 signals that are fed to the character generator buffer CGB where under the control of the SLP signal received via the control bus CBUS the AR1 to AR11 signals representing the address on the film FLM where the line is to be recorded enter a register and line location begins by comparing the count of the RVFP pulses with the address stored in the register.

The computer C, generally, then transmits serially six data words to the interface IF. The first data word is fed via the CB1 to CB6 signal lines as a control word to the assembly I/O register AIOR which generates a 1SCR signal fed to the drum storage unit DSU to alert a first character code register to receive the character code of a desired character block. The next two data words are transmitted by the interface IF as information words to the assembly I/O register AIOR where they are assembled as a coded combination of AR1 to AR9 signals representing the character code of the desired character block. The character code enters the first character code register of the drum storage unit DSU under control of the 1SCR signal. The fourth data word results in the transmission of a 2SCR signal from the assembly I/O register AIOR to the drug storage unit DSU via the control bus CBUS for alterting a second character code register therein. The fifth and sixth data words are assembled in the assembly I/O register AIOR into another coded combination of AR1 to AR9 signals representing the character code for the next desired character block which are fed into the second character code register under the control of the 2SCR signal in the drum storage unit DSU.

The computer C waits 20 milliseconds and then transmits a data word which is fed via the CB1 to CB6 signal lines as a control word to the assembly I/O register AIOR which generates an ABB signal fed to the drum storage unit DSU to allow the B buffer storages in the DSU to be loaded from the drum. The computer C then transmits six more data words like the six above to select the next two desired character blocks. During the 20 milliseconds wait, the storage registers on the magnetic drum containing the first two character blocks are located and their contents are loaded into a first pair of buffer storages.

When the next six data words are operated on the result is the storage of the character codes of the next two character blocks in the first and second character code registers. The storage registers on the magnetic drum represented by these two character codes are located and their contents loaded into a second pair of buffer storages. When the film FLM has moved to the position where the first line is to be recorded as represented by the count of RVFP pulses being equal to the line address, the character blocks stored in the first pair of buffer storages are sequentially read out; and when the contents of both buffer storages have been read out, the interface IF will indicate to the computer C that it can transmit six more data words associated with the next two desired character blocks which will be handled like the other groups of six data words.

The read out of one of the character blocks from its buffer storage to the ultimate generation of a character will now be described. When the line is located, the character generator buffer CGB starts generating an LPCO signal which is fed to the character generator CG to initiate a horizontal or linear scan of the electron beam of the cathode ray tube CRT and also to allow CSP pulses which will cause vertical or columnar scans of the electron beam.

When the first buffer storage of the first pair is to be unloaded, a B1AU pulse is fed to the drum storage unit DSU causing the read out of the format blockette of the first character block via the BO1 to BO18 signal lines to the character generator buffer CGB which starts counting the number of column scans indicated by the first six bits of this format blockette. During this time CSP pulses are generated and counted and the appropriate number of blank columnar scans are performed in the cathode ray tube CRT equal to the number of blank columns on one side of the column slug represented by the character block. When this count is attained, the character generator buffer CGB starts transmitting the SW13–18 signal to the code converter CK to open a pattern blockette storage register therein. For each CSP pulse during the presence of the SW13–18 signal the character generator buffer CGB transmits a B1AU pulse to the drum storage unit DSU which in response thereto transmits from the selected buffer storage a pattern blockette via the BO1 to BO48 signal lines to the code converter CK.

The code converter CK starts counting row elements to locate the start of a column segment as indicated by the pattern blockette. When the indicated row element is reached the code converter CK starts transmitting the ACG signal to the character generator CG which turns on the electron beam of the cathode ray tube CRT. When the code converter CK then reaches a count of row elements equal to the length of the column segment indicated by the pattern blockette, the ACG signal terminates and the electron beam is turned off. The other column segments (up to a total of four) represented by the column blockette are generated in the same manner. When the column is completely scanned another CSP is generated which starts the scan of the next pattern column and the next pattern blockete is read out in response to another B1AU pulse in the usual manner.

The character generator buffer CBG maintains a count of the generated pattern columns and when this count equals the number represented by the next six bit group in the format blockette stored therein, it stops generating the SW13–18 signal and the B1AU pulses but still generates CSP pulses which are used to generate the blank columns on the other side of the character slug. When the appropriate number of blank columns are generated, the character block stored in the second buffer storage of the first pair will be read out in the same manner but under the control of the B2AU pulses. The character blocks in the second pair of buffer storages are read out under control of the B1BU and B2BU pulses respectively. It should be noted that, as the character blocks in one pair of buffer storages are being read out, the computer C is transmitting character codes and associated control words which cause the other pair of buffer storages to be reloaded with character blocks from the magnetic drum. Interlock means hereinafter described insure that the computer C, after transmitting the first four character codes, will transmit pairs of character codes only in response to an OR signal from interface IF.

The operation continues until the end of the line is reached. At that time, the computer C transmits an end of line data word on the ICO1 to ICO6 signal lines which is fed to the assembly I/O register A1OR via the CB1 to CB6 signal lines as a control word by the interface IF. The assembly I/O register A1OR generates an ELS signal which when fed via the control bus CBUS to the character generator buffer CGB terminates the LPCO signal initiating the retrace of the horizontal scan in the cathode ray tube CRT and terminates the generation of the CSP pulses. The computer C deselects the pattern generator, selects the tape unit 2TU2 and reads in the second tape block on the edited data tape containing all the information for generating the next line of characters.

This procedure continues until at the end of a line, the end of line data word is substituted by an end of page data word. The end of page data word causes the same operations as an end of line data word but also causes the generation of an EOP signal by the assembly I/O register A1OR which is fed to the character generator buffer CGB to clear the counter that had been counting RVFP pulses preparatory to lining up a new page on the film FLM. The last possible case is when the end of the job is reached. In this case the end of line data word is substituted by an end of run data word which has the same effect as the end of page data word with the additional step of halting the computer C and triggering an alarm to announce the end of the job.

It should be noted that the operation has been described with respect to the major controls. However, many minor controls are intermingled with major controls and these are described hereinafter with the specific descriptions of the blocks of FIGURE 2.

*Overall description of drum storage unit—DSU*

Figure 3:
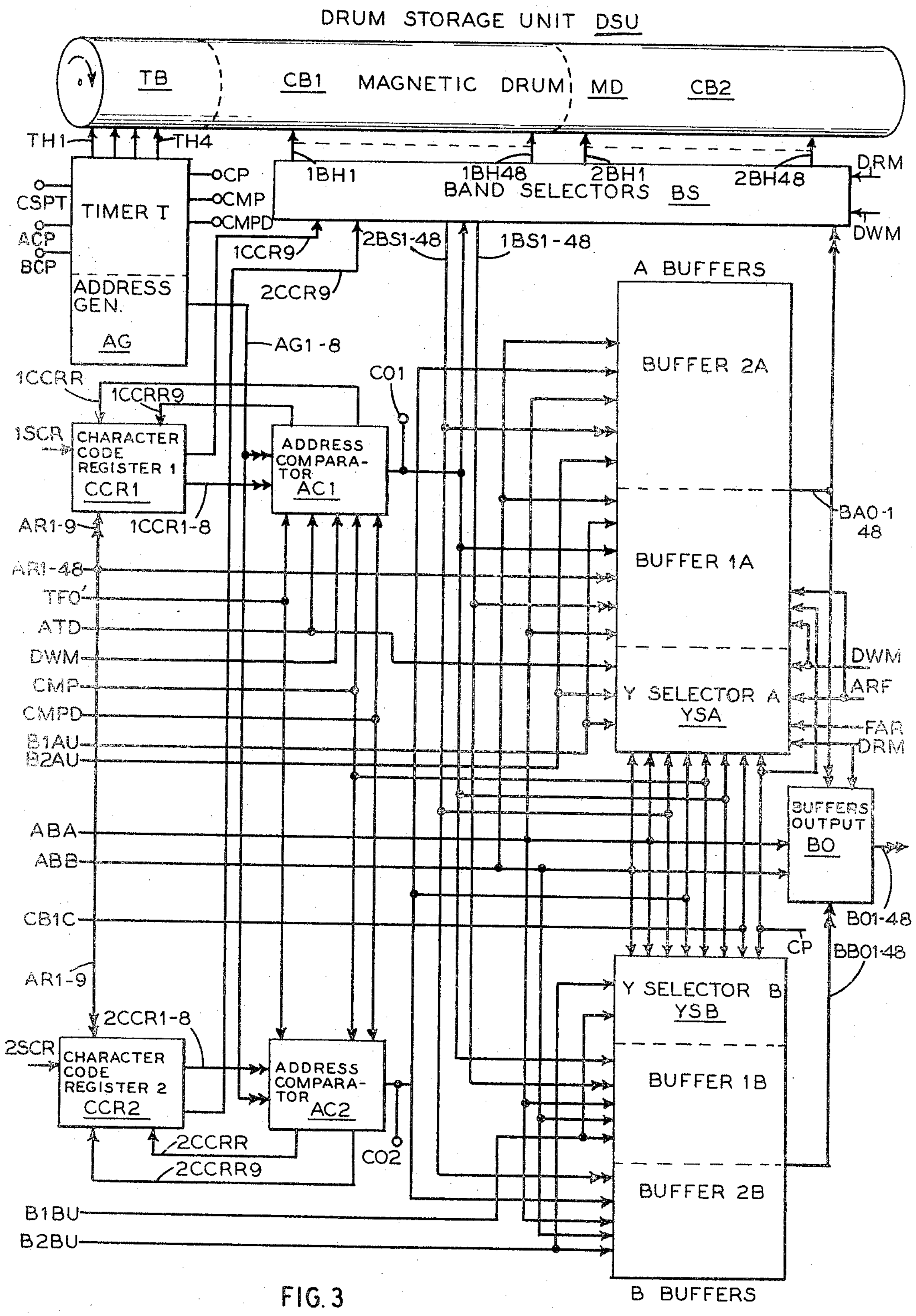
FIGURE 3 shows in block diagram form the drum storage unit of the invention.

The drum storage unit DSU shown in FIGURE 3 includes a rotating magnetic member shown as magnetic drum MD. Magnetic drum MD is divided into three bands, a timing band TB, a first character band CB1 and a second character band CB2. The timing band TB has a first track read-write head TH1. On this first timing track are recorded equally spaced clock pulses. The second track of the timing band includes for the sake of simplicity equally spaced character mark pulses occurring every sixtieth clock pulse indicating the locations of storage registers wherein character blocks are stored. A third track opposite the magnetic head TH3 carries a single pulse used to indicate the start of the first half or sector A of the magnetic drum MD. The fourth track includes a single pulse one hundred eighty mechanical degrees from the pulse on the third track to indicate the start of the second half of the magnetic drum or sector B.

The band CB1 includes forty-eight tracks disposed opposite forty-eight magnetic read-write heads 1BH1 to 1BH48 to permit the parallel reading or parallel writing of the forty-eight bit pattern blockettes which are used to generate the pattern of column elements for one column of a character and also the format blockette. Similarly, the band CB2 includes forty-eight tracks opposite forty-eight magnetic read-write heads 2BH1 to 2BH48 which also permit the parallel reading or parallel writing of the forty-eight bit character blockettes and the format blockette.

The timer T includes amplifying means coupled to the read-write head TH1 to amplify and shape the raw clock pulse signals and to generate the CP signals therefrom. Similarly, it includes amplifying means coupled to the read-write head TH2 to amplify and shape the character mark pulses received and to transmit them as the CMP, CMP′ and CMPD signals respectively, that is, each of the raw character mark pulses will cause the generation of the three aforesaid pulses. Similarly, amplifying means receives the A sector pulse and transmits it as an ACP pulse; likewise the B sector pulse is transmitted as a BCP pulse. Included in the timer T is means responsive to the ACP and BCP pulses for generating an AG8 signal whenever the magnetic drum MD is in sector A and to generate an AG8′ signal whenever the magnetic drum MD is in sector B. Finally, the timer T includes means for transmitting a CSPT pulse for every one hundred eighty clock pulses.

The address generator AG is basically a cascaded binary counter that counts the CMP pulses and transmits coded combinations of the AG1 to AG7 signals. Each coded combination of these signals represents a specific character block storage register address on the magnetic drum MD. The character code register CCR1 is basically a nine stage flip-flop register which receives nine-bit character codes represented by the AR1 to AR9 signals under the control of the 1SCR signal from the assembly I/O register AIOR and transmits in response thereto coded combinations of the 1CCR1 to 1CCR9 signals. The first eight stages, that is, the stages generating the signals 1CCR1 to 1CCR8 are cleared by the 1CCRR signal from the address comparator AC1. The ninth stage, that is the stage generating the 1CCR9 signal, is cleared by a 1CCRR9 signal from the address comparator AC1. The character code register CCR2 is similar to the character code register CCR1, except that it receives the AR1 to AR9 signals under the control of the 2SCR signal from the assembly I/O register AIOR and transmits in response thereto the 2CCR1 to 2CCR9 signals. The 2CCRR signal from the address comparator AC2 clears the first eight stages of this register and the ninth stage is cleared by a 2CCRR9 signal from address comparator AC2. The address comparator AC1 compares coded combinations of the AG1 to AG8 signals with the coded combinations of the 1CCR1 to 1CCR8 signals and when a coincidence is attained, generates the CO1, the 1CCRR and the 1CCRR9 signals. The TFO′ signal from the assembly I/O register AIOR controls whether the drum storage unit DSU is storing two type fonts or four type fonts. If it is storing two type fonts the TFO′ signal will be persent and restrict comparison to either the A sector or the B sector. If the TFO′ signal is absent, indicating that different type fonts are recorded on the A sector and the B sector of the bands CB1 and CB2, the comparison can take place in either sector. The address comparator AC1 also receives: control signals DWM and ATD′ from the assembly I/O register AIOR to control comparisons during the drum writing mode; and receives CMP and CMPD signals from the timer T to control the times for which a strobe for equality or coincidence can be made.

The address comparator AC2 is similar to the address comparator AC1 except that it compares the coded combinations of the AG1 to AG8 signals from the address generator AG with coded combinations of the 2CCR1 to 2CCR8 signals from the character code register CCR2 respectively and generates the CO2, 2CCRR and 2CCRR9 signals upon coincidence. However, address comparator AC2 does not receive the ATD′ and DWM signals which are used during the writing of the character blocks on the magnetic drum MD since only the comparator AC1 is used during the drum write mode.

The band selectors BS control the passage of information between the read-write heads 1BH1 to 1BH48 and the read-write heads 2BH1 to 2BH48, and the A buffers and the B buffers. During the drum read mode the DRM signal from the assembly I/O register AIOR is received by the band selectors BS and if the 1CCR9 signal is also received the read-write heads 1BH1 to 1BH48 are respectively connected to the 1BS1 to 1BS48 signal lines. However, if the 1CCR9 signal is absent, its inverse the 1CCR9′ signal will be present, causing the read-write heads 2BH1 to 2BH48 to be connected to the 1BS1 to 1BS48 signal lines respectively. Similarly, when the 2CCR9 signal is present, the read-write heads 1BH1 to 1BH48 will be connected respectively to the 2BS1 to 2BS48 signal lines; and if the 2CCR9 signal is absent the read-write heads 2BH1 to 2BH48 will be connected respectively to the 2BS1 to 2BS48 signal lines. In any of these cases, forty-eight bit character blockettes of the selected character block will flow from the magnetic drum MD to either the A buffers or the B buffers or both.

However, during the drum write mode the DWM signal from the assembly I/O register AIOR will be present at the band selectors BS and during the presence of the CO1 signal from the address comparator AC1 the BAO1 to BAO48 signal lines from the A buffers will be connected either to the read-write heads 1BH1 to 1BH48 or the read-write heads 2BH1 to 2BH48, depending on the presence or the absence of the 1CCR9 signal.

The A buffers comprise the buffer 1A, buffer 2A, and Y selector YSA. Each of the buffers can be considered as a single plane magnetic core coincident current memory having sixty core columns and forty-eight core rows, wherein the same core columns in buffers 1A and 2A are simultaneously driven sequentially by the Y selection YSA and the core rows are driven from sources hereinafter more fully described. Like core rows of buffers 1A and 2A are threaded by the same sense winding. Accordingly, the forty-eight sense windings providing the outputs for the A buffers are connected respectively to the BAO1 to BAO48 signal lines. It should be noted that during the drum write mode only the buffer 1A is employed, and character blocks comprising serially transmitted character blockettes are received from the assembly I/O register AIOR via the AR1 to AR48 signal lines and when the character block is completely loaded it is controllably read out via the BAO1 to BAO48 signal lines to the band selectors BS. During the drum read mode character blocks comprising serially transmitted character blockettes are read into the buffer 1A via the 1BS1 to 1BS48 signal lines or into the buffer 2A via the 2BS1 to 2BS48 signal lines. During the drum read mode the information from either the buffer 1A or the buffer 2A is read out via the BAO1 to BAO48 signal lines to the buffers output BO.

The B buffers comprising the buffers 1B and 2B and the Y selector YSB are similar to the A buffers except that no character blocks are ever read into either of these buffers from the AR1 to AR48 signal lines. However character blocks are read into the buffer 1B from the 1BS1 to 1BS48 signal lines and character blocks are read into the buffer 2B via the 2BS1 to 2BS48 signal lines. Character blocks are read out of either buffer 1B or 2B via the BBO1 to BBO48 signal lines to the buffers output BO.

The buffers output BO connects the output of the A buffers or the B buffers to the character generator buffer CGB. In particular, during the drum read mode when the ABA signal is received from the assembly I/O register AIOR, the BBO1 to BBO48 signal lines are respectively connected to the BO1 to BO48 signal lines and during the presence of the ABB signal from the assembly I/O register AIOR the BAO1 to BAO48 signal lines are respectively connected to the BOE to BO48 signal lines.

The operation of the drum storage unit DSU will now be described for the drum write mode; i.e., the transfer of character blocks from the computer C to the magnetic drum MD. When type fonts are to be loaded onto the magnetic drum MD, the assembly I/O register AIOR starts transmitting the DWM signal which is fed to the band selectors BS, the Y selector YSA, buffer 1A, and the address comparator AC1 to alert these units to the start of the drum write mode. Following the generation of the DWM signal, the assembly I/O register AIOR transmits an ABA signal which is fed primarily to the buffer 1A to alert its input gates connected to the AR1 to AR48 signal lines. The assembly I/O register AIOR then transmits a 1SCR signal to the character code register CCR1 to alert its input gates to receive signals via the AR1 to AR9 signal lines. The assembly I/O register AIOR then transmits a coded combination of AR1 to AR9 signals to the character code register CCR1 wherein: the bit represented by the AR9 signal indicates whether the character block is to be written on band CB1 to CB2; the bit represented by the AR8 signal bit indicates whether the character block is to be written on sector A or sector B; and the bits represented by the AR1 to AR7 signals indicate the storage register address in either sector A or sector B wherein the character block is to be written. The assembly I/O register AIOR then transmits a FAR signal which is fed to the Y selector YSA, clearing the counter therein to zero, i.e., a position which will not energize any one of the core columns in the A buffers. The assembly I/O register AIOR now starts assembling the first forty-eight bit character blockette for transmission as forty-eight bits in parallel via the AR1 to AR48 signal lines to the core row inputs of the buffer 1A. When the forty-eight bits have been assembled, the assembly I/O register AIOR transmits an ARF signal to both the Y selector YSA and the buffer 1A causing the storage of the first character blockette (the character format blockette) of the first character block in the first core column of the buffer 1A. The assembly I/O register AIOR now assembles the next forty-eight bit character blockette on the AR1 to AR48 signal lines when it is assembled, generates another ARF signal which causes the Y selector YSA to step from the first core column to the second core column and causes the storage of the second character blockette of the first character block in the second core column of the buffer 1A. This process continues until all the character blockettes of the first character block are loaded, core column by core column, into the buffer 1A. At this time, the assembly I/O register AIOR transmits: an ATD′ signal to the address comparator AC1 to alert it to perform storage register address comparisons and an ATD signal to the counter in the Y selector YSA which is cleared to zero, prior to transferring the contents of buffer 1A to the drum.

When the AG1 to AG8 signals agree with the 1CCR1 to 1CCR8 signals, the address comparator AC1 generates a CO1 signal which will last until the next character mark pulse CMP, that is, until the next storage register address is reached on the magnetic drum MD. The CO1 signal cooperates with the ABA signal, the CP signal and the DWN signal to cause the core column by core column reading out of the contents of the buffer 1A on the BAO1 to BAO48 signal lines to the band selectors BS. It will be recalled that the presence or absence of the 1CCR9 signal determines onto which of the bands CB1 or CB2 the character block is recorded. When coincidence was obtained, i.e., the coded combination of bits represented by the AG1 to AG8 signals equals the coded combination of bits represented by the 1CCR1 to 1CCR9 signals, a 1CCRR signal is fed from address comparator AC1 to the character code register CCR1, clearing that register so that it can receive another storage register address from the assembly I/O register AIOR. At the end of the coincidence signal CO1 the 1CCRR9 signal is transmitted by the address comparator AC1 to the character code register CCR1 terminating the 1CCR9 signal. The assembly I/O register AIOR now transmits another 1SCR signal followed by a coded combination of AR1 to AR9 signals to the character code register CCR1; this again is followed by the assembly of the first forty-eight bit character blockette of the second character block on the AR1 to AR48 signal lines in the manner previously described and the cycle repeats until the four desired type fonts are loaded onto the magnetic drum MD.

It should be noted that the drum storage unit DSU does not known whether four different type fonts have been loaded or whether only two type fonts have been loaded twice onto the magnetic drum MD. If only two type fonts are to be loaded, then the assembly I/O register AIOR sends the same type font twice, first with the 1CCR8 signal present in the character code register CCR1 and once with the 1CCR8 signal absent in the code register 1CCR1. However, both times the 1CCR9 signal will have the same state. Therefore, for this case the same type font is loaded on the A and B sectors of the same band. If two different type fonts are to be loaded onto the A and B sectors respectively on the same band, then the assembly I/O register AIOR would be transmitting different type fonts for each state of the 1CCR8 signal.

Although only the one buffer 1A is employed to load the character blocks on the magnetic drum MD it is possible to employ all four buffers by incorporating obvious switching and control circuits.

The drum read mode will now be described, that is, the transfer of selected character blocks from the magnetic drum MD to the character generator buffer CGB. The assembly I/O register AIOR first transmits a DRM signal which is received by the band selectors BS to open up paths between read-write heads 1BH1 to 1BH48 and 2BH1 to 2BH48, and the 1BS1 to 1BS48 and 2BS1 to 2BS48 signal lines. It is also fed to the buffers output BO to open up paths between the BAO1 to BAO48 and BBO1 to BBO48 signal lines, and the BO1 to BO48 signal lines which feed the character generator buffer CGB.

If only two type fronts have been stored on the magnetic drum MD the assembly I/O register AIOR will start transmitting a TFO′ signal to the address comparators AC1 and A2 for disabling comparisons of the bit related to sector selection. If four different fonts have been stored the TFO′ signal is not generated. In any event, the assembly I/O register AIOR then transmits an ABA signal to the A buffers and the B buffers indicating that the first two character blocks read from the drum will be stored in the A buffers. The ABA signal cooperates with the CMP signal in the Y selector YSA to clear the counter therein to zero, that is, no core column can be energized. The assembly I/O register AIOR then transmits a 1SCR signal, alerting character code register CCR1 to receive the first character block storage register address. This is followed by the transmission of a coded combination of AR1 to AR9 signals to the character code register CCR1.

The assembly I/O register AIOR then transmits a 2SCR signal followed by another coded combination of the AR1 to AR9 signals which are received by the character code register 2CCR2 by virtue of 2SCR signals. Comparison tests are simultaneously performed by the address comparators AC1 and AC2. It should be noted that the 1CCR9 and 2CCR9 signals perform their previously described role of selecting the bands CB1 and CB2. When the address comparator AC1 reaches coincidence by comparing the coded combination of AG1 to AG8 signals, with the first transmitted coded combination of 1CCR1 to 1CCR8 signal, the CO1 pulse is fed to the buffer 1A, where it cooperates with the ABA signal, and CP signals from the timer T to cause the loading of the character block stored in the located storage register into the buffer 1A via the 1BS1 to 1BS48 signal lines. Similarly, when the address comparator AC2 obtains coincidence, it generates the CO2 signal which cooperates with the ABA signal and CP signals for causing the character block then being read out from magnetic drum MD to the 2BS1 to 2BS48 signal lines to enter the buffer 2A. When this transfer has been effected, the assembly I/O register AIOR transmits the ABB signal which will cooperate with a CB1C signal, from the character generator buffer CGB to clear the Y selection YSA to zero, and will also alert it to read out stepping pulses. At the same time, the ABB signal will cooperate with a CMP signal to clear the Y selector BYSB to zero and alert the buffers 1B and 2B to receive information from the band selectors BS.

The assembly I/O register AIOR then transmits a 1SCR signal followed by a coded combination of AR1 to AR9 signal to the character code register CCR1, followed by a 2SCR and another coded combination of AR1 to AR9 signals to the character code register CCR2 and the address comparators AC1 and AC2 perform their new storage register location routines.

While these comparisons are being performed by the address comparators AC1 and AC2 to permit loading of the buffer 1B and buffer 2B, the contents of the buffers 1A and 2A are unloaded in the following manner. The character generator buffer CGB first transmits B1AU stepping pulses to the Y selector YSA and the buffer 1A causing a core column by core column readout of its contents via the BAO1 to BAO48 signal lines to the buffers output BO. The ABB signal received by buffers output BO permits the passage of the signals on the BAO1 to BAO48 signal lines onto the BO1 to BO48 signal lines respectively. When the character block has been completely read out, the character generator buffer CGB then transmits B2AU stepping pulses to the Y selector YSB and to the buffer 2A. The Y selector has been previously cleared to zero by a CB1C signal from the character generator buffer CGB. The contents of the buffer 2A are read out via the BAO1 to BAO48 signal lines and the buffers output BO to the BO1 to BO48 signal lines. While the contents of the buffers 1A and 2A are being read out, address comparisons are being performed for the B buffers. When the address comparator AC1 reaches coincidence, the CO1 signal is fed to the Y selector YSB and the buffer 1B, causing the writing into the buffer 1B of the character blockettes of the character block being read from the magnetic drum MD which are present on the 1BS1 to 1BS48 signal lines. Similarly, when address comparator AC2 obtains coincidence the CO2 signal in the same manner causes the signals on the 2BS1 to 2BS48 signal lines to be written into the buffer 2B.

When the contents of buffer 2A have been read out the assembly I/O register AIOR stops transmitting the ABB signals and again starts transmitting the ABA signal. The A buffers are loaded as previously described from the magnetic drum MD and the B buffers are unloaded. First the B1BU signal from the character generator buffer CGB cooperates with the ABA signal from the assembly I/O register AIOR to cause the reading out of buffer 1B, then the B2BU signal from character generator buffer CGB cooperating with the ABA signal from the assembly I/O register AIOR causes the reading out of the contents of buffer 2B via the BBO1 to BBO48 signal lines and the buffers output BO to the BO1 to BO48 signal lines. When the buffer 2B has been unloaded, the ABA signal terminates and the ABB signal again commences, the buffers 1B and 2B are loaded as previously described while the buffers 2A and 1A are unloaded as previously described. In this manner, character blocks selected by the assembly I/O register AIOR are transferred to the character generator buffer CGB.

*Timer T*

Figure 4:
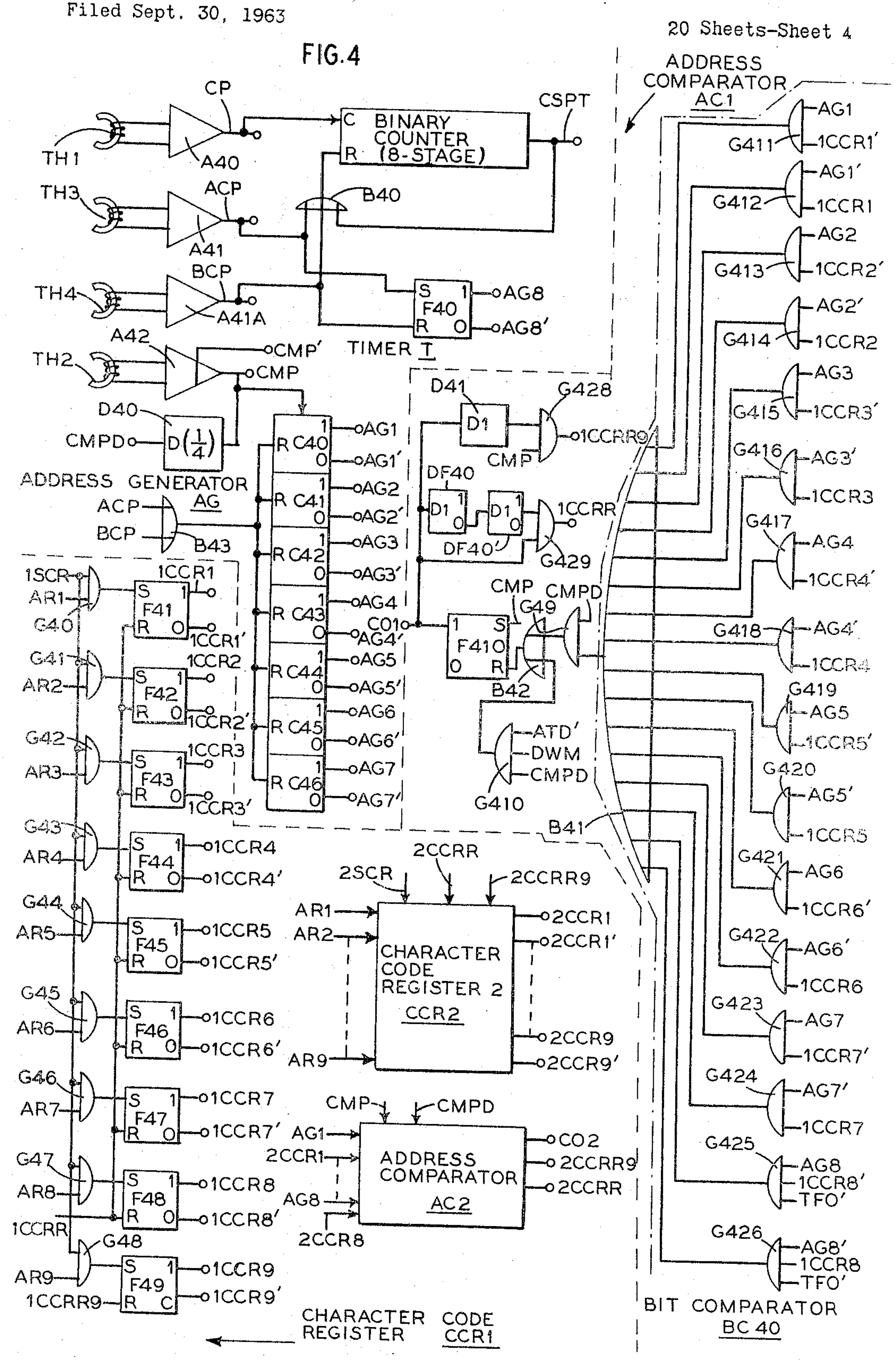
FIGURE 4 shows in logical diagram form the timer, address comparators, address generator, and character code registers of the drum storage unit of FIGURE 3.

The timer T is shown in FIGURE 4. The output of the read-write head TH1 opposite the clock pulse track is connected to the drum read amplifier A40 which generates the clock pulses CP. The clock pulses CP in addition to being fed throughout the system, feed to the count input C of an eight stage cascaded binary counter and appropriate decoder which counts one hundred eighty clock pulses and generates a CSPT pulse which is fed to the character generator buffer CGB. It is also fed via the OR circuit B40 to the clear input R of the cascaded binary counter to cause it to restart the count. The amplifier A42 is connected to the output of the read-write head TH2 which is opposite the character mark track and generates CMP and CMP′ pulses which are the inverse of the CMP pulses. The CMP pulses are delayed by conventional delay line B40, one-quarter clock pulse time to become the CMPD pulses. The amplifier A41 is connected to the read-write head TH3 which senses the A sector fiducial mark to generate the ACP pulses. Similarly the amplifier A41A is connected to the read-write head TH4 which is opposite the B sector fiducial mark track and generates the BCP pulses. The ACP and BCP pulses are fed to inputs of OR circuit B40 to also clear the cascaded binary counter. The ACP pulses are also fed to the set input S of flip-flop F40 causing the generation of the AG8 signal, indicating that the A sector of magnetic drum MD is accessible. Similarly, the BCP pulses are fed to the reset input R of the flip-flop F40 causing the generation of the AG8′ signals which indicate that the B sector of the magnetic drum MD is accessible. The address generator AG is a cascaded seven stage binary counter which counts the CP pulses and generates coded combinations the AG1 to AG7 signals and their inverse representing binarily the count. The seven stage cascaded binary counter can be cleared to zero by either an ACP pulse or a BCP pulse fed to inputs of OR circuit B43 whose outputs are connected to the clear inputs R of the counters C40 to C46 inclusive.

*Character code registers—CCR*

The character code register CCR1 comprises the flip-flops F41 to F49 inclusive. The set input of the flip-flop F41 is connected to the output of AND gate G40 whose first input is connected to the AR1 signal line and whose second input is connected to the 1SCR signal line. It will be noted that one input of each of the AND gates feeding the set inputs of the flip-flops F41 to F49 inclusive receive the 1SCR signal which determines the time when the character code register CCR1 can receive a character code, i.e., storage register address, via the AR1 to AR9 signal lines. The character code register CCR1 is cleared by a 1CCRR signal from address comparator AC1 which is fed to the reset inputs R of the flip-flops F41 to F48 inclusive. The clearing of the flip-flop F49 is controlled by the 1CCRR9 signal from the address comparator AC1 and occurs at the end of a coincidence.

The outputs of the flip-flops F41 to F48 inclusive are respectively the 1CCR1 to 1CCR8 signals. It should be noted that if, for example, the flip-flop F41 is set the 1CCR1 signal will be present at its 1 output terminal and if the flip-flop F41 is unset the 1CCR1′ signal will be present at its 0 output terminal; similarly, for the remaining flip-flops F42 to F49 inclusive.

Character code register CCRC2 is similar to the character code register CCR1, except that it receives the 2SCR signal instead of the 1SCR signal to initially alert it for receiving character codes, i.e., storage register addresses, on the AR1 to AR9 signal lines. The first eight stages are cleared by a 2CCRR signal instead of a 1CCRR9 signal. The outputs of the character code register CCR2 are the 2CCR1 to 2CCR9 signals and their inverses instead of the 1CCR1 to 1CCR9 signals and their inverses.

*Address comparators—AC*

The address comparator AC1 includes the bit comparator BC40, shown within the chain lines, which comprises AND gates G411 to G426 inclusive. Two AND gates are associated with each significant bit of the address. For example, AND gates G411 and G412 are associated with the least significant bit. It should be noted that each of the AND gates receives two signals that are related; for example, the AND gate G411 receives the AG1 signal and the 1CCR1′ signal, while the AND gate G412 receives the AG1′ and 1CCR1 signals. Therefore, there will only be no signal from the outputs of both AND gates G411 and G412 when the least significant bit of the address generator AG equals the least significant bit of the character code register CCR1. If the least significant bits are different, either one of the AND gates G411 and G412 will transmit a signal. Therefore, when the eight bits of the address generator AG equal the eight bits of the character code register CCR1 none of the AND gates G411 to G426 will have an output and consequently the OR circuit B41 (the output of bit comparator BC40) will not transmit a signal to the AND gate G49. If there is any inequality at all, at least one of these AND gates will transmit a signal via OR circuit B41 to AND gate G49. Flip-flop F410 has its set input connected to the CMP pulse signal line. Therefore at every CMP pulse time the flip-flop F410 will be set. If there is no coincidence however, the bit comparator BC40 will transmit a signal to the AND gate G49 and one quarter a pulse time after the flip-flop F410 had been set by a CMP pulse, a CMPD pulse will accordingly be transmitted from the output of AND gate G49 to one input of the OR circuit B42 feeding the reset input of flip-flop F410 and the flip-flop will unset. Accordingly only a narrow pulse will be emitted from the 1 output terminal of the flip-flop F410. However, if there is coincidence, no CMPD pulse will pass from AND gate G49 and the flip-flop F410 will remain set until the coded combination of AG1 to AG8 signals is changed when the address generator AG receives the next CMP pulse. When this occurs the CO1 signal transmitted from the 1 output of flip-flop F410 will last substantially one character block time indicating coincidence, i.e., the address has been located. When the CO1 signal lasts for more than a quarter pulse time, the AND gate G429 will transmit a 1CCRR signal, since the leading edge of the CO1 signal triggers the one pulse time delay flop DF40 whose 0 output is connected to the one pulse time delay flop DF40′ whose 1 output is gated with the CO1 signal and these two signals cannot coincide unless the CO1 signal lasts for greater than one pulse time. When the CO1 signal is a true coincidence signal the AND gate G428 transmits a 1CCRR9 pulse at the trailing edge of the CO1 signal, since the CO1 signal can gate the character mark pulse CMP that occurs just as the count in the address generator AG is increased by one for the next storage register address. The AND gate G410 which receives the ATD′, the DWM and CPMD signals, controls the unsetting of the flip-flop F410 during the drum write mode.

It should be noted that the AND gates G425 and G426 of the bit comparator BC40 both have inputs receiving the TFO′ signals. It should also be recalled that the 1CCR8 signals indicated in which sector of the magnetic drum MD the storage register was to be found. Therefore, when only two fonts are being employed and each sector has recorded thereon the same font, it is not necessary to perform a sector selection. Accordingly the TFO′ signal is employed to disable both of the AND gates G425 and G426.

The address comparator AC2 is similar to the address comparator AC1 except that it receives the 2CCR1 to 2CCR8 signals instead of the 1CCR1 to 1CCR8 signals and transmits the CO2, 2CCR9 and 2CCRR signals instead of the CO1, 1CCR9 and 1CCRR signals. Furthermore, the address comparator AC2 does not have an AND gate similar to the AND gate G410 of the address comparator AC1 since the address comparator AC2 is not employed during the drum writing mode.

*The band selectors—BS*

Figure 5:
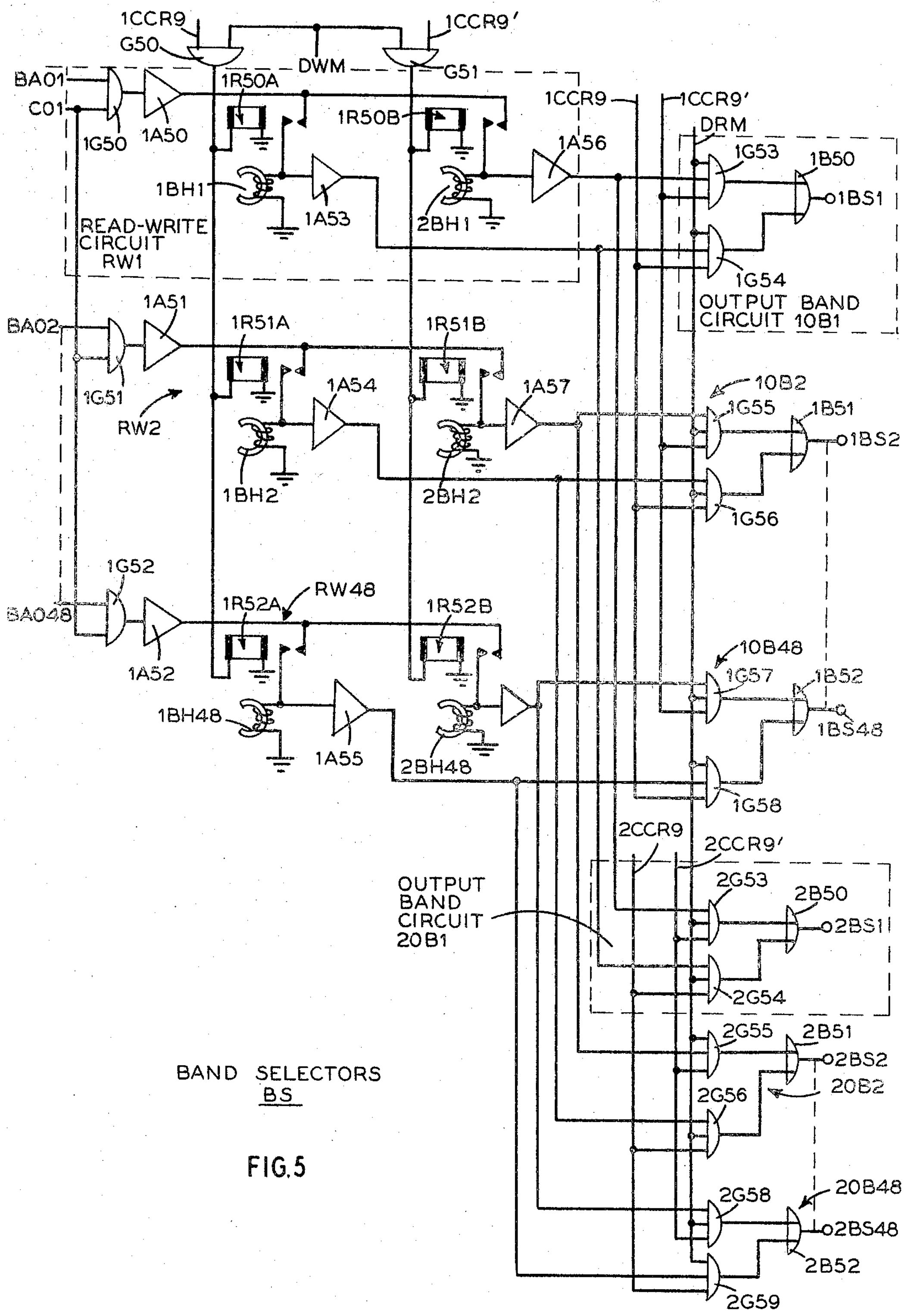
FIGURE 5 is a partially logical and partially schematic diagram of the band selectors of the drum storage unit of FIGURE 3.

Band selectors BS, shown in FIGURE 5, include forty-eight identical read-write circuits RW. Typical read-write circuit RW1 associated with the first bit of each character blockette includes the AND gate 1G50 whose output drives the writing amplifier 1A50, which is connected via the contact sets of relay 1R50A to the read-write head 1BH1 and via the contact sets of the relay 1R50B to the read-write head 2BH1 whereby the first bit of a character blockette can be controllably recorded either in the first track of band CB1 via the read-write head 1BH1 or in the first track of the second band CB2 via the read-write head 2BH1. The read-write head 1BH1 is also connected to the input of the reading amplifier 1A53, and the read-write head 2BH1 is connected to the input of the reading amplifier 1A56. Accordingly reading amplifier 1A53 reads information in the first track of the band CB1 and the reading amplifier 1A56 reads information from the first track of the band CB2.

During the drum writing mode the DWM signal is present at one input of each of the AND gates G50 and G51. If character blocks are to be written on the band CB1 the 1CCR9 signal is present at the second input of AND gate G50 which energizes relay 1R50A causing the output of the write amplifier 1A50 to be connected to the read-write head 1BH1. If character blocks are to be written in the band CB2 the 1CCR9′ signal is fed to the second input of AND gate G51 energizing the relay 1R50B and the output of the write amplifier 1A50 is connected to the read-write head 2BH1. Actual writing does not take place, however, until the CO1 signal is received at the first input of the AND gate 1G50. When coincidence is detected by the address comparator AC1 the bit to be written will be present on the BAO1 signal line from the buffer 1A. The remaining read-write circuits RW are similarly constructed except that they are connected to different tracks of the bands and they receive different BAO signals from buffer 1A. For example, the read-write circuit RW2 receives the BAO2 signal and is connectable to the read-write heads 1BH2 and 2BH2.

The band selectors BS also include a first group of forty-eight output band circuits 1OB1 to 1OB48. Since each one of these circuits is essentially similar, only one of said circuits will be described. In particular, the output band circuit 1OB1 includes the AND gate 1G53 which receives at one input the DRM signal, at a second input the output of reading amplifier 1A56 and at a third input the 1CCR9′ signal. The output of AND gate 1G53 is connected to one input of OR circuit 1B50. The AND gate 1G54 also has a first input connected to the DRM signal line, a second input connected to the 1CCR9 signal line and a third input connected to the output of reading amplifier 1A53. The output of AND gate 1G54 is connected to the second input of the OR circuit 1B50 whose output is connected to the 1BS1 signal line. During the drum read mode when the DRM signal is present the AND gate 1G53 will pass the bits read from the first track of band CB2, that is, the output of reading amplifier 1A56 during the presence of the 1CCR9′ signal. Similarly, the AND gate 1G54 will read the contents of the first track of the band CB1′, that is, the output of the reading amplifier 1A53, during the presence of the 1CCR9 signal. Therefore when the 1CCR9 signal is present during the drum read mode the contents of the first track of the band CB1 will be transmitted from the band selectors BS as the 1BS1 signals, and during the presence of the 1CCR9′ signal the contents of the first track of the band CB2 will be read out as the 1BS1 signals.

The remaining output band circuits 1OB2 to 1OB48 operate in a similar manner except that they are connected to different reading amplifiers and their outputs are respectively connected to the 1BS2 to 1BS48 signal lines.

Band selectors BS also include a second group of band output circuits 2OB1 to 2OB48 which operate in a similar manner to the above described output band circuits 1OB1 to 1OB48, except that they operate under control of the 2CCR9 and 2CCR9′ signals and transmit respectively the 2BS1 to 2BS48 signals.

*A and B Buffers*

Figure 6A:
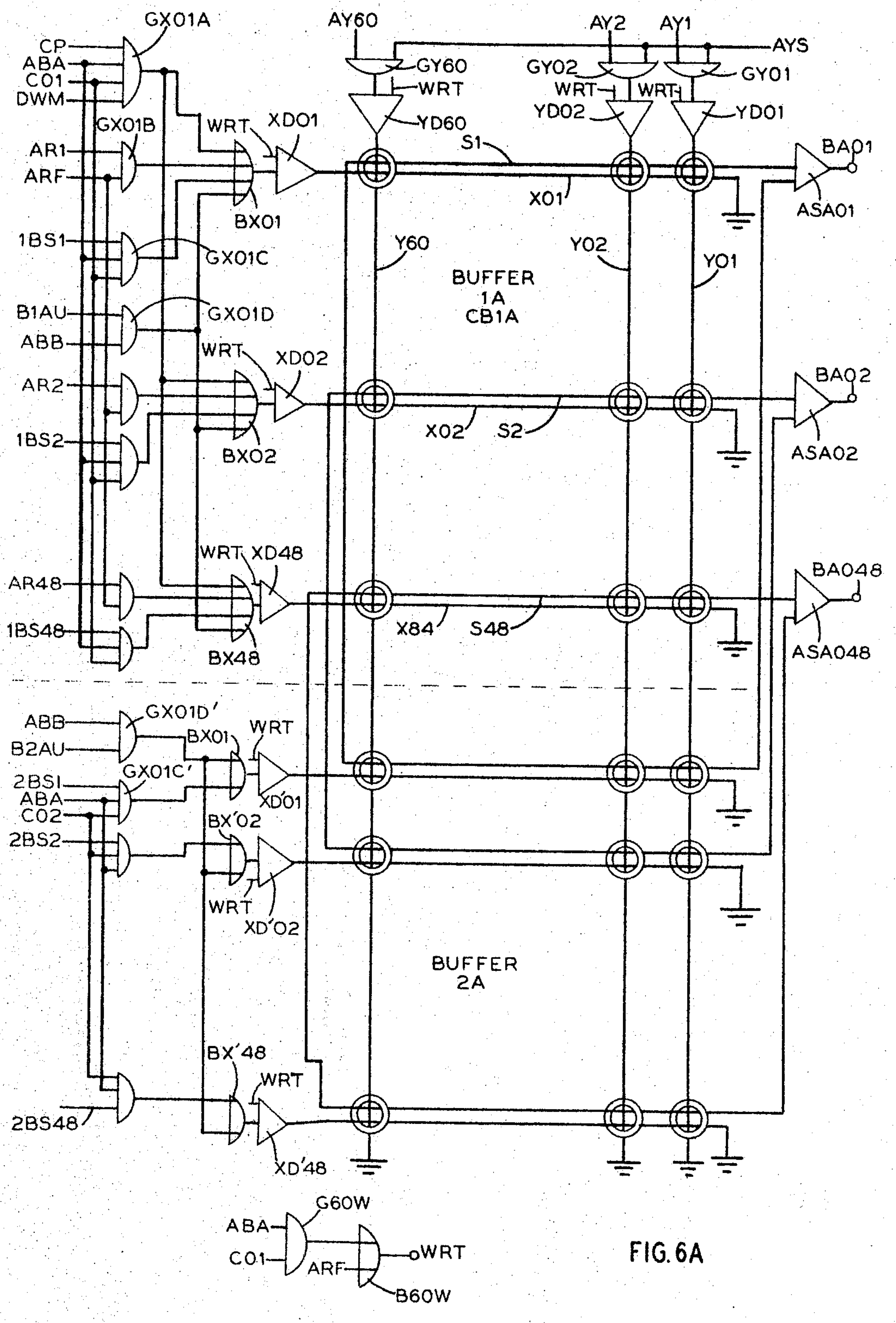
FIGURES 6A and 6B show the A and B buffers in logical and schematic form of the drum storage unit.

FIGURE 6A shows the buffer 1A and the buffer 2A. The buffer 1A is a single plane magnetic core coincident current memory including sixty core columns and forty-eight core rows. For the sake of simplicity, only the first, second and sixtieth core columns are shown as well as only the first, second and forty-eighth core rows. All of the cores in the first core column are threaded by the YO1 line which is connected to the amplifier YDO1. Similarly, the second core column is threaded by the YO2 line which is connected to the amplifier YDO2. The core rows such as the first core row is threaded by the line XO1 which is driven by amplifier XDO1 and the second core rows is threaded by the line XO2 which is driven by the amplifier XDO2. Character blockettes of the character blocks are transferred into and out of the buffer 1A in a core column by core column manner. In other words, the amplifier YDO1 is energized and the forty-eight row lines are selectively energized by their respective amplifiers XD to record the first column blockette in the core column threaded by line YO1. Then the Y amplifier YDO2 is energized and the amplifiers XD are again selectively energized, dependent on the second received column blockette to record this blockette in the core column threaded by line YO2.

During the readout of the buffer 1A the first core column is read out first by virtue of the amplifier YDO1 being energized simultaneously with the energization of all forty-eight of the amplifiers XD. Then the amplifier YDO2 is energized and all forty-eight amplifiers XD are again energized. Each of the amplifiers YD such as the amplifier YDO1 is fed by the output of an AND gate such as the AND gate GYO1. AND gate GYO1 and all of the AND gates GY have one input connected to the AYS signal line which is generated in the Y selector YSA. However the second inputs to each of the AND gates is one of the AY signal lines from Y selector YSA. For example, the AND gate GYO1 receives the AY1 signal whereas the AND gate GY60 receives the AY60. The AY1 to the AY60 signals occur sequentially in time with AYS signal occurring for each one of the AY1 to AY60 signals. It should be noted that not necessarily all of the AY signals occur for a character block, the number occurring depends on the number of character blockettes in a character block.

Since all of the inputs to the amplifiers XD are essentially the same, only the inputs to the amplifier XDO1 will be described in detail. The amplifier XDO1 is driven by the output of the OR circuit BXO1 which has four inputs. The first input is connected to the output of AND gate GXO1B, and is employed during the drum write mode to read in the least significant bit of the character blockettes being received from the assembly I/O register AIOR. This bit will be on the AR1 signal line and the gating time is under control of the ARF signal received from the assembly I/O register AIOR at the appropriate time. During the drum write mode when the buffer 1A is completely loaded, it will then be read out to the magnetic drum MD. At that time, when address coincidence is obtained, the CO1 signal in cooperation with the DWM and ABA signals gates clock pulses CP through AND gate GXO1A and via OR circuit BXO1 to amplifier XDO1 energizing line XO1 each CP time. At the same time, the lines YO are sequentially energized at CP pulse rate causing the core column-by-core column read out of the least significant bits of the character blockettes stored in the buffer 1A.

During the drum read mode when the character blockettes of a character block are read from the magnetic drum MD the AND gate GXO1C is in operation. When storage register address coincidence is obtained, the CO1 signal cooperates with the ABA signal to permit the gating of the 1BS1 signals from the band selectors BS into the first core row of the buffer. 1A. At the same time, the line YO are sequentially energized in synchronism with the clock pulses CP in cooperation with the ABA and CO1 signals. During the drum read mode when the contents of the buffer 1A are to be read out, the ABB signal cooperates with B1AU pulses to transfer the bits of the character blockettes of the first row to the output as the lines YO are sequentially energized in synchronism with the B1AU pulses. The output of the first row is the sense amplifier ASAO1 which is connected to the conventional sense winding S1. The remaining core rows have similar inputs to their respective amplifiers XDO2 to XD48 and a similar output from the sense amplifiers ASAO2 to ASA48. However it should be noted that each one of the core rows receives during a buffer loading sequence unique information. For instance, during the buffer load operation of the drum write mode the second core row will receive signals on the AR2 signal line instead of the AR1 signal line and during the buffer load operation in the drum read mode when the character blockettes are being read from the magnetic drum MD the bit to be stored will be received on the 2BS1 signal line instead of the 1BS1 signal line. However during buffer unload operations all core rows are simultaneously energized since the output of AND gate GXO1A is connected to one input of each OR circuit BX and the output of AND gate GXO1D is connected to another input of each OR circuit BX.

The amplifiers YD and XD are conventional bidirectional current amplifiers. During write-in operations current flows from the amplifiers to ground; and during the read-out operations current flows from ground to the outputs of the amplifiers. A second input into each of the amplifiers controls the direction of current flow. Each of the second inputs is connected to the WRT signal line. When the WRT signal is present the write operation is called for. The WRT signal is generated by OR circuit B60W which has one input connected to the ARF signal line and a second input connected to the output of AND gate G60W which receives the ABA and CO1 signals at its inputs.

Buffer 2A is similar in all respects to buffer 1A with the following exceptions. Buffer 2A does not operate during the drum write mode and therefore does not have inputs to its associate amplifiers XD' such as the AND gates GXO1A and GXO1B but does have inputs similar to the AND gates GXO1C and GXO1D. For instance the AND gate GXO1D' is similar to the AND gate GXO1D except that it receives the B2AU pulses from the assembly I/O register AIOR instead of the B1AU pulses. Likewise the AND gate GXO1C' is similar to the AND gate GXO1C except that it receives the 2BS1 signals from the band selector BS instead of the 1BS1 signals. It should be noted too that each of the core rows of the buffer 2A is threaded by the same sense winding as the core rows of the buffer 1A. For instance, the sense winding S1 threads the first core row of the buffer 1A and also threads the first core row of the buffer 2A. Since the buffer 1A and the buffer 2A are never read at the same time, this introduces no complication. In fact the sequence of operation usually calls for first the reading-out of the buffer 1A followed by the reading-out of the buffer 2A.

The buffers 1B and 2B are similar to the buffer 2A. The only difference need noting is that writing into the A buffers is controlled by the ABA signal and writing into the B buffers is controlled by the ABB signal, whereas reading from the A buffers is controlled by the ABB signal and reading from the B buffers is controlled by the ABA signal. Since these signals alternate it is apparent that when the A buffers are being read into, the B buffers can be read out of.

Figure 6B:
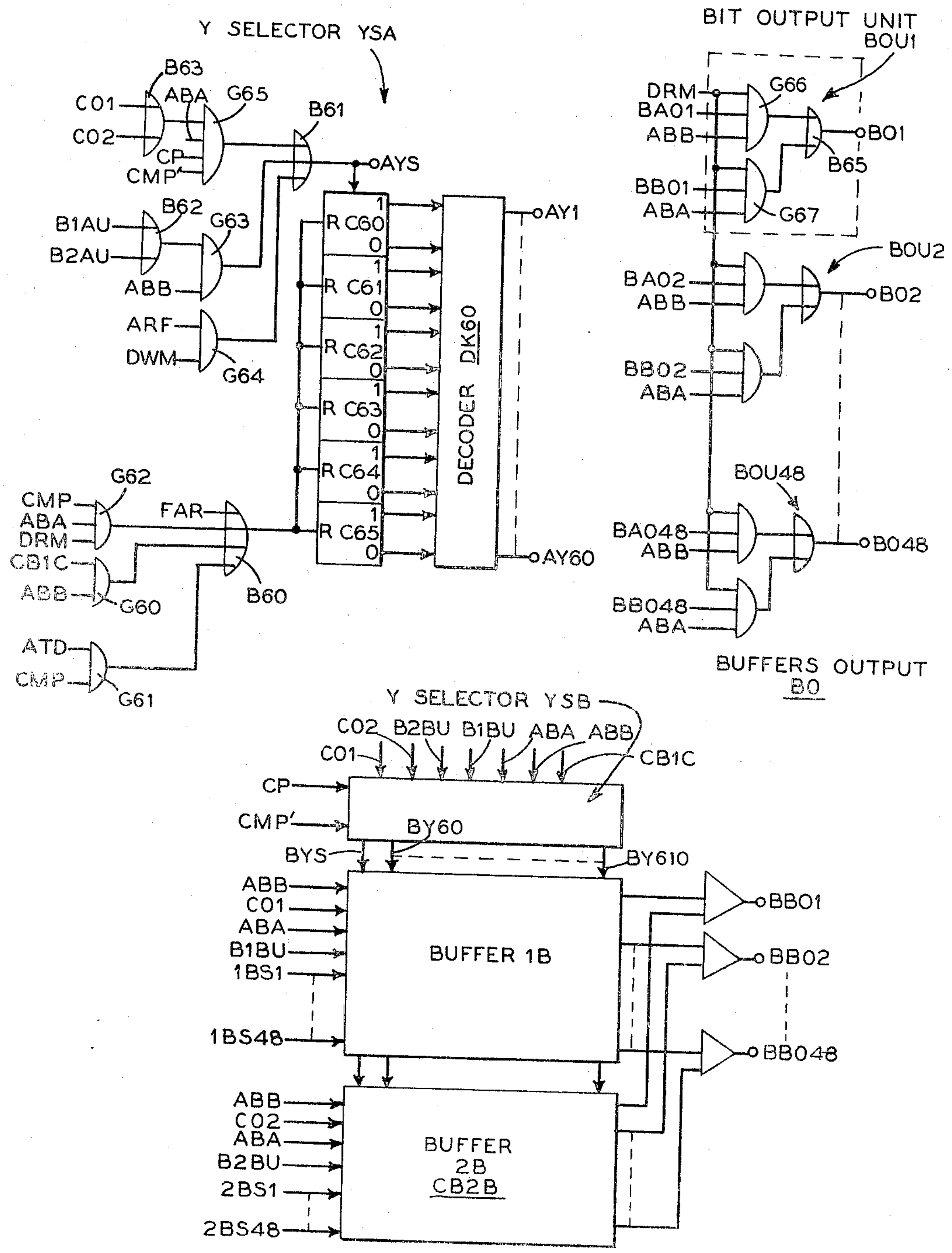

FIGURE 6B shows the Y selector YSA comprising the six-stage cascaded binary counters C60 and C65 inclusive. The counters are initially cleared to the binary representation zero by a signal from the output of OR circuit B60. It should be noted that the initial clearing will usually occur before any core column sequential selection is to be performed in the A buffers. Therefore, the counters are cleared to binary zero which will not cause any of the column amplifiers YD to be energized. Consequently there is no possibility for erroneous information to be stored in the A buffers. During the drum write mode the FAR signal from the assembly I/O register AIOR will perform the initial clearing and the ATD and CMP signals cooperate at AND gate G61 to do the initial clearing at the start of the read-out operation, prior to the writing into the A buffers. During the drum read mode, when the A buffers are to be written into, the ABA signal cooperates with a CMP signal and the DRM signal at AND gate G62 to perform the initial clearing. During the drum read mode when the contents of the A buffers are to be read out, the ABB from the assembly I/O register AIOR and CB1C from the character generator buffer CGB signals cooperate at AND gate G60 to provide for the initial clearing.

During the drum write mode the DWM signal cooperates with the ARF pulses from the assembly I/O register AIOR at AND gate G64 to transmit pulses through OR circuit B61 for generating AYS pulses which are used both to step the binary counters as well as to strobe the aforementioned AND gates which drive the amplifiers YD. In other words, the AYS pulses both step the binary counters C60 to C65 to the next count and provide the sampling pulses for the amplifiers YD input gates. During the drum read mode when information is to be loaded into the A buffers the AND gate G65 provides these pulses in the form of clock pulses CP. Note that the stepping can only occur when character blockettes are to be transferred from the magnetic drum MD to the A buffers as indicated by the presence of the ABA signal. The transfer is further restricted until the proper character block is obtained, which will occur either for storage register address coincidence detection as indicated by the presence of the CO1 signal at the first input to OR circuit B63, or the CO2 signal at a second input of OR circuit B63. The outputs of the binary counters C60 to C65 feed conventional decoder DK 60 which transforms the coded combinations of signals generated by these counters into one of sixty unique signals AY1 to AY60 inclusive. Each one of these signals feeds a separate gate that drives one of the amplifiers YD.

The Y selector YSB is identical to the Y selector YSA except for the following differences. Its identical AND gate G60 receives the ABA signal instead of the ABB signal. Its identical AND gate G62 receives the ABB signal instead of the ABA signal received by the AND gate G61 of Y selector YSA, the FAR signal is not fed to its equivalent OR circuit B60 and there is no equivalent to AND gate G61. With respect to the generation of the stepping pulses since only the A buffers are used during the drum write mode there is no equivalent AND gate G64. Similarly, the identical AND gate G63 receives the ABA signal instead of the ABB signal, and the equivalent of OR circuit B62 receives the B1BU and B2BU pulses.

*Buffer outputs—BO*

The buffers output BO includes forty-eight identical bit output units BOU1 to BOU48 inclusive. Since these units are identical except for signal inputs and outputs, only the bit output unit BOU1 will be described in detail. The bit output unit BOU1 comprises the OR circuit B65 whose output is connected to the BO1 signal line and has a first input connected to the output of AND gate G66 and a second input connected to the output of AND gate G67. The first input of each of the AND gates G66 and G67 is connected to the DRM signal line to insure that only transfers are performed during the drum read mode of operation. The input of the AND gate G66 is connected to the BAO1 signal line whereas the second input of the AND circuit G67 is connected to the BBO1 signal line. The third input of the AND circuit G66 is connected to the ABB signal line and the third input of the AND circuit G67 is connected to the ABA signal line. Accordingly when the A buffers are being read from, the ABB signal will be present permitting the output of the first core row of either the buffers 1A or 2A, that is, the BAO1 signal to pass through to the BO1 signal line, and when the B buffers are being read from, the ABA signal at the input to the AND gate G67 permits the contents of the first core row of either of the buffers 1B or 2B to be read via the BBO1 signal line to the BO1 signal line. The bit output unit BOU2 services the second core row of the buffers whereas the bit output unit BOU48 services the forty-eighth core row of the buffers.

Therefore, the bits of the character blockettes are read from the buffers in parallel. The sequence is, first the character blockettes stored in the buffer 1A are read out, followed by the character blockettes in the buffer 2A, followed by the character blockettes in the buffer 1B and finally by the character blockettes in the buffer 2B and the read out continues repeating this cycle.

*Character generator buffer—CGB*

Figures 7, 11:
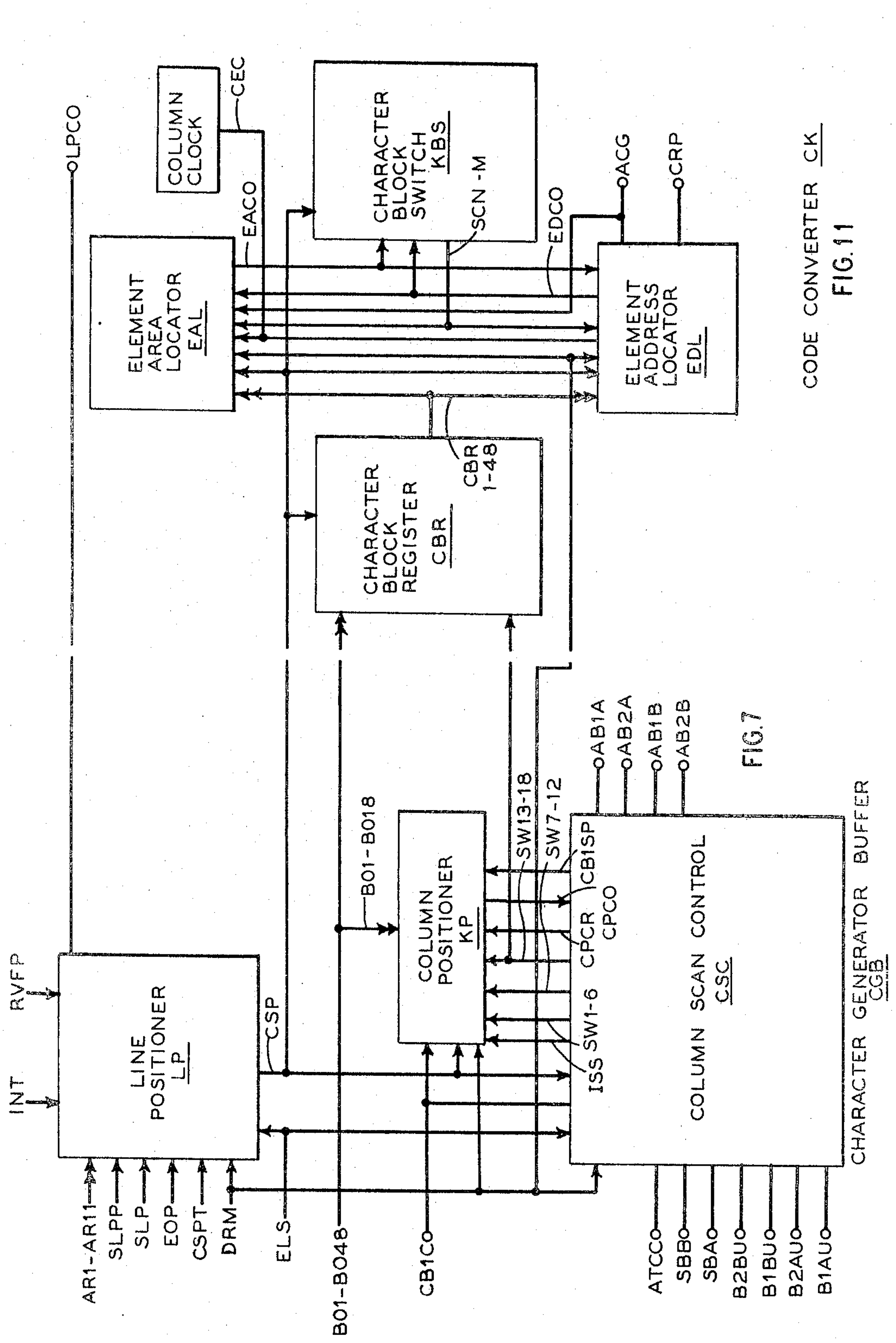
FIGURE 7 is a block diagram of the character generator buffer of FIGURE 2.
FIGURE 11 is a block diagram of the code converter of FIGURE 2.

The character generator buffer CGB shown in FIGURE 7 includes line positions LP comprising: a line position register which is a plurality of flip-flops which accept a coded combination of signals from the assembly I/O register AIOR under the control of a gating signal therefrom which indicates the position of the start of a new line of characters; and a cascaded binary counter chain line position counter that binarily counts sprocket pulses recorded on the film. The outputs of the line position register and the line position counter are compared for equality by a line position comparator to initiate the transfer of character blockettes from the drum storage unit DSU to the code converter CK and the character generator buffer CGB so that characters may be displayed by the character generator CG for exposure on the photosensitive film.

The character generator buffer CGB also includes a column positioner KP which has a control register comprising eighteen flip-flops that accept the first character blockette, i.e., the format blockette, of the character block selected for transfer to code converter CK. It will be recalled that the format blockette of each character block is an eighteen-bit word divided into three six-bit groups, wherein the first group indicates the number of columns space to the left of the actual character, the second six-bit group the number of space columns to the right of the actual character and the third six-bit group the actual number of character blockettes associated with the character block.

Included in the column positioner KP is a column position counter that counts column scan pulses CSP associated with the recording of the columns comprising the character. The outputs of the column position counter are fed into one side of a column position comparator. The other side of the column position comparator receives via a control switch sequentially the three different groups of six bits stored in the control register. Each time coincidence is attained a new six-bit group is then compared with the count in the column position counter CPK which has been cleared after each coincidence. The third element of the character generator buffer CGB is the column scan control CSC which includes a switch ring counter that operates through the control switch to control which of the six-bit groups is to be compared with the count in the character position counter. Also included in the column scan control CSC is a buffer ring counter which controls which of the buffers of the drum storage unit DSU is to transfer information at any given time. It further includes circuitry for indicating to the assembly I/O register AIOR when a new pair of character codes are to be read in from the computer C.

The operation of the character generator buffer CGB will now be described. The first signal received is the DRM signal from the assembly I/O register AIOR by the line positioner LP which merely alerts this unit to operate. During this time the film starts moving and the first four characters to be recorded are read from the magnetic drum in the drum storage unit DSU and loaded into the appropriate buffers therein. Sometime thereafter the assembly I/O register AIOR first transmits an SLPP pulse followed by an SLP signal to the line position register of the line positioner LP. The SLPP pulse clears the register to zero and the SLP pulse alerts this register to receive an eleven-bit word represented by the AR1 to AR11 signals from the assembly I/O register AIOR which indicate the position on the film where the line is to be written. During this time the film transport is moving and transmitting RVFP pulses to the line position counter in the line positioner LP. When the coded combination of the outputs of the line position counter equal the coded combination of the outputs of the line position register the line position comparator starts generating an LPCO pulse which will last until the entire line of characters has been written. The LPCO signal is fed to the character generator CG to initiate a line sweep of the cathode ray tube therein.

As long as the LPCO signal is present and the charactor generator CG is operating properly as indicated by the presence of the INT signal therefrom, the line positioner LP will generate column scan pulses CSP for each CSPT pulse received from the drum storage unit DSU.

The first CSP pulse and only this CSP pulse, when fed to the column scan control CSC, causes the generation of the ISS signal. The ISS signal sets the switch ring counter therein to its initial state, causing the generation of the SW1–6 signal and also causes the generation of a CPCR pulse. The CPCR pulse is fed to the column positioner KP to clear the column position counter to zero. The SW1–6 signal causes the generation of the CB1C signal which is fed from the column scan control CSC to the drum storage unit DSU, to clear the counter in the Y selection to zero as previously described. The CB1C pulse is fed also to the column positioner KP to clear the control register therein. A fraction of a pulse time thereafter the CB1SP signal is generated by the column scan control CSC and is fed to the column positioner KP to permit the control register to accept information as well as to cause the column scan control CSC to generate a B1AU pulse that is fed to the drum storage unit DSU causing the reading out of the first character blockette, i.e., format blockette, from the buffer 1A. The format blockette from the buffer 1A represented by the BO1 to BO18 signals is fed to the control register in the column positioner KP.

By virtue of the presence of the SW1–6 signal, the first six bits of the eighteen-bit format blockette are compared with the column count being accumulated as CSP pulses by the column position counter in the column positioner KP. In other words the left hand blank portion of the first character slug is now being recorded. When comparison is obtained the column position comparator generates a CPCO pulse which is fed to the column scan control CSC, causing the generation of another CPCR pulse which clears the column position counter in the column positioner KP and also causes the switch ring counter to step to its second position, causing the generation of the SW13–18 signal.

The SW13–18 signal causes the generation of a B1AU signal for each CSP pulse and forth-eight bit pattern blockettes are transferred at the CSP pulse rate to the code converter CK. At the same time, the column positioner KP now compares the coded representation of the last group of six bits stored in the control register with the new count of CSP pulses being accumulated by the column position counter KP. During this time the actual character pattern is recorded. When coincidence is again reached by the column position comparator in the column positioner KP a CPCO pulse is again generated and is fed to the column scan control CSC which in turn generates a CPCR signal which is fed back to the column positioner KP causing the clearing of the column position counter again to zero. The CPCR pulse also steps the switch ring counter to its third position causing the generation of the SW7–12 signal which when received by the column positioner KP now causes the comparison of the middle group of six bits stored in the control register with the count again being accumulated in the column position counter. During this time the blank spaces to the right of the character are recorded. When the counts are equal, the column position comparator generates another CPCO pulse.

At this point the second character is being set up for recording. The generation of the SW1–6 signal again causes the generation of a CB1C signal which clears the Y selection in the drum storage unit DSU to its initial position. This is followed a fraction of a pulses time thereafter by the generation of the CB1SP signal which in addition to its previously described functions steps the buffer ring counter to its second state and causes the generation of a B2AU pulse. The B2AU pulse is fed to the drum storage unit DSU to cause the reading out of the format blockette of the second character from the buffer 2A of the drum storage unit DSU. The operation continues in the same manner as described for the first character until the SW7–12 signal is generated which causes the column scan control CSC to transmit an SBA signal to the assembly I/O register AIOR. The signal generates the ABA signal in the AIOR which will activate the B buffers in the drum storage unit DSU for the transmision of a pair of character blocks.

The third character is read from the drum storage unit DSU under the control of the B1BU pulses which are generated when the buffer ring counter is stepped to its third state. It should be noted that when the SBA signal was generated an ATCC signal is also transmitted from the column scan control CSC to the interface IF which will instruct the computer C to read in the next two character codes. After the third character has been read from the drum storage unit DSU, another similar cycle is performed except that now the buffer ring counter is stepped to its fourth state, causing the generation of the B2BU pulses which is fed to the drum storage unit DSU causing the buffer 2B therein to read out its character block in the manner previously described. During the time of the SW7–12 signal associated with the reading out of the fourth character, the column scan control CSC transmits an SBB signal to the assembly I/O register AIOR and an ATCC signal to the interface IF. The SBB signal will cause via the assembly I/O register AIOR the selection of the A buffers to present the next character blocks. The ATCC signal will be utilize to cause the computer C to transfer in the next two character codes.

After the fourth character has been recorded, the buffer ring counter returns to its first state again causing the generation of the B1AU pulses which read the fifth character block which is stored in the buffer 1A of the drum storage unit DSU and this process continues until the assembly I/O register AIOR transmits an ELS signal that is fed to the line positioner LP and the column positioner KP. This signal will indicate that the end of the line is being reached and, in particular, that only one more character will be recorded after the receipt of this signal. The ELS signal when received by line positioner LP terminates the generation of the LPCO pulses which prevent any further CSP pulses from being generated and terminates the line sweep in the cathode ray tube. The ELS signal in the column scan control CSC also primes circuitry therein to reoperate when a new line of character is to be recorded.

To summarize operation, it is seen that for each character that is recorded the first character blockette, i. e., the format blockette, of the character block contains the three six-bit groups representing three horizontal areas of the character. The first group of bits which represent the number of blank spaces to the left of the actual character pattern are compared against the count of the column scan pulse CSP so that a sufficient numbered of blank columns are recorded indictive to the left hand space before the character. When this number of columns has been scanned the switch ring counter then introduces the next group of the six bits for comparison. During this time, the column scan pulses CSP are generated but also cause the transfer of pattern blockettes from the drum storage unit DSU to the code converter CK and the actual light and dark spaces for each column of the character are recorded. When the number of columns counted equals the count represented by this second group of six bits, the switch ring counter steps to its third state and blank column scans are performed equal to the number represented by these last six bits. Or in other words the blank space to the right of the character is recorded.

Each of the character blocks is handled in the above described manner. The buffer ring counter controls the sequence by which the character blocks are transferred from the drum storage unit DSU to the code converter CK by sequentially generating B1AU, B2AU, B1BU and B2BU groups of pulses. When the B1AU pulses are generated the pattern blockettes in the buffer 1A are transferred. When the B2AU series of pulses are generated, the pattern blockettes in the buffer 2A are transferred. When the B1BU pulses are generated the pattern blockettes in the buffer 1B are transferred and when the B2BU pulses are generated the pattern blockettes in the buffer 2B are read out, and the system recycles.

It should also be noted that when the contents of buffers 1A and 2A are being read from the drum storage unit DSU to the code converter CK the computer C is transmitting two character codes which cause the selection of two new character blocks that are read into the buffers 1B and 2B and when the contents of the buffers 1B and 2B are being transferred to the code converter CK the magnetic drum MD under control of the computer C is transferring two characters to the buffers 1A and 2A.

*Line positioner—LP*

Figure 8:
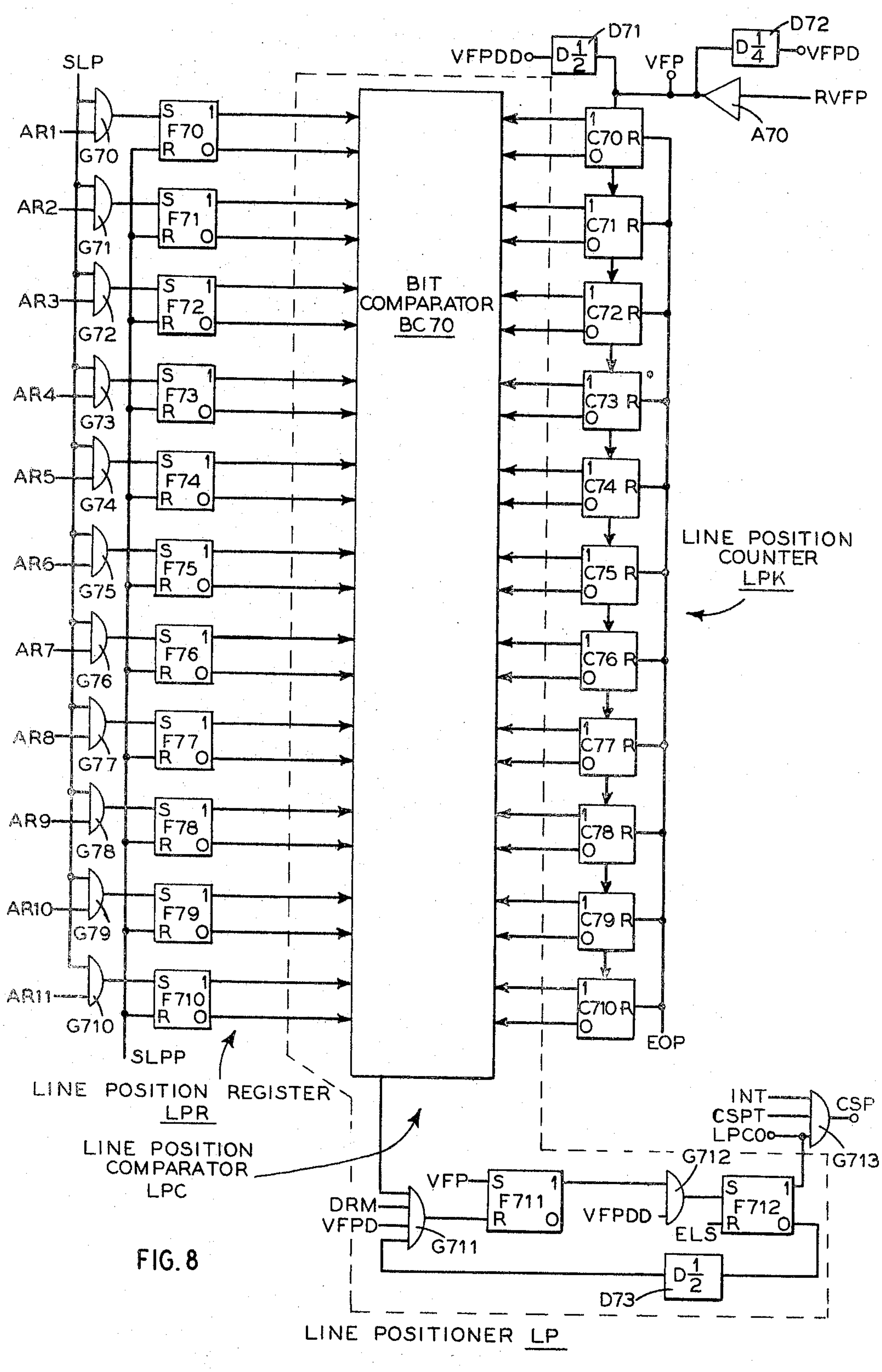
FIGURE 8 is a logical diagram of the line positioner of the character generator buffer of FIGURE 7.

The line positioner LP shown in FIGURE 8 includes the line position register LPR, the line position comparator LPC and the line position counter LPK.

The line position register LPR is an eleven-stage flip-flop register which receives a coded combination of eleven bits from the assembly I/O register AIOR representing the position on the film where a new line is to start. It will be noted that each of the flip-flops has its set input terminal connected to a two input AND gate. For example, the flip-flop F70 has its set input connected to the output of AND gate G70 whose first input is connected to the SLP signal line and whose second input is connected to the AR1 signal line. When the line position register LPR is to be loaded, the SLP signal is received from the assembly I/O register AIOR permitting the gating in of the bit on the AR1 signal line. Each of the remaining flip-flops is similar, except that it receives a different one of the AR2 to AR11 signals at its set input AND gate. Furthermore, each of the flip-flops has its reset or clear input connected to the SLPP signal line. Generally the SLPP pulse occurs first in time to clear the flip-flop and then the SLP signal occurs causing the AR1 to AR11 signals to enter the register in parallel.

The line position counter LPK is an eleven-stage cascaded binary counter which is initially cleared by an EOP signal from the assembly I/O register AIOR whenever an end of page signal is received from the computer C. The line position counter LPK is stepped by the RVFP signals from the character generator CG which are amplified by amplifier A70 and fed to the first counter stages as a VFP signal. For timing reasons the VFP signal is delayed a half pulse time by delay line D71 to become the VFPDD signal and is delayed a quarter pulse time by the delay line D72 to become a VFPD signal.

The outputs of the flip-flops of the line position register LPR and the counter stages of the line position counter LPK are compared by the bit comparator BC70 of the line position comparator LPC. As heretofore described for the bit comparator BC40, when equality exists the bit comparator BC70 dose not transmit a signal. As long as an inequality exists it does transmit a signal. This fact is used to indicate coincidence in the following manner. Every VFP pulse sets the flip-flop F711. If there is an inequality a signal will be transmitted by bit comparator BC70 and will cause a VFPD pulse to pass through AND gate G711 to the reset input of flip-flop F711 causing it to unset. However, if equality exists, then the flip-flop F711 is not unset and will allow a VFPDD pulse to pass through AND gate G712 and set the flip-flop F712. When flip-flop F712 sets, its 0 output delayed one half a pulse time by the delay line D73 applies an inhibiting signal to the AND gate G711. Therefore the flip-flop F711 cannot be unset until the flip-flop F712 is unset. The flip-flop F712 will be unset when it receives an ELS signal, indicating the end of a line from the assembly I/O register AIOR. While the flip-flop F712 is set, its output the LPCO signal permits the passage of CSPT pulses from the drum storage unit DSU through AND gate G713 to cause the generation of the CSP pulses which indicate each column sweep of the trace on the cathode ray tube of the character generator CG provided the character generator CG is operating as indicated by the presence of an INT signal therefrom; the INT signal serving merely as an interlock or safety device. The LPCO signal also controls the line sweep of the cathode ray tube in character generator CG.

*Column positioner—KP*

Figure 9:
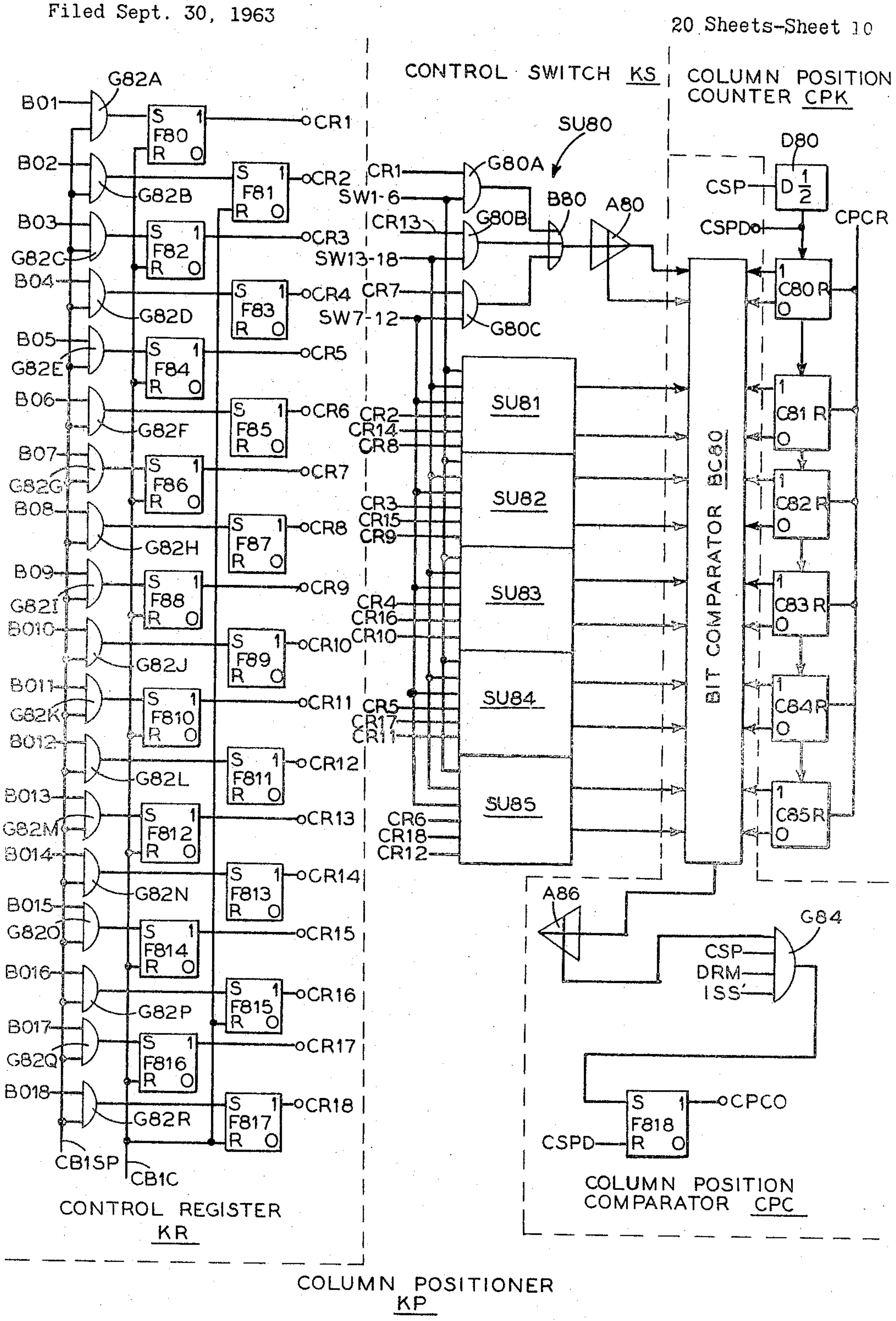
FIGURE 9 is a logical diagram of the column positioner of the character generator buffer of FIGURE 7.

The column positioner KP shown in FIGURE 9 includes control register KR which is an eighteen-stage flip-flop register which receives the format blockette of each character block associated with a character that is being recorded on film. Each of the flip-flops F80 to F817 has its reset input connected to the CB1C signal line which performs initial clearing before the format blockette is to be received in the register. The set input of each of the flip-flops is connected to an AND gate G82 having a first input connected to the CB1SP signal line which controls the time when the format blockette is to enter the register. The second input to each of these AND gates is respectively connected to one of the BO1 to BO18 signal lines from the drum storage unit DSU. The outputs of the flip-flops F80 to F817 are respectively the CR1 to CR18 signal lines which are fed to the control switch KS.

The control switch KS comprises six identical switch units SU except for their inputs and outputs. Accordingly, only the switch unit SU80 will be described in detail. The switch unit SU80 comprises the amplifier A80 which transmits both a signal and its inverse when it receives a signal at its input from the OR circuit B80. OR circuit B80 has three inputs respectively, connected to the AND gates G80A, G80B, and G80C. A first input to the AND gate G80A is connected to the CR1 signal line and the second input is connected to the SW1–6 signal line. The two inputs to the AND gate G80B are respectively the CR13 and SW13–18 signal lines, and the two inputs to the AND gate G80C are the CR7 and SW7–12 signal lines. Accordingly, during the presence of the SW1–6 signal, the CR1 to CR6 signals are passed by the switch units SU80 to SU85 respectively to inputs of the column position comparator CPC. When the SW7–12 signal is being generated, the CR7 to CR12 signals pass to the column position comparator CPC and when the SW13–18 signal is present the CR13 to CR18 signals are passed by the switch units SU80 to SU85 for comparison in the column position comparator CPC.

The column position counter CPK which provides the second input to the column position comparator CPC, is a six-stage cascaded binary counter which counts effectively CPS pulses delayed a half pulse time by delay line D80. Initial clearing of the counter chain is performed by the CPCR pulses from the column scan control CSC.

The column position comparator CPC includes a bit comparator BC80 which is similar to the previously described bit comparators and compares the coded combination of signals from the control switch KS with the coded combination of signals from the column position comparator CPK. It should be noted that only when the coded combinations of signals are equal or identical does the bit comparator BC80 not transmit a signal. The absence of a signal at amplifier A86 causes it to transmit a signal to the AND gate G84 to permit the passage of a CSP pulse therethrough to set the flip-flop F818, which generates a CPCO pulse, since the flip-flop is unset a half pulse time later by the CSPD signal.

*Column scan control—CSC*

Figure 10:
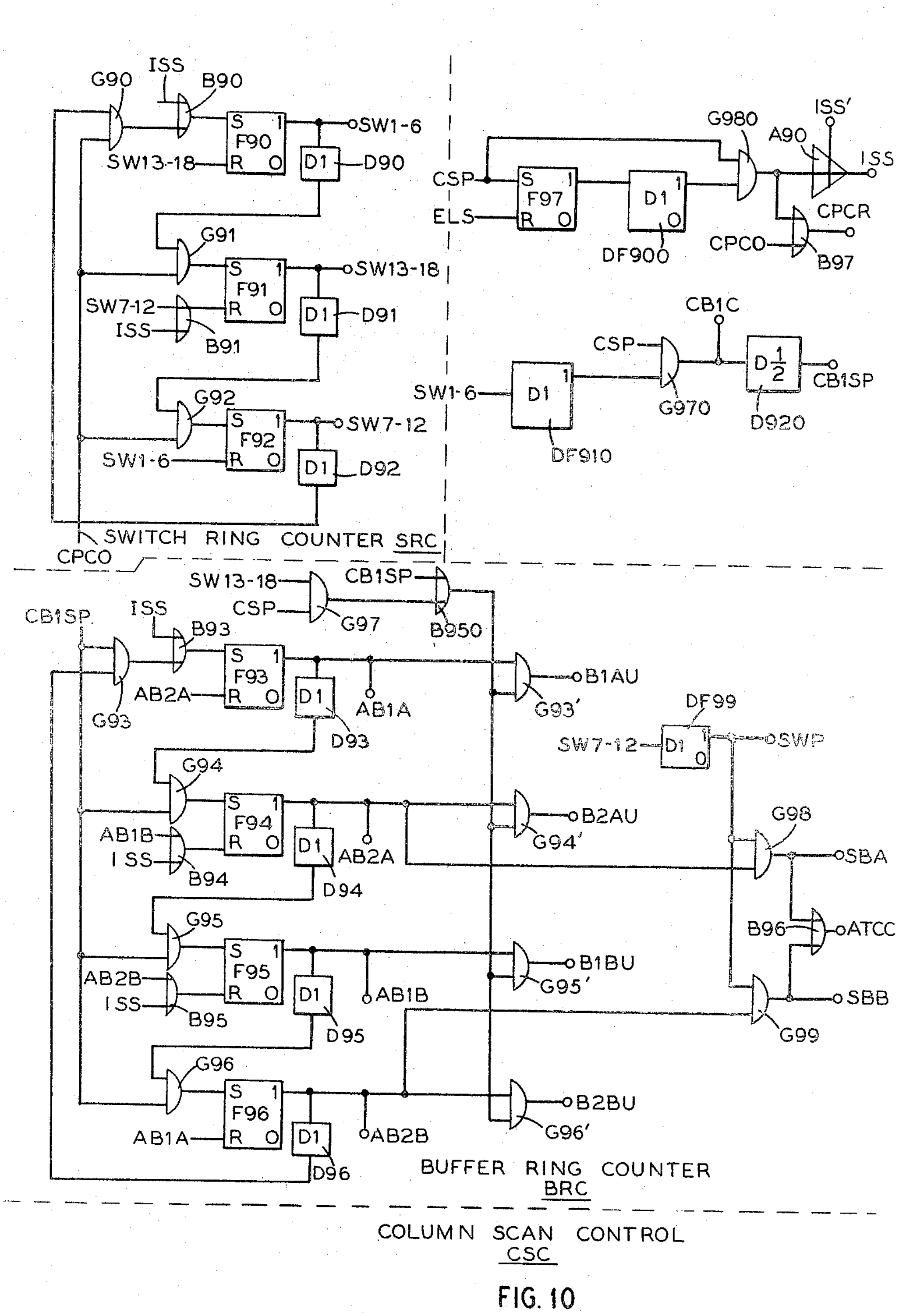
FIGURE 10 shows logically the column scan control of the character generator buffer.

Column scan control CSC shown in FIGURE 10 includes the switch ring counter SRC which is a three-stage ring counter which determines the different groups of six bits that are active during the column scans of a character block. Initially an ISS pulse fed via OR circuit B90 sets flip-flop F90. An ISS pulse fed via OR circuit B91 unsets flop-flop F91. When the flip-flop F90 is set it generates the SW1–6 signal which unsets flip-flop F92 and one pulse time later is fed from delay line D90 to the first input of AND gate G91. When the CPCO pulse occurs, it passes through AND gate G91 to set flip-flop F91 causing the generation of the SW13–18 signal which is fed to the reset input of flip-flop F90 causing it to unset. The SW13–18 signal relayed one pulse time by delay line D91, is fed to one input of AND gate G92. When the next CPCO pulse occurs it passes through AND gate G92 setting flip-flop F92 causing the generation of the SW7–12 signal which is fed via OR circuit B91 to the reset input of flip-flop F91 causing it to unset. Finally, when the third CPCO signal occurs the SW7–12 signal now at AND gate G90, causes this CPCO signal to pass through the AND gate and OR circuit B90 to set flip-flop F90 again generating the SW1–6 signal which is fed to the reset input of flip-flop F92 to unset the flip-flop F92. Therefore it is seen that the switch ring counter SRC is initially set to the SW1–6 signal state by the ISS signal and is sequentially stepped thereafter by the CPCO pulses.

The buffer ring counter BRC is a four-stage ring counter similar to the three-stage switch ring counter SRC. The initial state is with the flip-flop F93 set, and this is accomplished by the ISS signal fed via OR circuit B93 to the set input of this flip-flop. The flip-flops F94 and F95 are intially unset by the ISS signal fed respectively via OR circuits B94 and B95 to their reset inputs. Flip-flop F93 being set unsets flip-flop F96 via its reset input. Stepping of the buffer ring counter BRC is accomplished by the CB1SP pulses received respectively at inputs of the AND gates G93, G94, G95 and G96.

The outputs of the flip-flops F93 to F96 respectively control which of the buffers in the drum storage unit DSU is to transmit a character block at any given time. Accordingly, the 1 outputs of the flip-flops F93 to F96 inclusive are respectively connected to one input of the AND gates G93′ to G96′ respectively. Thus when the flip-flop F93 is set, the AND gate G93′ is alerted. It will be seen that the second input of each of the AND gates G93′ to G96′ inclusive is connected to the output of OR circuit B950. The first input of the OR circuit B950 is the CB1SP pulse which is used to transfer out the format blockette of each character block. The second input of the OR circuit B950 is the AND gate G97 which has a first input connected to the SW13–18 signal line and its second input connected to the CSP signal line. During this time the pattern blockettes, i.e., the column blockettes which actually contain the coded information for one column of the character to be recorded, its then to be made available and is accordingly gated out, for example, by the B1AU pulses.

The AND gate G98 generates a SBA pulse which is used by the assembly I/O register AIOR to initiate the loading of the A buffers. Accordingly, when the flip-flop F94 is set, the character block in the buffer 2A of the drum storage unit DSU is being unloaded to the code converter CK. During the end portion of this unloading, that is, when the blank columns at the end of the character are being recorded, the SWP pulse is also present at the AND gate G98, causing the generation of the SBA signal to permit the reloading of the A buffers. Similarly, when the buffer 2B is being unloaded, AND gate G99 during the presence of the SWP pulse, causes the generation of the SBB pulse which is utilized by the assembly I/O register AIOR to permit the reloading of the B buffers. The SWP pulse is generated by delay flop DF99 in response to the SW7–12 signal. The SBA or the SBB pulses will generate an ATCC pulse which when received by the interface IF will cause the computer C to transmit into the drum storage unit DSU the next two character codes which will be used by the drum storage unit DSU as heretofore described to locate on the magnetic drum MD the two character blocks which are to be loaded into the two available buffers.

The remaining circuitry of the column scan control CSC centers around the generation of the CB1SP pulse. As the SW1–6 signal is generated, it triggers delay flop DF910 which transmits a pulse of sufficient duration to permit the gating of the CSP pulse through AND gate G970 causing generation of a CB1C pulse which after a one-half pulse time delay by delay line D920 causes the generation of the CB1SP pulse.

Finally, the last piece of circuitry on the column scan control CSC is concerned with the generation of the ISS pulse and the CPCR pulse. The first CSP pulse that occurs at the start of any line, sets the flip-flop F97 and is also fed to one input of AND gate G980. The 1 output of flip-flop F97 triggers delay flop DF900 which transmits a pulse of sufficient duration to only pass this first CSP pulse through AND gate G980 causing the generation of the ISS and ISS′ pulses by amplifier A90. The OR circuit B97 transmits the CPCR signals and has one input connected to the output of AND gate G980 and a second input connected to the CPCO signal line. Therefore, during any line scan the first CPCR signal is effectively the ISS signal and all remaining CPCR signals are effectively the CPCO signals. When the end of a line is reached, the assembly I/O register AIOR transmits an ELS signal to the reset input of flip-flop F97 causing it to unset so that at the start of the next line the first occurring CSP pulse can generate another ISS pulse.

*Code converter—CK*

FIGURE 11 shows the code converter CK which includes a character block register CBR which receives the forty-eight bit column blockettes from the drum storage unit DSU during the presence of the SW13–18 signal from the column scan control CSC; a column clock which generates CEC pulses which are utilized to indicate the element positions in a column; a character block switch KBS which is basically a step counter which is used to control the transfer of selected groups of the bits stored in the character block register CBR to the element area locator EAL and to the element address locator EDL; an element address locator EDL which includes an element address counter which controllably counts CEC pulses to indicate the positions of the elements in a column, an element address comparator which compares the count accumulated by the element address counter with coded combinations of selected bits from the character block register CBR to indicate when an element is reached wherein the cathode ray tube beam is turned on; and an element area locator which includes an element area counter that controllably counts CEC pulses to also accumulate counts of the elements in different portions of the column being scanned and an element area comparator which compares this count with selected coded combinations of bits stored in the character block register CBR to indicate the number of elements that the cathode beam should remain on.

Before proceeding with the description, it is worthwhile recalling that each forty-eight bit character blockette except the format blockette comprises four, twelve-bit groups; each group defines a column segment within a column. The first seven bits locate the start or beginning element of a column segment and the next five bits indicate the number of elements in the column segment and each column comprises one hundred such elements.

Each CSP pulse from the line positioner LP is fed to the code converter CK where it clears the character block register CBR, clears the step counter in the character block switch KBS and clears the counters in the element area locator EAL and the element address locator EDL. When the SW13–18 signal is generated by the column scan control CSC, it effectively causes the drum storage unit DSU tc transfer pattern blockettes via the BO1 to BO48 signal lines to the character block register CBR with each CSP pulse. The CSP pulse which occurs with the onset of the SW13–18 signal clears the character block switch KBS to its first position wherein it starts generating the SC1–7 signal (shown generalized in the SCN–M cable) to the element address locator EDL, causing the transmission of the first seven bits of the pattern blockette via the CBR1 to CBR7 signal lines into one side of the comparator therein. The SC1–7 signal in the element address locator EDL opens a gate which will remain open for the entire column scan and permits the entry of CEC pulses into the element address counter therein. When comparison is reached, indicating the start of the column segment that is to be written, the element address locator EDL transmits an EDCO pulse and starts transmitting an ACG signal. The ACG signal will be used to turn on the electron beam in the cathode ray tube of the character generator CG. The EDCO pulse is fed to the character block switch KSB to step the counter therein to its second state, wherein it starts generating the SC8–12 signal and is fed into the element area locator EAL to clear the element area counter therein to zero. The SC8–12 signal permits the gating in of the second five bits of the first twelve bit group as the CBR7 to CBR12 signals into one side of the element area comparator in the element area locator EAL. The ACG signal also is fed to the element area locator EAL where after a slight delay, opens a gate which permits the entry of CEC pulses into the element area counter therein. When the count of the element area counter equals the coded combination of the CBR8 to CBR12 signals, comparison is reached and the element area locator EAL transmits an EACO pulse to the character block switch KBS which starts generating the SC13–19 signal. The EACO pulse is also fed to the element address locator EDL to terminate the generation of the ACG signal which shuts off the beam of the cathode ray tube. Accordingly, the first column segment is generated. The SC13–19 signal permits the gating in of the first seven bits of the second twelve-bit group in the character block register CBR as the CBR13–19 signals to one side of the comparator in the element address locator EDL and the location of the start of the second column segment progress. When coincidence is reached, the EDCO signal, in the aforedescribed manner, will cause the generation of another AGC signal, turning on the beam of the cathode ray tube and also step the step counter in the character block switch KBS to its fourth position as well as clearing the counter in the element area locator EAL so that the length of the second column segment can be determined in the same manner that the length of the first column element had been determined.

This process can continue for four cycles. When the counter in the element address locator EDL reaches the count of one hundred, it transmits a CRP signal to the cathode ray tube to initiate the retrace of the column scan. It should be noted that a column segment is never generated until the element address locator EDL reaches a coincidence. Therefore, the contents of the character block registers CBR will determine when column segments are to be recorded. In particular, it should be noted that when the blank columns are to be generated on each side of the pattern columns the character block register CBR contains all zeros and a coincidence can never be obtained by the element address locator EDL.

*Character block register—CBR*

Figure 13:
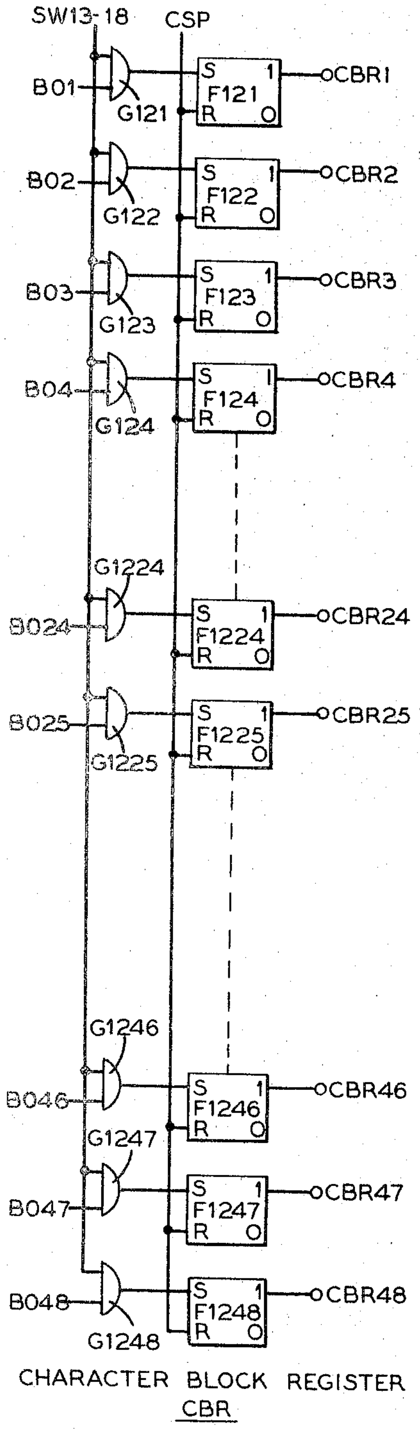
FIGURE 13 shows logically the character block register of the code converter.

The character block register CBR as shown in FIGURE 13 is a forty-eight bit flip-flop register which is used to store the pattern blockettes received from the drum storage unit DSU via the BO1 to BO48 signal lines. For the sake of simplicity not all of the forty-eight flip-flops are shown since they and their associated circuits are identical except for signal input and the signal output. A reset terminal of each of the flip-flops F121 to F1248 is connected to the CSP signal line so that at the start of the column scan the CSP pulse initially clears these flip-flops. A set input of each of the flip-flops F121 to F1248 is connected respectively to the outputs of AND gates G121 to G1248. A first input to each of these AND gates is the SW13–18 signal from the character generator buffer CGB which opens these gates only when pattern columns are to be generated, that is, when the pattern blockettes are being transferred from the drum storage unit DSU. The second input to each of the gates is one of the BO signals, for example, the BO2 signal is fed to AND gate G122 to set the flip-flop F122 which starts generating the CBR2 signal. The remaining flip-flops operate in the same manner.

*Character block switch—KBS*

Figure 12:
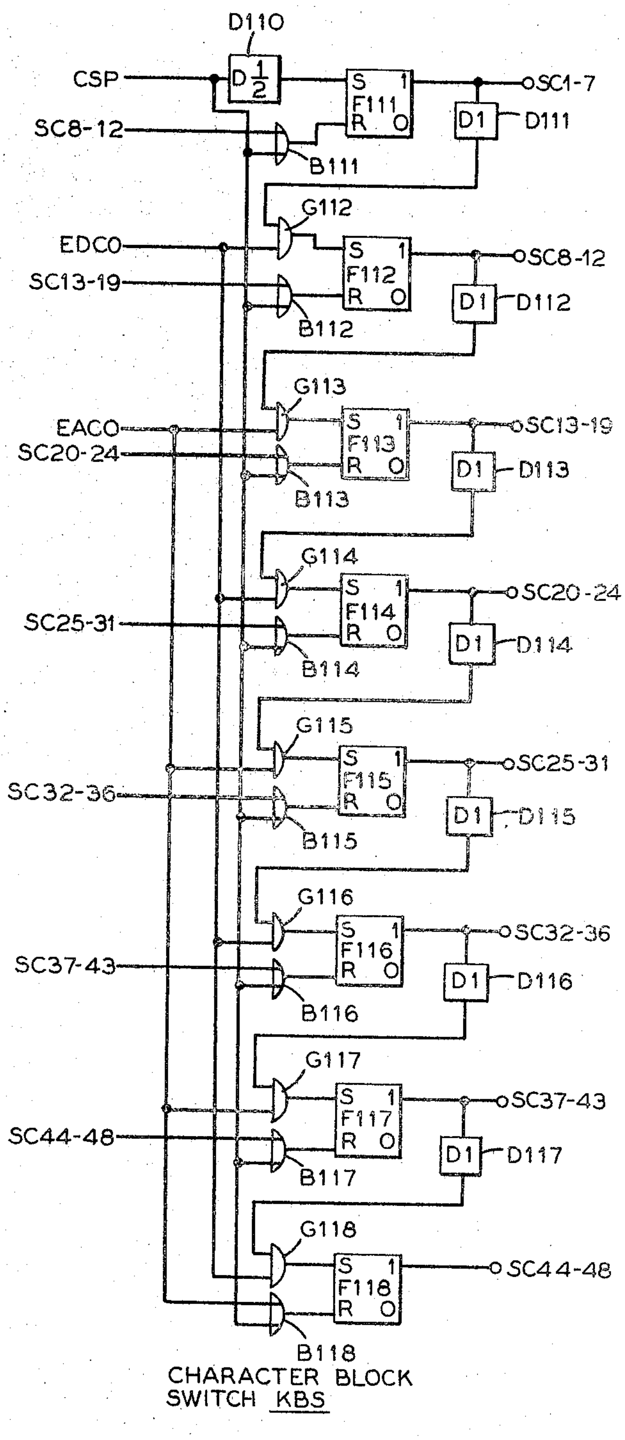
FIGURE 12 is a logical diagram of the character block switch of the code converter of FIGURE 11.

The character block switch KBS shown in FIGURE 12 is an eight-stage step counter, centered around flip-flops F111 to F118. At the start of each column scan a CSP pulse fed via one input of OR circuits B111 to B118 whose outputs are connected respectively to the reset inputs of the flip-flops F111 to F118 clears all of these flip-flops to their unset condition. The CSP pulse one-half pulse time later is transmitted via delay line D110 to the set input of flip-flop F111 which sets and starts generating the SC1–7 signal which is used to gate in the first seven bits of the pattern blockette stored in the character block register CBR into the element address locator EDL. When element address locator EDL reached coincidence, the EDCO signal is generated and cooperates with the SC1–7 signal fed via the one pulse delay line D111 at AND gate G112 to set flip-flop F112 which starts generating the SC8–12 signal that is used to gate the next five bits of the pattern blockette stored in the character block register CBR as the CBR8 to CBR12 signals into the element area locator EAL to initiate the next comparison. When coincidence is reached, the element area locator EAL generates an EACO pulse which cooperates with the SC8–12 signal fed via the one pulse delay line D112 to a second input of AND gate G113 to set the flip-flop F113 which starts generating the SC13–19 signal. The remainder of the character block switch KBS operates in the same manner, being alternately stepped by EACO and EDCO signals from the element area comparator EAL and the element address comparator EDL respectively.

*Element address locator—EDL*

Figure 14:
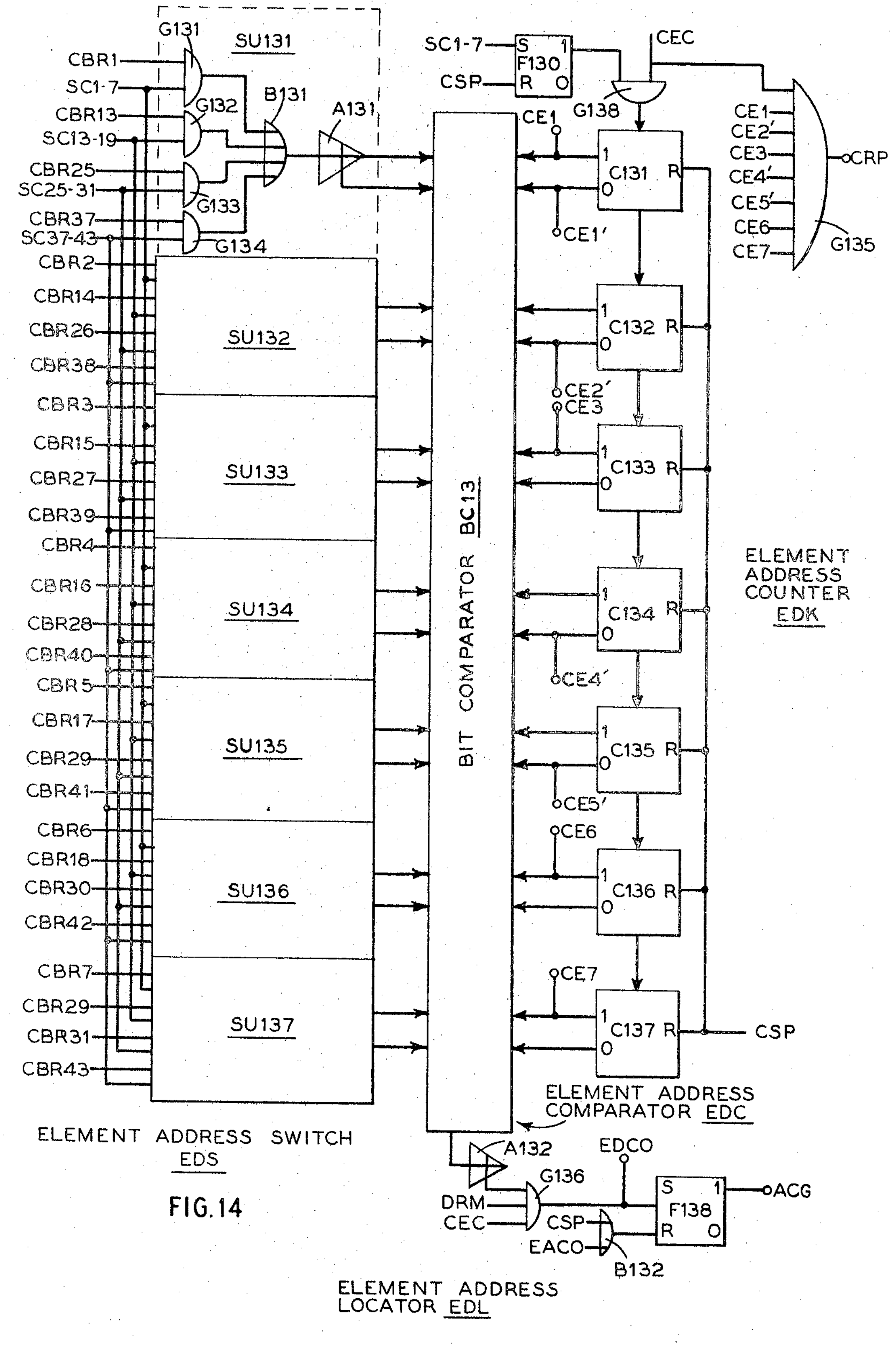
FIGURE 14 is in logical form the element address locator of the code converter.

The element address locator EDL shown in FIGURE 14 includes the element address counter EDK, the element address comparator EDC and the element address switch EDS.

The element address counter EDK is a seven-stage cascaded binary counter, including the binary counter stages C131 to C137 inclusive. Each CSP pulse at the start of a column scan is fed to the clear inputs of each of the binary counter stages so that the element address counter EKD starts out with a count of zero. When the SC1–7 signal is generated, it sets the flip-flop F130 whose 1 output alerts AND gate G138 and permits it to pass CEC pulses to the binary counter stage C131 and the element address counter EDK starts counting CEC pulses. The outputs of the counter stages are fed to the element address comparator EDC. Whenever the count reaches ninety-nine a particular coded combination of the CE1 to CE7 signals from the outputs of these counters representing the count of ninety-nine and the next CEC pulse causes a CRP pulse to pass from AND gate G135. The CRP pulse is fed to the cathode ray tube of the character generator CG to initiate a retrace of the column scan, i.e., vertical scan of the electron beam in the cathode ray tube. It should be noted that the next occurring CSP pulse will unset the flip-flop F130 to block the entry of CEC pulses into the binary counter stages. The CSP pulse occurs slightly before the SC1–7 signal that is used to set the flip-flop F130.

The element address switch EDS comprises the switch units SU131 to SU137 inclusive. Since each of the switch units is substantially identical except for the input and output signals, only the switch unit SU131 will be described in detail. The output of switch unit SU131 is from the conventional paraphrase amplifier A131, whose input is connected to the output of the four input OR circuit B131. The first input to the OR circuit B131 is the AND gate G131 which receives the CBR1 and SC1–7 signals. The second input to the OR circuit B131 is the output of AND gate G132 which receives the CBR13 signal at one input and the SC13–19 signal at its second input. The third input is the output of AND gate G133 which receives the CBR25 signal and the SC25–31 signal. While the fourth input is the output of AND gate G134 which receives the CBR37 signal at one input and the SC37–43 signal at its second input. The remaining switch units are similarly constructed, and will not be further described.

The element address switch EDS operates in the following manner. When the SC1–7 signal is generated, the CBR1 signal representing the first bit is transmitted in two phases from the output of switch unit SU131. The bit represented CBR2 signal is transmitted in both phases by the output of the SU132 signal to the element address comparator EDC. Similarly, the switch unit SU133 sends in two phases the bit represented by the CBR3 signal, etc. When the SC13–19 signal is present, the switch unit SU131 transmits the CBR13 bit in two phases from its output. The switch SU132 transmits two phases of the bit represented by the CBR14 signal from its output. The switch unit SU133 transmits the two phases of the CBR3 signal from its output, etc. Similar switching occurs during the presence of the SC25–31 signal and the SC37–43 signal.

The element address comparator EDC includes the bit comparator BC13 which is similar to the previously described bit comparators and compares the outputs of the switch units SU131 to SU137 with the outputs of the counter stages C131 to C137 respectively. As long as there is an inequality, the output of the bit comparator BC13 transmits a signal which is inverted by amplifier A132 that blocks AND gate G136. However, when coincidence or equality is detected, the signal disappears from the output of bit comparator BC13 and the output of amplifier A132 in the presence of the DRM signal permits a CEC pulse to pass through AND gate G136, generating the EDCO signal which sets flip-flop F138, which now generates the ACG signal. The flip-flop F138 will then be reset or cleared when the EACO signal is received from the element area locator EAL. The CSP signal fed to the second input of OR circuit B132 permits initial clearing at the start of each column scan.

*Element area locator—EAL*

Figure 15:
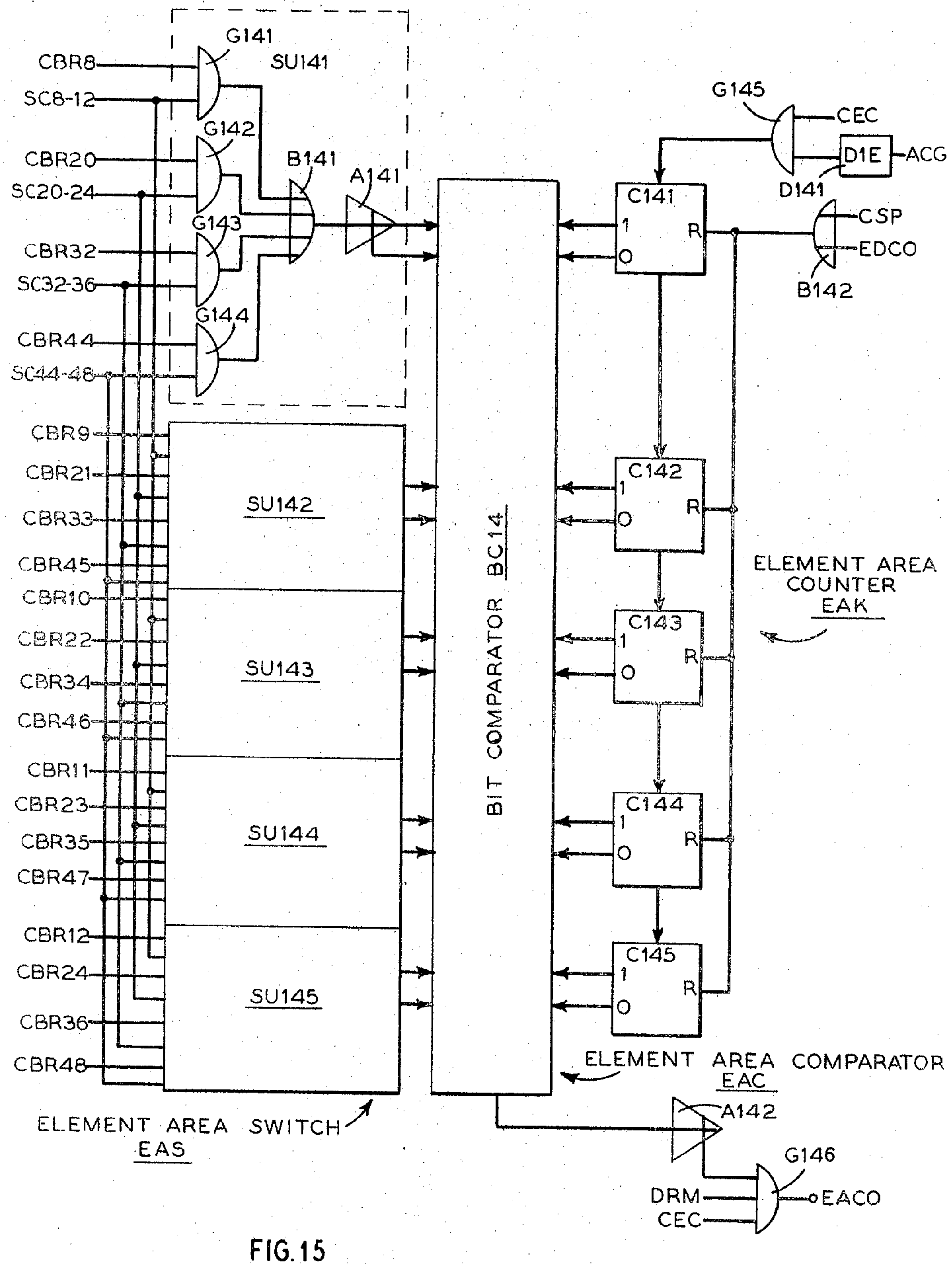
FIGURE 15 is a logical diagram of the element area locator of the code converter of FIGURE 11.

The element area locator EAL of FIGURE 15 comprises the element area counter EAK, the element area comparator EAC and the element area switch EAS.

The element area counter EAK includes the five stage cascaded binary counter comprising the counter stages C141 to C145 inclusive. At the start of each column scan the counter stages C141 to C145 inclusive are cleared by a CSP pulse passing through OR circuit B142 to their respective clear terminals. Whenever an element address coincidence is indicated by the element address locator EDL, it transmits an EDCO pulse which also clears the counter stages. One CEC pulse time thereafter the ACG signal from the element address locator EDL passes through the delay line D141 to open AND gate G145 which now starts transmitting CEC pulses to the input of counter C141 and the element area counter EAK starts counting CEC pulses. It should be noted that each time element address coincidence is obtained the element area counter EAK is cleared so that it will only count effectively the number of elements in a column segment.

The element area switch EAS is similar to the previously described element address switch EDS except that it includes only the five switch units SU141 to SU145. Each of the switch units SU141 to SU145 is similar to the switch units SU131 to SU137 of the previously described element address switch EDS, except for the inputs and the outputs. Therefore, the description will be limited to the functioning of the inputs and the outputs. When the SC8–12 signal is generated by the character block switch KBS, the switch unit SU141 transmits the bit represented by the CBR8 signal to the output of the switch unit SU141 in two phases. The switch unit SU142 at the same time performs the same function for the CBR9 signal. The switch unit SU143 performs the same function for the CBR10 signal, etc. When the SC20–24 signal is generated, the switch unit SU141 transmits the bit represented by the CBR20 signal to the output in two phases of the switch unit SU141. The switch unit SU142 transmits in two phases the CBR21 signal; the switch unit SU143, the CBR22 signal, etc. A similar phenomenon happens during the presence of the SC32–36 signal and the SC44–48 signal.

The element area comparator EAC comprises the bit comparator BC14 which is similar to the previously described bit comparators and compares the outputs of the switch units SU141 to SU145 respectively with the outputs of the counter stages C141 to C145. As long as coincidence or equality is not being sensed, the output of bit comparator BC14 transmits a signal which is inverted by amplifier A142 to block AND gate G146. However, when equality is attained, bit comparator BC14 no longer transmits a signal and the output of inverting amplifier A142 in cooperation with the DRM signal permits a CEC pulse to pass through AND gate G146 to become the EACO signal indicating coincidence has been obtained. It should be noted that the next CEC signal that passes through AND gate G145 destroys the coincidence. Therefore only one CEC pulse is passed by AND gate G146.

*Assembly I/O register—AIOR*

FIGURE 16 shows the assembly I/O register AIOR connected to the interface IF. The assembly I/O register AIOR includes the control character register CCR which is a six-stage flip-flop register for storing the control words received as the CB1 to CB6 signals from the interface IF and further includes decoding circuitry for decoding the combinations of the bits of the control words to control signals used throughout the system. Also included in the assembly I/O register AIOR is the assembly register switch ARS which is an eight-stage ring counter which controls the switching of the information words (coded combinations of the IB1 to IB6 signals) to portions of the assembly register AR, and which generates ARCD pulses for clearing the assembly register AR. The assembly register AR is a forty-eight bit flip-flop register comprising eight, six-bit sub-registers which receive the information words six bits at a time via the IB1 to IB6 signal lines under the control of the assembly register switch ARS.

The interface IF transmits control words as combinations of CB1 to CB6 signals to the control character register CCR which when strobed by an ACCD pulse from the interface IF decodes these signals to generate control signals used throughout the system. During the drum writing mode the interface IF transmits a coded combination of CB1 to CB6 signals which when received by the control character register CCR, generates the DWM signal, lasting throughout the entire drum write mode. The next control words received from the interface IF cause the unsetting of the TFO′ signal if it had at any time previously been set. The next control word received from the interface IF causes the generation of the ABA signal. The next control word received is decoded to generate the 1SCR signal and the 1SCP pulse. The 1SCR signal will be used to select the first character code register in the drum storage unit DSU to receive the character code indicating the address where the first character block is to be stored. The 1SCP pulse is fed to the assembly register switch ARS, causing the generation of ARC and ARCD pulses. The ARCD pulse is fed to the assembly register AR to clear the flip-flops therein. The ARC and ARCD pulse clears the ring counter in the assembly register switch ARS to its eighth state, that is, when it generates the ARS43–48 signal. The computer C then transmits the first six-bit information word via the ICO signal lines and an IR signal to the interface IF. The interface IF in response to the IR signal transmits an ARSP pulse to the assembly register switch ARS which is stepped to its first state wherein it generates the ARS1–6 signal that is fed to the assembly register AR. Shortly thereafter the interface IF transmits a coded combination of IB signals to the assembly register AR. The presence of the ARS1–6 signal causes the gating in to the first sub-register of the assembly register AR, the bits present on the lines IB1 to IB6. The interface IF then transmits in the same way the next six-bit information word to the assembly register AR. The ARSP that occurs just prior to the transfer steps the ring counter in the assembly register switch ARS to its second state wherein it starts generating the ARS7–12 signal and the second information word is gated into the second sub-register. Two pulse times thereafter the assembly register switch ARS transmits an ARS7D signal to the control character register CCR, terminating the 1SCR signal. Prior to the time the 1SCR signal is terminated, the AR1 to AR9 signals were transmitted to the first character code register in the drum storage unit DSU.

The interface IF then transmits a control word (a combination of CB1 to CB6 signals) which are decoded to generate the FAR signal which will be fed to the drum storage unit DSU to clear the buffer 1A therein to accept the first character blockette in its first column position. The FAR signal is also fed to the assembly register switch ARS to clear the step counter therein to its eighth position in the same way that the 1SCP signal had done previously by causing the generation of ARC and ACRD pulses. The ARC pulse delayed (ARCD) clears the assembly register AR. The interface IF now transmits eight six-bit information words via the line IB1 to IB6 to the assembly register AR simultaneously witht he generation of the ARSPD pulses. One-half pulse time earlier, ARSP pulses are fed to the assembly register switch ARS which in response thereto generates sequential ARS signals that allow transfer the eight six-bit information words into sequential sub-registers. After the first group of eight six-bit information words have been transferred by the interface IF, the assembly register switch ARS will have stepped to its eighth position. As it steps to its eighth position the ARF signal is generated which is fed to the drum storage units DSU which allows the contents of the assembly register AR to be accepted via the AR1 to AR48 signal lines into the first column of the buffer 1A. The ARF signal also generates an ARC and ARCD signal just as the FAR signal did. The interface IF continues transmitting continuous groups of eight six-bit information words which are loaded in the assembly register AR in the manner described above. This process continues until the entire character block has been loaded. The control computer C then allows sufficient time for the read-write relays to settle in the write position. At this time, the interface IF transmits a coded combination of CB1 to CB6 signals which causes the control character register CCR to generate an ATD signal which is fed to the drum storage unit DSU to initiate the transfer of the contents of the buffer 1A onto the magnetic drum in the address indicated by the information stored in the first character code register.

The next character block is transferred in the usual manner starting with the interface IF transmitting a coded combination of CB1 to CB6 signals that cause the generation of the DWM signal. The process continues until the magnetic drum is completely loaded with the character blocks as indicated by the transmission of a coded combination of CB1 to CB6 signals (control word) which terminates the DWM and initiates the DRUM signal, starting the drum reading mode.

Following the start of the drum reading mode, the interface IF transmits a coded combination of CB1 to CB6 signals that cause the control character register CCR to generate an ABA signal which is fed to the drum storage unit DSU, for indicating that the A buffers therein will be loaded with character blocks. This is followed by a coded combination of CB1 to CB6 signals, depending on whether two fonts of four fonts have been written, which will cause the generation of the TFO' signal, if only two fonts have been recorded on the drum. The interface IF then transmits a coded combination of CB1 to CB6 signals which when decoded cause the generation of an SLPP pulse and the SLP signal which is used to alert the line position register in the character generator buffer CGB to receive the address for the first line to be recorded on the film. The SLPP pulse is used to clear the line position register, and is also fed to the assembly register switch ARS to cause the generation of an ARCD signal which clears the assembly register AR and an ARC signal which sets the ring counter in the assembly register switch ARS to its eighth position as previously described. Two six-bit information words are then transferred sequentially from the interface IF via the IB1 to IB6 signal lines to the assembly register AR where they are loaded in the first and second sub-registers in the usual, previously described manner. After the second six-bit word has been loaded, the assembly register switch ARS transmits an ARS7D signal to the control character register CCR to terminate the SLP signal. However, just prior to its termination the AR1 to AR11 signals are captured by the line position register in the character generator buffer CGB. The interface IF then transmits a coded combination of CB1 to CB6 signals which are decoded to the 1SCR signal which performs its usual function. Following this control word, two six-bit information words are transferred by the interface IF and are loaded in the assembly register AR in the usual manner. After the second word has been loaded, the assembly register AR has its contents transferred to the first character code register of the drum storage unit DSU. The assembly register switch ARS thereafter transmits an ARS7D signal to the control character register CCR to terminate the 1SCR signal. The interface IF then transmits a control word to the control character register CCR which causes the generation of the 2SCR signal and the 2SCP pulse. The 2SCR signal is used to alert the second character code register in the drum storage unit DSU to receive the address of the storage register containing the next character block. Accordingly, the interface IF then transmits two information words to the assembly register AR in the usual manner and these two words are transferred to the second character code register. At this time then, the first character code register contains the address of the first character block to be read into the buffer 1A and the second character code register contains the address of the second character block to be read into the buffer 2A and the drum storage unit DSU proceeds to perform the transfers. The control computer C allows sufficient time for the transfers to take place.

The interface IF then transmits a control word which is decoded to the ABB signal to alert the B buffers in the drum storage unit DSU to receive the next two character blocks. The interface IF then transmits a control word which causes the generation of the 1SCR signal which performs its usual functions, resulting in the address for the third character block being stored in the first character code register. This is followed by the interface IF transmitting a control digit causing the generation of the 2SCR signal which performs its previously described functions, followed by two information words which are loaded in the assembly register AR. These two information words are the address for the fourth control block which will be loaded in the buffer 2B. The control computer C then transmits an external function word which interlocks the interface IF. From this point on, the control computer C cannot transmit character codes until the interface IF is unlocked when it receives an ATCC signal from the character generator buffer CGB as is hereinafter described.

Each time the interface IF is unlocked, the computer C will respond by first transmitting a control word causing the generation of the 1SCR signal which performs its usual functions followed by two information words forming the character code. This is followed by another control word causing the generation of the 2SCR signal followed by two information words comprising the next character code which are respectively loaded into the first and second character code registers.

This process continues until the interface IF transmits a control word which occurs just prior to the transfer of the character code for the last character to be printed on the line. The control word is fed to one of the control character registers CCR1 or CCR2, hereinafter called control character register CCR for simplicity, which generates the ELA signal indicating that the end of the line will be reached after the next character code is transmitted. After the next character code is transmitted and the character block associated with that character code is transferred to the code converter CK the control character register CCR in response to a SW7–12 signal from the character generator buffer CGB and one of the ABNN signals from the character generator buffer CGB will cause the generation of an ELS signal which ends the column scan cycles.

The next line is set up in the same manner as the above described line, starting with a control word which generates the DRM signal. When the last line of the page is being recorded, a control word in place of the control word which causes the generation of the ELA signal is received by the control character register CCR from the interface IF causing the generation of the ELA and EPA signal. The latter causes the generation of an EOP signal when the ELS signal is usually generated. The ELS signal performs its usual function and the EOP signal is fed to the character generator buffer CGB to clear the line position counter therein so that a new line count can be started for the next page. When the end of the job or run is reached, a control word in place of the control word that caused the generation of the ELA signal is transmitted to the control character register CCR causing the generation of the usual ELA signal, and an ERA signal. Accordingly, when the usual ELS signal pulse is generated, it cooperates with the ERA signal to set an alarm indicating that the run or job is over and also generates an EOP signal which performs as described above.

*Assembly register—AR*

Figures 17, 18:
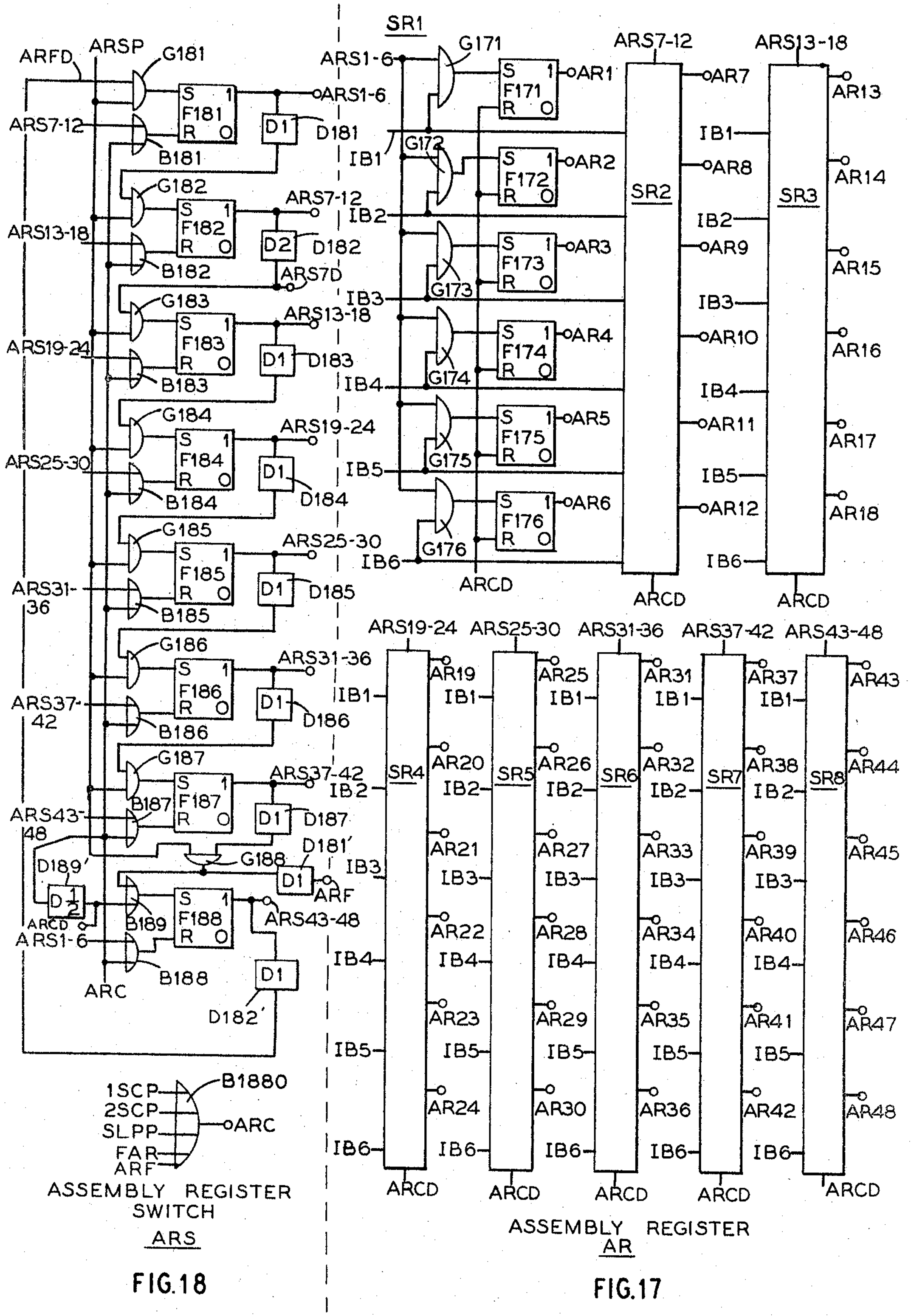
FIGURE 17 is a logical diagram of the assembly register of FIGURE 16.
FIGURE 18 is a logical diagram of the assembly register switch of FIGURE 16.

The assembly register AR shown in FIGURE 17 comprises eight six flip-flop sub-registers, SR1 to SR8. Each of the sub-registers will receive an information word comprising a coded combination of the IB1 to IB6 signals under the control of signals from the assembly register switch ARS.

Since each of the sub-registers SR is substantially identical except for inputs and outputs, only the sub-register SR1 will be described in detail. The sub-register SR1 comprises the six flip-flops F171 to F176 inclusive. The reset input of each of these flip-flops is connected to the ARCD signal line from the assembly register switch ARS. Each of the set inputs of the flip-flops is connected to a two input AND gate such as the AND gate G171 whose output is connected to the set input of flip-flop F171. Each of the AND gates G171 to G176 inclusive receives an ARS1–6 signal from the assembly register switch ARS whenever an information word is to be entered into the sub-register SR1. The second inputs of the AND gates G171 to G176 inclusive are the IB1 to IB6 signal lines respectively. Accordingly, the flip-flop F171 stores the least significant bit of the information word and when set, generates the AR1 signal. Likewise, for example, the flip-flop F174 receives the bit represented by the IB4 signal and when set, transmits the AR4 signal from its ones outputs terminal.

The remaining sub-registers are identical except that instead of being alerted by the ARS1–6 signal, each is alerted by a different one of the ARS signals. For example, the sub-register SR2 which receives the second information word is alerted by the ARS7–12 signal and will transmit the AR7 to AR12 signals respectively, etc.

*Assembly register switch—ARS*

The assembly register switch ARS shown in FIGURE 18 is basically an eight-stage ring counter comprising the flip-flops F181 to F188. It operates in the same way as the previously described ring counters. The ring counter is initially cleared by an ARC signal generated by OR circuit B1880. The ARC signal is fed to one input of each of the OR circuits B181 to B188 inclusive which feed the reset inputs of the flip-flops F181 to F188. The ARC signal is also fed to the half pulse time delay line D189′ to become the ARCD signal. The ARCD signal is fed to the OR circuit B189 to the set input of flip-flop F188 causing the ring counter to be initially set to its eighth state wherein it generates the ARS43–48 signal. However when the first information word is received an ARSP signal is received by the assembly register switch ARS and is fed to one input of each of the AND gates G181 to G188 inclusive. The ARSP signal cooperating with the output of flip-flop F188 or the ARS43–48 signal is delayed one pulse time via delay line D182′ and causes the setting of the flip-flop F181 which starts generating the ARS1–6 signal which is fed via OR circuit B188 to unset the flip-flop F188. Therefore, as the first information word is received the ring counter is stepped to its first state. The ARS1–6 signal as previously described is fed to the sub-register SR1 of the assembly register AR to alert it to receive the first information word. When the next information word is received the ARSP signal is again received from interface IF; this time, causing the setting of the flip-flop F182 and the unsetting of the flip-flop F181. When the flip-flop F182 is set, it starts generating the ARS7–12 signal which will be used to alert the sub-register SR2 to receive the second word. In this manner the assembly register switch ARS is sequentially stepped and controls which sub-register SR receives the information word.

It should be noted that the output of delay line D182 generates the ARS7D signal which is used in the control character register CCR to terminate certain control signals as hereinafter described. Also it should be noted that the output of AND gate G188, delayed one pulse time by delay line D181′, becomes the ARF signal which is fed to the drum storage unit DSU to control the loading of the buffers therein with character blocks and which is also fed to B1880 to generate the ARS signal. In particular, the ARF signal will be generated only after the eighth stage of the ring counter has been set. That is, only after all eight sub-registers SR of the assembly register receive information. At that time the forty-eight bit pattern blockette stored in the assembly register AR will be transferred to one of the buffers in the drum storage unit DSU.

Finally, the OR circuit B1880 whch generates the ARC signal has five inputs. The first input, the 1SCP pulse from the control character register CCR permits clearing of the assembly register AR and the resetting of the assembly register switch ARS when a character code is to be transmitted to the drum storage unit DSU; similarly for the 2SCP pulse. The SLPP pulse from the control character register CCR clears the assembly register AR and resets the assembly register switch ARS when the line position word is to be fed to the line position register of the character generator buffer CGB. The FAR signal received from the control character register CCR causes the clearing of the assembly register AR and the resetting of the assembly register switch ARS prior to the transfer of the information words during the drum write mode. The ARF signal which is generated just after the ARS43–48 signal or flip-flop F188 is set, causes the clearing of the assembly register AR and the resetting of the assembly register switch ARS after the transfer of each group of the eight six-bit information words during the drum write mode. It therefore behaves like the FAR signal, but is generated internally in the assembly register switch ARS whereas the FAR signal is generated by a control word from the computer C.

*Control character register—CCR*

The control character register CCR includes the six-stage flip-flop register comprising flip-flops F191 to F196 inclusive, which respectively receive control words via the CB1 to CB6 signal lines from the interface IF at their set input terminals and generate the CCR and CCR' signals. The flip-flop register is cleared after the receipt of the control word by the OR signal. The output of the flip-flop register is fed to the decoding circuitry which generates the control signals used throughout the system. The decoding circuitry centers around the flip-flops F197 to F1916 inclusive and the decoding AND gate G191. The flip-flop F198 which indicates either the drum write mode by the DWM signal or the drum read mode by the DRM signal is set by the decoding AND gate G194 which decodes a particular decoded combination of the outputs of the flip-flops G191 to F196 under the control of a strobe signal ACCD from the interface IF. Similarly, the flip-flop F198 is unset by the decoding AND gate G195 which decodes another combination of the outputs of the flip-flops of the register. The flip-flop F199 which generates the 1SCR signal controlling the loading of the first character code register in the drum storage unit DSU, is set by the output of the decoding AND gate G196 which also generates a 1SCP signal and is used to clear the assembly register AR and the ring counter in the assembly register switch ARS. The flip-flop F1910 is set by a coded combination of CCR signals received by the decoding AND gate G197 which generates the 2SCP signal which performs the same function as the 1SCP pulse and also sets the flip-flop F1910 which generates the 2SCR signal concerned with loading of the second character code register in the drum storage unit DSU. The flip-flop F1911 is set by the decoding AND gate G198 which transmits an SLPP signal which is fed to the assembly register switch ARS to perform the same functions as the 1SCP and 2SCP pulses and also sets the flip-flop F1911 which generates the SLP pulse which is fed to the character generator buffer CGB to alert the line position register therein to receive the word representing the position of the next line. The flip-flops F199, F1910 and F1911 are all unset by the ARS7D signal from the assembly register switch ARS. The ATD signal generated by the flip-flop F1912 is used to control the transfer of the character blockettes stored in the buffers to the magnetic drum storage unit DSU. The flip-flop is cleared by the 1CCRR signal from the drum storage unit DSU when the address of the register wherein the character block is to be stored has been located. The flip-flop F1913 is set by the output of OR circuit B196 whose inputs are AND gate G1910, G1913 and G1914, each of which generates the ELA signal which alerts control circuitry hereinafter described to indicate the end of a line. The flip-flop F1914 is set by the output of OR circuit B194 which receives at one input the SBA signal from the character generator buffer CGB and at its second input the output of decoding AND gate G1911 and is unset by a signal from the OR circuit B194' which has a first input connected to the SBB signal from the character generator buffer CGB and a second input from the decoding AND gate G1912. The flip-flop F1914 when set, generates the ABA signal and when unset generates the ABB signal which performs the function of selecting which of the pairs of buffers, that is the A buffers or the B buffers, is to receive character blocks from the magnetic drum in the drum storage unit DSU and which is to transfer character blocks to the character generator buffer CGB and code converter CK. The decoding AND gate G191 generates the FAR signal when it receives a particular coded combination of the outputs CCR1 to CCR6 of the storage register flip-flops and is fed to the drum storage unit DSU to clear the column selection counters therein to their zero count prior to receiving information. It also goes to the assembly register switch ARS.

A flip-flop F197 is set by the decoding AND gate G192 and unset by a decoding AND gate G193 to indicate when two or four type fonts are stored on the magnetic drum. When the flip-flop F197 is unset, the TFO' signal is not present and when set the TFO' signal is present and is used in the drum storage unit DSU to disable certain portions of the address comparators therein to prevent sector selection when only two fonts are being employed.

The flip-flop F1915 is set by the decoding AND gate G1913 to generate the EPA signal, indicating the end of page is being reached. Similarly, the flip-flop F1916 is set by the decoding AND gate G1914 to generate the ERA signal, indicating the end of the run or job is being reached. When either of the EPA or ERA signals are generated the ELA signal is also generated and the ELS pulse occurs as hereinafter described, either the AND gate G1915 or the AND gate G1916 transmits via the OR circuit B195 an EOP signal which is used to clear the line position counter in the character generator buffer CGB. Furthermore, the AND gate G1916 when it transmits a signal, will also set the alarm A indicating the end of the job.

The remainder of the control character register CCR centers around the circuitry which generates the ELS signal. It will be recalled that the computer C prior to the transmission of the last character code associated with a line, transmits a control word indicating that the following information words constitute the character code for the last character to be recorded on a line. Since the control computer C does not know which of the buffers in the drum storage unit DSU will receive the character block associated with this character code, it is necessary to establish means for indicating when the character block is transferred. Accordingly, the circuitry includes the flip-flops F1917 to F1920, having their set inputs respectively connected to the AND gates G1927 to G1930 inclusive. Each of the AND gates has one input connected to the ELA signal line so that it is alerted whenever the ELA signal is generated in response to the decoding of the control words indicating that the end of the line is being reached. A second input of the AND gates G1927 and G1929 receives the ABA signals indicating that the A buffers are receiving character blocks. Similarly the AND gates G1928 and G1930 receive the ABB signal to indicate that the B buffers are receiving the character blocks. Furthermore the AND gates G1927 and G1928 have their third inputs connected to the 1SCR signal line indicating that either the buffer 1A or the buffer 1B is receiving the character blocks and similarly the AND gates G1929 and G1930 receive the 2SCR signal which indicates that the buffer 2A or the buffer 2B is receiving a character block. Consequently when the last character is received one of the AND gates G1927 to G1930 will pass a pulse which sets its associated flip-flop. Each of the flip-flops F1927 to F1930 effectively then remembers in which buffer the last character of the line was loaded. Consequently when the last character of the line is to be read out of its buffer, the AB1A, AB1B, AB2A or AB2B signals will be present at one of the AND gates G1937 to G1940 inclusive and when the space columns to the trailing side of the character are recorded, indicated by the SW7–9 signal, it is known that the character has finally been scanned onto the cathode ray tube. Accordingly, one of these AND gates G1937 to G1940 will pass a pulse via the OR circuit B193 and amplifier A193 to generate the ELS signal and one pulse time thereafter the ELSD signal is transmitted from delay line D192. The ELS signal is used to sample AND gates G1915 and G1916 and the ELSD signal is used to clear the flip-flops F1917 to F1920 as well as the flip-flops F1913, F1915 and F1916 if they had been set by the end of line, end of page, or the end of run signals. The ELS' signal is fed to the interface IF to inhibit an ATCC signal from the character generator buffer CGB as is hereinafter described.

*Interface—IF*

The interface IF shown in FIGURE 20 provides the connection between the computer C and the remainder of the system. It includes circuitry for informing the computer C when it can receive a data word by acknowledging the receipt of a previously received word, and circuitry for determining whether the received data word is an information word or a control word and transmitting it to the assembly register AR or the control character register CCR respectively.

At the start of any job the computer C will transmit an MC signal which passes through OR circuit B200 to become the INITIAL CLEAR signal that is fed to every flip-flop and binary counter in the pattern generator to clear it to its unset state.

The computer C will then transmit words via the CO signal lines to the interface IF. These words will be either external function words which are accompanied by FR signals or data words which are accompanied by IR signals. The data words are coded combinations of the ICO1 to ICO7 signals. Data words are indicated as information words when the ICO7 signal is present and as control words when the ICO7 signal is not present in the coded combinations. In any event, the computer C can only transmit one data word at a time and cannot transmit the next data word until it receives an acknowledgment that the word was received by the interface IF. The acknowledgment is performed by the OR signal from the interface IF. The computer C will only transmit one of two external function words; an inital selection of the pattern generator characterized by the ICO1, ICO10, ICO11 and ICO12 signals which occurs only at the start of each job; and an initiate interlock word characterized by the ICO2, ICO10, ICO11 and ICO12 signals which is periodically generated. Once the interlock is set, it prevents the return of OR signals from the interface IF to the computer C. The interlock is unset when an ATCC signal is received from the character generator buffer CGB. Whenever a control word is received it is transmitted as a coded combination of CB1 to CB6 signals with an ACCD signal to the control charatcer register CCR. Whenever an information word is received, the interface IF first transmits an ARSP pulse to the assembly register switch ARS and then transmits a coded combination of IB1 to IB6 signals to the assembly register AR.

The circuitry will not be described in connection with the selection of the pattern generator, the transmission of a control word, the transmission of an information word, the initiation of an interlock and the clearing of the interlock. Since in any job these are the only five conditions which occur.

The selection of the pattern generator is initiated by the receipt of the external function word to select the pattern generator. This associated FR signal passes through OR circuit B201 to trigger the delay flop DF200 which after two microseconds triggers delay flop DF201 which strobes AND gate G2015. Since the FR, ICO10, ICO11 and ICO12 signals are present the strobe pulse is fed to AND gates G2016 and G2017. The strobe pulse only passes through AND gate G2017 since the ICO1 signal is present and the ICO2 signal is absent. The output of AND gate G2017 passes through OR circuit G203 to set flip-flop F200 whose 1 output alerts AND gate G2014′ which will permit the interface IF to accept data words. In other words, as long as flip-flop F200 is set data words transferred by the computer C will be accepted by the interface IF. The output of AND gate G2017 is also fed via OR circuit B202 and delay line D201 to become an OR pulse which is fed to computer C to acknowledge the receipt of a word.

When a control word is transmitted a coded combination of ICO1 to ICO6 signals will be received at one input of the AND gates G200 to G205. There will be no ICO7 signal. The IR signal associated with this data word passes through AND gate G2014′ and OR circuit B201 to trigger the delay flop DF200 which after two microseconds triggers the delay flop DF201 which transmits a pulse. The pulse passes through AND gate G2014 since the IR signal is present. The output of AND gate G2014 passes through AND gate G2013 to become the ACCD pulse because the second input thereto receives a signal from the inverted output of amplifier A201 (the ICO7 signal is absent). The ACCD pulse strobes the second inputs to AND gates G200 to G205 which accordingly transmit CB1 to CB6 signals (a control word) to the control character register CCR for loading in a flip-flop register. The ACCD signal is also fed thereto to become a strobe pulse for the decoding AND gates therein. The pulse transmitted from AND gate G2014 is also fed via OR circuit B202 and delay line D201 to become after two pulse times the OR signal acknowledging receipt of the control word. The OR pulse in addition to being fed to the computer C is fed to the control character register CCR to clear the storage register therein.

During the transfer of an information word a coded combination of ICO1 to ICO6 signals will be present at an input of the AND gates G206 to G2011; the ICO7 signal will be present at the input to amplifier A201; and the IR signal is present at inputs to AND gates G2014′ and G2014. The generation of the pulse transmitted by AND gate G2014 is the same as that described during the reception of a control word by the interface IF as described above and will accordingly not be repeated.

The pulse emitted by AND gate G2014 passes through AND gate G2012 to become the ARSP pulse since its second input is receiving a signal from the non-inverting output of amplifier A201. The ARSP pulse in addition to being fed to the assembly register switch ARS to step the ring counter therein passes through the delay line D200 to strobe the AND gates G206 to G2011 which transmit an information word as a coded combination of IB1 to IB6 to the assembly register AR. Just as with the receipt of a control word the pulse emitted by AND gate G2014 passes through OR circuit B202 and delay line D201 to become the OR signal which performs its usual function of acknowledgment.

When an initiate interlock is to be performed the computer C transmits external function word comprising the ICO2, ICO10, ICO11 and ICO12 signals and the associated FR signal. The FR signal passes through OR circuit B201 causing the delay flop DF201 to generate a strobe pulse two microseconds later as previously described. The strobe pulse passes through AND gates G2015 and G2016 to unset flip-flop F200 removing the signal from the control input of AND gate G2014′ which becomes blocked. It cannot pass any subsequent IR signals and therefore no data words will be accepted by the interface IF. The pulse that unsets flip-flop F200 also passes through OR circuit B202 and delay line D201 to become the acknowledgment OR signal. If in response to the OR signal the computer C starts transmitting a data word the interface IF will not accept it since the associated IR signal cannot pass through AND gate G2014′ and the data word will wait on the lines ICO1 to ICO7 since no acknowledgment OR signal can be generated.

The interlock is cleared when the character generator buffer CGB transmits an ATCC signal indicating a pair of buffers in the drum storage unit DSU are available for loading. The ATCC signal passes through AND gate G2018 when the other input to the gate, the ELS′ signal is not present, to OR circuit B203 to set the flip-flop F200 which transmits a signal from its 1 output unblocking AND gate G2014′ and IR signals can pass therethrough and the interface IF will accept the data word waiting on lines ICO1 to ICO7.

At the end of a line, page or run, after the computer C has transmitted the last character code, it transmits an external function word which unsets the flip-flop F200 as previously described, thereby preventing the interface IF from receiving any further data words from the computer C. The computer C is then free to continue its own operation such as reading in a block of information from the edited data tape in preparation to outputting this information to the pattern generator.

Normally, the ATCC signal sets the flip-flop F200. When the last character on a line is scanned out by the character generator buffer CGB to the code converter CK, the ELS' signal is generated at the same time as the ATCC. The ELS' signal at AND gate G2018 blocks the ATCC signal from setting flip-flop F200. This prevents the interface IF from receiving any further data words from the computer C which is free to assume other duties.

At the start of a new line, page or run, the computer C will first have to generate an external function word as previously described, selecting the pattern generator prior to sending data words to the pattern generator.

*Character generator—CG*

The character generator CG shown in FIGURE 21 includes the film transport FTP comprising a scroll drive SD which moves a photosensitive film FLM past an optics system LENS which focuses the image of the cathode ray tube CRT onto the film FLM. The image on the face of the cathode ray tube CRT will be a line of characters oriented transverse to the movement of the film FLM.

The scroll drive SD can either be a continuous drive or a step drive. Recorded along one edge of the film are sprocketing indicia IND to indicate equal increments of film movement. The sprocketing indicia IND are sensed by a transducer TD which generates an RVFP signal for each indicium sensed. If the scroll drive SD is of the continuous operating kind, the sprocketing indicia IND could be magnetically recorded spots; the transducer TD a magnetic reading head with suitable amplifiers. If the scroll drive SD is a step drive, then the indicia IND could be prerecorded darkened areas and the transducer TD would be a photoelectric cell with suitable amplifiers on one side of the FLM with a shielded light source on the other side of the film FLM. If a continuous drive is employed the horizontal axis of the cathode ray tube CRT must be skewed with respect to the film.

The cathode ray tube CRT assemblage is of the type having at least accelerating electrodes, magnetic vertical deflection coils, magnetic horizontal deflection coils, a focusing electrode and a control grid. The accelerating electrodes are energized by the accelerating voltage source AVS. The vertical deflection coils are energized by the column deflection amplifier, CDA, which is a power amplifier. The column deflection amplifier CDA receives a square wave from the column drive generator CDG which is a conventional square wave generator, which is turned on to start the wave form by a CSP pulse and which is turned off to start the retrace by a CRP pulse. The square wave when received by the vertical deflection coil produces a current sawtooth which is used to deflect the electron beam.

The horizontal deflection of the electron beam is performed under the control of the line deflection amplifier LDA which may be a conventional power amplifier which receives a sawtooth signal from the triggered line sawtooth generator TLG. The conventional line dynamic focus control LDF receives the sawtooth waveform from the line deflection amplifier LDA and generates a waveform which is fed to the focusing electrode for correcting the electron beam focus as a function of deflection angle.

The line deflection amplifier LDA is driven by the triggered line sawtooth generator TLG which is a conventional non-free running triggered sawtooth generator which is turned on by the leading edge of the LPCO signal and is turned off to initiate the retrace by the trailing edge of the LPCO signal. The video signals on the AOG signal line are fed via the peaking amplifier PA, the clipper CPR, and the video amplifier restorer VAR to the control grid of the cathode ray tube CRT.

*Computer—C*

The computer C comprises a stored program general purpose computer having a multiregister core memory and at least two magnetic tape units. One tape unit carries the type font tape and the second tape unit the edited data tape. Table 1 below shows a typical tape block of the type font tape for one type font of a specific point size. Tables 2 and 3 below show typical tape blocks for the drum write mode wherein the type fonts are read from the type font tape and recorded on the magnetic drum of the drum storage unit DSU, and for the drum read mode wherein a typical line of character blocks are read from the magnetic drum and recorded as a line of characters on the film of the character generator CG. The operation of the general purpose computer is shown by means of the flow chart shown in FIGURE 22.

Before describing the operation of the computer C the set-up of Tables 1, 2 and 3 will be summarized:

(1) The left-hand column of each table indicates the number or sequential rank of the tape character within a tape block. The tape characters are available sequentially starting with tape character 001.

(2) The tape characters are recorded on the tapes in a six-bit parallel code as shown in the middle column of the tables. Associated with each six-bit parallel code there may be a seventh or transverse parity bit. This bit is not shown in the tables.

(3) The symbols of the middle column have the following meaning:

(a) 0=binary zero,
(b) 1=binary one,
(c) *M*=most significant bit of a unit of information (word, blockette, etc.), either binary zero or one,
(d) *L*=least significant bit of a unit of information (word, blockette, etc.), either binary zero or one,
(e) *B*=intermediate bit of a unit of information (word, blockette, etc.), either binary zero or one,
(f) *P*=longitudinal parity bit, either binary zero or one,
(g) *D*=band bit of character code (assigned by computer C),
(h) *S*=sector bit of character code (assigned by computer C).

(4) The general purpose computer reads a block of tape at a time into its internal memory and treats each two tape characters as one computer word wherein the odd-numbered tape character of a pair is the more significant half of the computer word and the even-numbered tape character of a pair is the less significant half of the computer word. Within a tape character the increase in bit significance is from right to left as shown in the headings of the middle columns of the tables.

(5) Each tape block of the type font tape (Table 1) stores the character block of a single character. All the characters of the same type font style are stored in sequential tape blocks with the characters of the smallest size of the type font style stored first, the characters of the next smallest of the same type font style next, etc. The type font styles are also stored sequentially with respect to each other. Tape characters 001 and 002 of each type font tape block are a numerical code indicating the type font style of the character block included therein. Tape characters 00 3and 004 of each type font tape block are a numerical code indicating the type font size.

Tape characters 005 to 012 of a tape block for the type font tape are the same for all such tape blocks and contain control words which are explained by the associated notes in Table 1.

Tape characters 013 to 016 of the tape block for the type font tape contain the character code associated with the character represented by the character block stored in the tape block. It should be noted that the six bits of tape character 014 and the least significant bit of tape character 016 give the location within a drum sector where the character block is to be stored and is preferably the same for like characters of each type font style and each type font size. The second (S) and third (D) least significant bits of tape character 016 indicate the sector and band wherein the character block is to be stored. These bits are assigned by the computer in response to the edited data tape. Tape characters 017 and 018 form a control word which is the same for all tape blocks of the type font tape. Tape characters 019 to 978 comprise the character block representing the character wherein tape characters 019 to 034 are the format blockette. Only characters 019 to 024 are required to represent the format blockette (an 18-bit word), the characters 025 to 034 are just padders to simplify the design of the system. There follows 59 groups of 16 tape characters wherein each group represents a pattern blockette. It should be noted that most characters will generally require less than 59 pattern blockettes. However 59 are recorded for each with padding blockettes following the required pattern blockettes to simplify the system. Tape characters 979 and 980 of each tape block of the type font tape store the same control word. This is followed by a longitudinal parity character and an inter-record gap.

(6) The first tape block of the edited data tape shown in Table 2 includes four groups of pairs of two tape characters used to select type font style and size. The first two characters of a group, for example, tape characters 01 and 02 are the numerical codes for the first desired type font style, and tape characters 03 and 04 are the numerical code for the type font size of the style indicated by characters 01 and 02. Thus, four different type fonts can be used. However, if only two fonts are desired then tape characters 01 to 04 will be the same as tape characters 05 to 08, and tape characters 09 to 12 will be the same as tape characters 13 to 16. It should be noted that these font style and size characters are recorded in increasing order of numerical magnitude. Tape characters 17 and 18 indicate the number of fonts for the job. Finally, tape character 19 represents the longitudinal parity for the tape block and is followed by an interrecord gap.

(7) The remainder of the tape blocks on the edited data tape are similar to the typical tape block shown in Table 3. Tape characters 01 to 08 are the same for all the edited data tape blocks for the same job and represent control words as indicated in the notes. It should be noted that if only two type fonts are being employed, then tape character 06 will be 001101. Tape characters 09 to 12 contain the address where the line is to start on the film and will generally be different for each line that the tape block is having recorded on film.

Tape characters 13 and 14 represent a control word which is the same for all such tape blocks. Tape characters 15 to 18 represent the character code of the first character to be recorded on the line and are variable. Tape characters 19 and 20 represent a control word and are the same for all such tape blocks. Tape characters 21 to 24 represent the character code of the second character to be recorded on the line and are variable. Tape characters 25 to 28 represent two control words indicated by the notes and are the same for all such tape blocks. Tape characters 29 to 32 represent a variable character code. Tape characters 33 and 34 represent a control word as indicated by the notes and are constant for the similar tape blocks. The character code represented by tape characters 35 to 38 is variable. Thereafter the tape characters are grouped into twelve character units. The first two characters of the group are the same for each such group and represent the indicated control word (see Note for tape characters 39 and 40). The next four characters represent a variable character code. The next two characters are constant and represent the indicated control word. (See Note for tape characters 45 and 46.) The last four characters of the group represent a variable character code.

The last twelve-tape character group is different. Tape characters $50+12n+01$ and $50+12n+02$ represent the indicated fixed control word. Tape characters $50+12n+03$ to $50+12n+06$ represent a variable character code. Tape characters $50+12n+07$ and $50+12n+08$ generally represent an End of Line Allow control word. However, if the line is the last line of the page an End of Page Allow control word will be represented. Similarly, if the line is the last line of the run or job an End of Run Allow control word will be represented. The tape characters $50+12n+09$ and $50+12n+10$ represent the fixed indicated control word. Tape characters $50+12n+11$ to $50+12n+14$ represent a variable character code. Finally, tape character $50+12n+15$ indicates the longitudinal parity for the block and is followed by an inter-record gap.

(8) In FIGURE 22 and the description below terms within parentheses indicate "the contents of." For example, $(B_o)$ means the contents of register $B_o$.

TABLE 1.—TYPICAL TAPE BLOCK OF TYPE FONT TAPE

| Tape Char. | Bit Code BA8421 | Notes |
|---|---|---|
| 001 | MBBBBB | Type font style (one of 4095 different styles). |
| 002 | BBBBBL | |
| 003 | 000000 | Type font size (one of 7 different sizes). |
| 004 | 00MBBL | |
| 005 | 000000 | Drum White Mode control word. |
| 006 | 000001 | |
| 007 | 000000 | Four font storage control word. |
| 008 | 001110 | |
| 009 | 000000 | Allow Buffer A control word. |
| 010 | 000011 | |
| 011 | 000000 | Select Character Code Register 1 control word. |
| 012 | 001011 | |
| 013 | 000001 | Information word for the first half of the Character Code. |
| 014 | BBBBBL | |
| 015 | 000001 | Information word for the second half of Character Code; D=0 0 and S=0. |
| 016 | 000DSM | |
| 017 | 000000 | Fill Assembly Register control word. |
| 018 | 001010 | |
| 019 | 000001 | Information word for first third of information of format blockette. |
| 020 | BBBBBL | |
| 021 | 000001 | Information word for second third of information of format blockette. |
| 022 | BBBBBB | |
| 023 | 000001 | Information word for third third of information of format blockette. |
| 024 | MBBBBB | |
| 025 | 000001 | Information word for padding out format blockette. |
| 026 | 000000 | |
| 027 | 000001 | Information word for padding out format blockette. |
| 028 | 000000 | |
| 029 | 000001 | Information word for padding out format blockette. |
| 030 | 000000 | |
| 031 | 000001 | Information word for padding out format blockette. |
| 032 | 000000 | |
| 033 | 000001 | Information word for padding out format blockette. |
| 034 | 000000 | |
| * | * | * * * |
| * | * | * * * |
| 963 | 000001 | Information word for first eighth of last pattern blockette. |
| 964 | BBBBBL | |
| 965 | 000001 | Information word for second eighth of last pattern blockette. |
| 966 | BBBBBB | |
| 967 | 000001 | Information word for third eighth of last pattern blockette. |
| 968 | BBBBBB | |
| 969 | 000001 | Information word for fourth eighth of last pattern blockette. |
| 970 | BBBBBB | |
| 971 | 000001 | Information word for fifth eighth of last pattern blockette. |
| 972 | BBBBBB | |
| 973 | 000001 | Information word for sixth eighth of last pattern blockette. |
| 974 | BBBBBB | |
| 975 | 000001 | Information word for seventh eighth of last pattern blockette. |
| 976 | BBBBBB | |
| 977 | 000001 | Information word for eighth eighth of last pattern blockette. |
| 978 | MBBBBB | |
| 979 | 000000 | Allow Transfer to Drum control word. |
| 980 | 000101 | |
| 981 | PPPPPP | Longitudinal Parity followed by inter-record gap. |
| etc. | | |

TABLE 2.—EDITED DATA TAPE

| Tape Char. | Bit Code BA8421 | Notes |
|---|---|---|
| 01 | MBBBBB | Type font style. |
| 02 | BBBBBL | |
| 03 | 000000 | Type font size. |
| 04 | 00MBBL | |
| 05 | MBBBBB | Type font style. |
| 06 | BBBBBL | |
| 07 | 000000 | Type font size. |
| 08 | 00MBBL | |
| 09 | MBBBBB | Type font style. |
| 10 | BBBBBL | |
| 11 | 000000 | Type font size. |
| 12 | 00MBBL | |
| 13 | MBBBBB | Type font style. |
| 14 | BBBBBL | |
| 15 | 000000 | Type font size. |
| 16 | 00MBBL | |
| 17 | 000000 | Number of type fonts used (two or four fonts): L=0 for two fonts; L=1 for four fonts. |
| 18 | 00000L | |
| 19 etc. | PPPPPP | Longitudinal Parity followed by inter-record gap. |

TABLE 3.—EDITED DATA TAPE

| Tape Char. | Bit Code BA8421 | Notes |
|---|---|---|
| 01 | 000000 | Drum Read Mode control word. |
| 02 | 000010 | |
| 03 | 000000 | Allow Buffer A control word. |
| 04 | 000011 | |
| 05 | 000000 | Four Font Storage control word. |
| 06 | 001110 | |
| 07 | 000000 | Select Line Position Register control word. |
| 08 | 000110 | |
| 09 | 000001 | Information word for first part of Line Address. |
| 10 | BBBBBL | |
| 11 | 000001 | Information word for second part of Line Address. |
| 12 | 0MBBBB | |
| 13 | 000000 | Select Character Code Register 1 control word. |
| 14 | 001011 | |
| 15 | 000001 | Information word for first part of Character Code. |
| 16 | BBBBBL | |
| 17 | 000001 | Information word for second part of Character Code. |
| 18 | 00MBB | |
| 19 | 000000 | Select Character Code Register 2 control word. |
| 20 | 001100 | |
| 21 | 000001 | Information word for first part of Character Code. |
| 22 | BBBBBL | |
| 23 | 000001 | Information word for second part of Character Code. |
| 24 | 00MBB | |
| 25 | 000000 | Allow Buffer B control word. |
| 26 | 000100 | |
| 27 | 000000 | Select Character Code Register 1 control word. |
| 28 | 001011 | |
| 29 | 000001 | Information word for first part of Character Code. |
| 30 | BBBBBL | |
| 31 | 000001 | Information word for second part of Character Code. |
| 32 | 00MBB | |
| 33 | 000000 | Select Character Code Register 2 control word. |
| 34 | 001100 | |
| 35 | 000001 | Information word for first part of Character Code. |
| 36 | BBBBBL | |
| 37 | 000001 | Information word for second part of Character Code. |
| 38 | 00MBB | |
| 39 | 000000 | Select Character Code Register 1 control word. |
| 40 | 001011 | |
| 41 | 000001 | Information word for first part of Character Code. |
| 42 | BBBBBL | |
| 43 | 000001 | Information word for second part of Character Code. |
| 44 | 00MBB | |
| 45 | 000000 | Select Character Code Register 2 control word. |
| 46 | 001100 | |
| 47 | 000001 | Information word for first part of Character Code. |
| 48 | BBBBBL | |
| 49 | 000001 | Information word for second part of Character Code. |
| 50 | 00MBB | |
| * | * | * * * |
| * | * | * * * |
| 50+12n+01 | 000000 | Select Character Code Register 1 control word. |
| 50+12n+02 | 001011 | |
| 50+12n+03 | 000001 | Information word for first part of Character Code. |
| 50+12n+04 | BBBBBL | |
| 50+12n+05 | 000001 | Information word for second part of Character Code. |
| 50+12n+06 | 00MBB | |
| 50+12n+07 | 000000 | End of Line Allow Control word. |
| 50+12n+08 | 000111 | |
| 50+12n+09 | 000000 | Select Character Code Register 2 controlk word. |
| 50+12n+10 | 001100 | |
| 50+12n+11 | 000001 | Information word for first part of Character Code. |
| 50+12n+12 | BBBBBL | |
| 50+12n+13 | 000001 | Information word for second part of Character Code. |
| 50+12n+14 | 00MBB | |
| 50+12n+15 etc. | PPPPPP | Longitudinal Parity followed by inter-record gap. |

The steps in operation of computer C will now be described with the aid of Tables 1, 2 and 3 and the flow chart of FIGURE 22.

(1) An operator mounts the type font tape TFT on tape unit 1TU1.

(2) The operator mounts the edited data tape EDT on tape unit 2TU2.

(3) The operator pushes the run button on the computer C.

(4) The computer C enters the sequence of operations shown in block B1 of the flow chart:

(a) An external function word 7002 is transmitted to the interface IF of the pattern generator PG to deselect it, i.e., render it insensitive to data words transmitted by the computer C;

(b) The edited data tape EDT and type font tape TFT are rewound to their load points;

(c) The computer C selects tape unit 2TU2 and reads into its core memory the tape block of the edited data tape EDT shown in Table 1. The eighteen tape characters of this block are loaded as nine computer words in nine registers, one word per register, of the internal memory starting with register $A_0$. Therefore consecutive registers $A_0$, $A_1$, . . . $A_8$ store the first tape block of the edited data tape EDT.

(5) Store 000000000000 in working storage, $B_0$. Only the two least significant bits have meaning. The $2^1$ bit is associated with the band bit of a character code, and the $2^0$ bit is assoicated with the sector bit of a character code. The program proceeds via path P1 to block B2 of the flow chart.

(6) Block B2 is concerned with reading in the first available tape block of the type font tape and comprises:

(a) Selecting tape unit 1 TU1 to operate and transfer a block of tape characters to the computer; and (b) Storing the 490 computer words represented by the block of tape characters in sequential storage registers of the core memory starting with register $C_0$ and ending in register $C_0+489$. The program proceeds via path P2 of the flow chart to block B3.

(7) Block B3 is concerned with comparing the numerical representation of the type font style called for by tape characters 01 and 02 of the edited data tape (Table 2) now stored in register $A_0$ with the numerical representation of the type font style for a character block represented by tape characters 001 and 002 of the type font tape (Table 1) now stored in register $C_0$. If the contents of register $C_0$ are less than the contents of register $A_0$ then the type font style has not been reached on the type font tape and the computer C returns via paths P5 and P16 to block B2 and continues starting with step 6 above. If, however, $(C_0)=(A_0)$, then the type font style has been located and it is necessary to compare with respect to type font size. If $(C_0)>(A_0)$ indicating that the last read in tape block of the type font tape starts a new style, the program proceeds via path P3 to block B10 and continues from Step 14 below.

(8) The routine of block B4 is concerned with locating the proper type font size once the proper type font style has been located and comprises comparing tape characters 03 and 04 of the edited data tape (Table 2) now stored in register $A_0+1$ with tape characters 003 and 004 of the type font tape (Table 1) now stored in register $C_0+1$. If $(C_0+1)$ are less than $(A_0+1)$ the proper type font size has not been reached on the type font tape and the program proceeds via paths P8 and P16 back to block B2 and reads in the next tape block of the type font tape. If $(C_0+1)=(A_0+1)$ then the proper type font size has also been found and the program proceeds via path P7 to block B5. If $(C_0+1)>(A_0+1)$ the last read in type font tape block was the last character block of the type font of the desired font style and size and the program proceeds via path P6 to block B10 and continues from Step 14 below.

(9) The routine of block B5 is concerned with assigning band D and sector S bits to the character code of the character block now stored in registers $C_0$ to $C_0+489$ which indicates where on the magnetic drum the character block is to be stored. The routine proceeds as follows:

(a) Substitute the least significant bit of ($B_0$), now 0 for the second least significant bit of ($C_0+7$) and the second least significant bit of ($B_0$), now 0, for the third least significant bit of ($C_0+7$), i.e., tape character 016 of the type font tape (Table 2) now stored in register $C_0+7$;

(b) Alert the pattern generator PG to accept data words by transmitting an external function word 7001 to the interface IF;

(c) Transfer a word at a time to interface IF sequentially the contents of registers $C_0+2$ to and including $C_0+488$;

(d) The computer C now marks time for five milliseconds to permit relays in the drum storage unit DSU to settle;

(e) Computer C then transmits the contents of register $C_0+489$ to the interface IF which will initiate the recording of the character block on the magnetic drum;

(f) The computer C then marks time for 20 milliseconds to permit the recording to be made; and (g) Transmits an external function word 7002 to interface IF to deselect the pattern generator PG.

Upon completion of this routine the program proceeds via path P9 to block B6.

(10) The routine of block B6 is a single step to determine whether a four font job or a two font job is called for and is performed by testing whether the least significant bit of tape character 18 of the edited data tape (Table 2) is a 1. If it is a 1 then the next tape block of type font tape must be read in. The program proceeds via path P11 and P16 back to block B2 of the flow chart and continues starting at Step 6 above. If it is a 0 then it is a two font job and it is necessary to insure that the character block is recorded on both sectors of a band, and the program proceeds via path P10 to block B7.

(11) The routine of block B7 is a single step which tests whether the least significant bit stored in register $B_0$ is 0 or 1. If 0, the character block has just been recorded for the first time on the magnetic drum and if 1 the character block had previously been recorded once and has just been recorded the second time on the magntic drum. At present the least significant bit of register $B_0$ is 0; therefore the program proceeds via path P12 to block B8.

(12) In block B8 the least significant bit of ($B_0$) is complemented, i.e., changed from 0 to 1 and the program proceeds via path P14 to block B5 and continues with Step 9 above. However this time 1 is transferred from the least significant bit position of ($B_0$) to the second least significant bit position of ($C_0+7$) and the same character block will now be recorded on the sector B of the first channel of the magnetic drum. When the program again reaches block B7 it will now proceed via path P13 to block B9.

(13) In block B9 the least significant bit of ($B_0$) is changed from 1 to 0 and the program returns via path P16 to block B2 and continues from Step 6 above. This routine continues until the first desired type font which was found is completely transferred from the type font tape to the magnetic drum as indicated by the program branching either from block B3 via path P3 or from block B4 via path P6 to block B10.

(14) In block B10 it is again determined whether a four font job is called for by determining if the least significant bit of ($A_0+8$) is 1. If it is 1, then the program proceeds via path P17 to block B11 wherein a binary 1 is added to ($B_0$). If it is 0, then the program proceeds via path P18 to block B12 wherein a binary 2 is added to ($B_0$). In either event the program then proceeds via either path P19 or path P20 to block B13.

(15) It will be recalled that ($B_0$) has been used to generate the band D and sector S bits of the character codes. See Step 9*a*. These bits range as follows:

$D=0$ and $S=0$; band 1, sector A
$D=0$ and $S=1$; band 1, sector B
$D=1$ and $S=0$; band 2, sector A
$D=1$ and $S=1$; band 2, sector B Therefore in a four font job, the four type fonts are recorded in order on band 1, sector A; band 1, sector B; band 2, sector A and band 2, sector B. In a two font job, the first type font is recorded first on band 1, sector A and then on band 1, sector B; and the second type font is recorded first on band 2, sector A and then on band 2, sector B. In either case, when the type font has been recorded on band 2, sector B, $(B_0)=4$ when the program has reached block B13 via path P19 or P20. Accordingly, block B13 tests to determine whether ($B_0$) are greater than or equal to 4. If ($B_0$) is less than 4 all the type fonts have not been recorded and the program proceeds via path P21 to block B3 and continues with Step 7 above. If ($B_0$) is greater than or equal to 4 all desired type fonts have been recorded and the Drum Write Mode ends with the program proceeding via path P22 to block B14 which starts the Drum Read Mode.

(16) The routine of block B14 is concerned with reading in the tape blocks (Table 3) of the edit data tape that result in the recording of lines of characters on the film of the character generator CG and proceeds as follows:

(a) The computer C selects tape unit 2 TU2 and reads the next tape block into sequential registers of its core memory starting with register $D_0$;

(b) As the registers are loaded the accumulator of the computer C counts the number of registers loaded and therefore has a count of the number of computer words read in. This count is stored in register $X_0$;

(c) The computer C transmits an external function word 7001 to the interface IF to alert the pattern generator PG to receive data words;

(d) The computer C then serially transmits the words stored in registers $D_0$ to $D_0+11$ to the interface IF. These are tape characters 01 to 24 of Table 3;

(e) The computer C now marks time for 20 milliseconds to allow the first two character blocks to be located on the drum and stored in buffer registers 1A and 2A;

(f) The computer C then serially transmits the words stored in registers $D_0+12$ to $D_0+18$ to the interface IF;

(g) The computer C then sets the pattern generator interlock by transmitting the external function word 7002 to the interface IF. The pattern generator PG will break the interlock when it is ready to receive six more words; and (h) The computer C stores 000000000000 in register $Y_0$. The program proceeds via path P23 to block B15.

(17) The routine of block B15 is to determine whether the last seven words stored in the storage registers $D_0$ to $D_0+(X_0)$ have been reached. If they have not, then the program proceeds via path P24 to block B16. If they have, the program proceeds via path P25 to block B17.

(18) Block B16 is concerned with transferring groups of six words to the interface IF and proceeds as follows:

(a) Transmits next six words sequentially to interface IF starting with register $D_0+19+(Y_0)$;

(b) Add 6 to the contents of register $Y_0$; and (c) Set the interlock of the pattern generator PG by transmitting the external function word 7002 to the interface IF. The pattern generator PG will break the interlock when it is ready to receive more data words. The program then proceeds via path P26 back to block B15 and continues with Step 17 above. This sub-routine loop continues until the test performed at block B15 results in a yes and the program then proceeds via path P25 to block B17.

(19) Block B17 merely transmits the last seven words to the interface IF and deselects the pattern generator PG by transmitting an external function word 7002 to the interface IF. The program then proceeds via path P27 to block B18.

(20) In block B18 the fourth word of the last seven, actually, tape characters $50+12n+07$ and $50+12n+08$ is tested for an End of Run Allow ERA control word. If it is not, the program proceeds via path P28 back to block B14 and continues with Step 16 above. If the End of Run Allow control word is detected the program proceeds via path P29 to block B19.

(21) At block B19 the computer C rewinds the edited data tape and halts.

Although many general purpose computers and their associated tape formats are available which can be employed for computer C, the 160 computer manufactured by Control Data Corporation using an IBM tape format can conveniently be used as described above. The 160 computer is described in the following publications published by the Control Data Corporation:

Publication No. 068–A, volume 1—Description and Operation.

Publication No. 072–B, Installation.

Publication No. 025–D, Input-Output Specifications.

Publication No. 069–A, volume 2—Maintenance.

Publication No. 070–B, volume 3—Diagrams.

Publication No. 071, volume 4—Equations.

Publication No. 023–C, Programming.

Publication No. 501, OSAS Assembly System.

Publication No. 503, FORTRAN Reference.

When the 160 computer is employed, the interface IF is connected to an input-output cable of the computer according to the following table.

TABLE 4

| Pin connection of 160 computer cable: | Interface signal line |
|---|---|
| A | ICO1 |
| B | ICO2 |
| C | ICO3 |
| D | ICO4 |
| E | ICO5 |
| F | ICO6 |
| H | ICO7 |
| J | ICO8 |
| K | ICO9 |
| L | ICO10 |
| M | ICO11 |
| N | ICO12 |
| P | ------ |
| R | IR |
| S | OR |
| T | FR |
| U | MC |

*Appendix*

The AND gates used throughout the system are of the coincidence type, which may for example comprise a crystal diode network which functions to receive input signals via a plurality of input terminals and to pass an output signal when, and only when, input signals are present at each one of its input terminals.

The OR circuits used throughout the system may be crystal diode networks which function to pass a signal received at any one of its input terminals to its output terminal. Although it is not always shown that the outputs of the AND gates and the OR circuits are fed to amplifiers, it is possible that noninverting conventional direct-current amplifiers may be connected to the output of these units whenever power amplification is required. In some cases, when both the signal and its inverse are simultaneously required, it is then desirable to employ conventional paraphrase direct-current amplifiers to perform the required operation. In some instances, throughout the systems, only the inverse of signals are required. Accordingly, the amplifiers would be conventional signal inverters for inverting direct current signals.

Some of the delay units used throughout the system are conventional delay lines of the lump constant or distributed parameter type. The number within the delay line indicates the period of delay with respect to the clock pulses CP generated by the timer T. When the number within the delay line box is followed by a character E, this indicates that the period of delay is measured with respect to the pulse period of the CEC signals from the column element clock. If the number within the delay line box is followed by a character S, this indicates the period of delay measured is with respect to the IBS pulse time durations. The other delay units are delay flops which are conventional monostable multivibrators. If the delay flop has a 1 output, it immediately transmits a signal having a duration indicated by the number within the block. If the delay flop has a 0 output, it transmits the inverse of the signal for a period of time indicated by the number within the block.

The flip-flops employed throughout the system are conventional flip-flops having a set input S, a reset input R, a one's output 1 and a zero's output 0. When the flip-flop receives a signal at the set input S, it transmits a signal from its one's output 1. When the flip-flop receives a signal at its reset input R it is cleared and transmits a signal from its zero's output 0.

The counters employed throughout the system are conventional binary counters having a count input, a clear input R, a one's output 1 and a zero's output 0. Each time the counter receives a signal at its count input, it changes states. For example, if the counter is initially cleared by a signal as its clear input R, its zero's output 0 transmits a signal and its one's output 1 transmits no signal. When the first signal is received at its count input, the counter changes states wherein a signal is transmitted from its one's output 1 and no signal is transmitted from its zero's output 0. When the counter then receives another signal at its count input, it again changes stable states wherein the zero's output 0 transmits a signal and the one's output 1 also transmits a signal. For the sake of clarity throughout the disclosure, it should be noted that all of the counters and all of the flip-flops have an input, not shown, which is connected to an initial clear line so that at the start of operation all of the flip-flops and the counters are switched to their clear state; that is, all of their zero's outputs 0 are transmitting signals.

Further, since the various elements shown in the system are made up of standard components, and standard assemblies, reference may be had to "High Speed Computing Devices," by the staff of Engineering Research Associates, Inc. (McGraw-Hill Book Company, Inc., 1950); and appropriate chapters in "Computer Handbook" (McGraw-Hill, 1962) edited by Harvey D. Huskey and Granino A. Korn, and for detailed circuitry, to the example "Principles of Transistor Circuits," edited by Richard F. Shea, published by John Wiley and Sons, Inc., New York, and Chapman and Hall, Ltd., London, 1953 and 1957. In addition, other references are: For system organization and components: "Logic Design of Digital Computers," by M. Thister, Jr., (John Wiley and Sons, New York); "Arithmetic Operations in Digital Computers," by R. K. Richards (D. Van Nostrand Company, Inc., New York). For circuits and details: "Digital Computer Components and Circuits," by R. K. Richards (D. Van Nostrand Company, Inc., New York).

While only one embodiment of the invention has been shown and described in detail, it will now be obvious to those skilled in the art, many modifications and variations which do not depart from the spirit of the invention as defined in the appended claims.

What is claimed is:

1. In a system for presenting a pattern to an electromagnetic radiation sensitive medium wherein said pattern includes an area divisible into columnar regions, said area having a first visual state and an array of linear portions in said area having a second visual state, means for storing a coded representation of said pattern as a plurality of coded combinations of indicia wherein at least one of each of said coded combinations of indicia is respectively associated with one of said columnar regions, each of said coded combinations of indicia including at least a first coded group of indicia for indicating where in the associated columnar region a column segment having said second visual state begins and at least a second coded group of indicia for indicating the columnar extent of said column segment, electromagnetic radiation source means for scanning in a sequential columnar manner said electromagnetic radiation sensitive medium, means responsive to said first coded groups of indicia for energizing said electromagnetic radiation source means and means responsive to said second coded groups of indicia for de-energizing said electromagnetic radiation source means during each columnar scan.

2. In a system for presenting a line of characters to an electromagnetic radiation sensitive medium wherein each character includes an area divisible into columnar regions, said areas having a first visual state and including an array of linear portions having a second visual state, means for storing character blocks which are representations of said characters, each of said character blocks including a plurality of pattern blockettes which are coded combinations of indicia, each of the pattern blockettes of a character block corresponding respectively to one of the columnar regions of the area of the character represented by its character block, each of said pattern blockettes including at least a first coded group of indicia for indicating where in the associated columnar region a column segment having said second visual state begins and at least a second coded group of indicia for indicating the columnar extent of said column segment, electromagnetic radiation source means for scanning in a sequential columnar manner said electromagnetic radiation sensitive medium, means for sequential transferring said character blocks and the pattern blockettes thereof sequentially to said electromagnetic radiation source means, and said electromagnetic radiation source means including first means responsive during each columnar scan to said first coded group of indicia of the associated pattern blockette for energizing said electromagnetic radiation source means and second means responsive to said second coded group of indicia of the associated pattern blockette for deenergizing said electromagnetic radiation source means.

3. The system of claim 2 wherein each of said columnar regions is divisible into an equal plurality of elements, and wherein said first coded group of indica represents the number of elements from one end of the associated columnar region to one end of the associated column segment and said second coded group of indicia represents the count of the number of elements in a column segment and said electromagnetic radiation source means further includes radiative scanning means for controllably emitting electromagnetic radiation, counting means for counting said elements in each columnar region and control means first responsive to said counting means and said first coded group of indicia for energizing said radiative scanning means to emit electromagnetic radiation and second responsive to said counting means and said second coded group of indicia for deenergizing said radiative scanning means.

4. The apparatus of claim 3 wherein said radiative scanning means includes a cathode ray tube.

5. In a system for presenting a line of characters to an electromagnetic radiation sensitive medium wherein each character includes an area divisible into columnar regions, said areas having a first visual state and including an array of linear portions in said area having a second visual state, means for storing character blocks which are representations of said characters, each of said character blocks including a plurality of pattern blockettes which are coded combinations of indicia and a format blockette, each of said pattern blockettes of a character block corresponding respectively to one of the columnar regions of the area of the character represented by its character block, each of said pattern blockettes including at least a first coded group of indicia for indicating where in the associated columnar region a column segment having said second visual state begins and at least a second coded group of indicia for indicating the columnar extent of said column segment, each of said format blockettes including at least a first coded combination of indicia for indicating the number of columnar regions on one side of the associated character area which have entirely said first visual state, electromagnetic radiation source means including means for radiatively scanning in a sequential columnar manner said electromagnetic radiation sensitive medium, means for sequential transmitting said character blocks and the format and pattern blockettes thereof sequentially to said electromagnetic radiation source means, and said electromagnetic radiation source means including first means controllably responsive during each columnar scan to said first coded groups of indicia of the associated pattern blockette for energizing said radiative scanning means to emit electromagnetic radiation while scanning, second means controllably responsive to said second coded group of indicia of the associated pattern blockette for de-energizing said radiative scanning means to not radiate electromagnetic radiation while scanning and control means responsive to said format blockette for preventing the operation of said first and second means and for maintaining said radiative scanning means deenergized for the number of column scans indicated by the first coded combination of indicia in said format blockette.

6. The system of claim 5 wherein: the format blockette of each character block includes a first coded combination of indicia for indicating the number of columnar regions on one side of the associated character area which are entirely of said first visual state, a second coded combination of indicia for indicating the number of columnar regions on the other side of the associated character area which are entirely of said first visual state and a third coded combination of indicia for indicating the number of pattern blockettes in the character block; the control means of said electromagnetic radiation source means further including column scan counting means for counting the column scans of each character and means sequentially first responsive to the first coded combination of indicia of a format blockette and said counting means for preventing the operation of at least said first means for the number of column scans indicated by said first coded combination, second responsive to the third coded combination of indicia of a format blockette and said counting means for permitting the operation of said first and second means for the number of column scans indicated by said third coded combination of indicia, and thirdly responsive to the second coded combination of indicia of a format blockette and said counting means for prevention of the operation of at least said first means for the number of column scans indicated by said second coded combination of indicia.

7. The system of claim 6 wherein said radiative scanning means includes a cathode ray tube.

8. In a system for presenting at least one pattern selected from a plurality of patterns to an electromagnetic radiation sensitive medium wherein each of the patterns includes an area divisible into columnar regions, said areas having a first visual state and an array of linear portions in said areas having a second visual state, apparatus comprising means for storing pattern blocks which are representations of said patterns, each of said pattern blocks including a plurality of pattern blockettes which are coded combinations of indicia, each of said pattern blockettes of a pattern block corresponding respectively to one of the columnar regions of the area of the pattern represented by its pattern block, each of said pattern blockettes including at least a first coded group of indicia for indicating where in the associated columnar region a column segment having said second visual state begins and at least a second coded group of indicia for indicating the columnar extent of said column segment, a different pattern code associated with each pattern of said plurality of patterns, said storing means comprising a plurality of storage registers, each of said storage registers storing one of said pattern blocks, storage register selection means responsive to the receipt of pattern codes for selecting the storage register storing the pattern block associated with the received pattern code, means for transmitting to said selection means the pattern code of the pattern selected for presentation of said electromagnetic radiation sensitive medium, electromagnetic radiation source means for scanning in a sequential columnar manner said electromagnetic radiation sensitive medium, means for sequential transmitting the pattern blockettes of the pattern block stored in the selected storage register to said electromagnetic radiation source means, and said electromagnetic radiation source means including first means responsive during each columnar scan to said first coded group of indicia of the associated pattern blockette for energizing said electromagnetic radiation source means and second means responsive to said second coded group of indicia of the associated pattern blockette for deenergizing said electromagnetic radiation source means.

9. In a system for presenting characters to an electromagnetic radiation sensitive medium wherein each of said characters includes an area divisible into columnar regions, said area having a first visual state and an array of linear portions in said area having a second visual state, type font storage means for storing a plurality of type fonts wherein each type font includes a plurality of coded representations of characters of the same set, each of said coded representations including a plurality of coded combinations of indicia wherein at least one of said coded combinations of indicia is respectively associated with one of said columnar regions, each of said coded combinations of indicia including a first coded group of indicia for indicating where in the associated columnar region a column segment having said second visual state begins and a second coded group of indicia for indicating the columnar extent of said column segment, each of said coded representations having associated therewith a character code and each of said type fonts having associated therewith a type font code, a character selection means for transmitting a type font code followed by at least one character code, control means responsive to said type font code for selecting the type font from said type font storage means associated with the transmitted type font code, addressable storage means including a plurality of storage registers for receiving the coded representations of the selected type font, storage register selection means responsive to the transmitted character code for selecting the storage register containing the coded representation associated with the transmitted character code, electromagnetic radiation source means for scanning in a sequential columnar manner said electromagnetic radiation sensitive medium, means for transferring the coded representation from said selected storage register to said electromagnetic radiation source means, means included in said electromagnetic radiation source means responsive to said first coded groups of indicia for energizing said electromagnetic radiation source means and means responsive to said second coded groups of indicia for deenergizing said electromagnetic radiation source means during each column scan.

10. In a system for presenting characters to an electromagnetic radiation sensitive medium wherein each of said characters includes an area divisible into columnar regions, said area having a first visual state and an array of liner portions in said area having a second visual state, type font storage means for storing a plurality of type fonts wherein each type font includes a plurality of character blocks which are representations of characters of the same set, each of said character blocks including a plurality of pattern blockettes which are coded combinations of indicia wherein each of said pattern blockettes is respectively associated with one of said columnar regions, each of said pattern blockettes including a first coded group of indicia for indicating where in the associated columnar region a column segment having said second visual state begins and a second coded group of indicia for indicating the columnar extent of said column segment, each of said character blocks further including a format blockette for indicating the number of columnar regions at least on one side of the character area that has completely said first visual state, each of said character blocks having associated therewith a character code and each of said type fonts having associated therewith a type font code, a character selection means for transmitting a type font code followed by at least one character code, control means responsive to said type font code for selecting the type font from said type font storage means associated with the transmitted type font code, addressable storage means including a plurality of storage registers for receiving the character blocks of the selected type font, each of said storage registers receiving one of said character blocks, storage register selection means responsive to the transmitted character code for selecting the storage register containing the character block associated with the transmitted character code, electromagnetic radiation source means for scanning in a sequential columnar manner said electromagnetic radiation sensitive medium, means for transferring the character block from said selected storage register to said electromagnetic radiation source means, means responsive to said first coded groups of indicia for energizing said electromagnetic radiation source means and means responsive to said second coded groups of indicia for de-energizing said electromagnetic radiation source means during each column scan, and means responsive to said format blockette for maintaining said electromagnetic radiation source means deenergized during the number of column scans equal to the number of columnar regions indicated by said format blockette.

11. In a system for presenting a pattern to an electromagnetic radiation sensitive medium wherein said pattern includes an area divisible into columnar regions, said area having a first visual state and an array of linear portions in said area having a second visual state, means for storing a coded representation of said pattern as a plurality of coded combinations of indicia wherein at least one of each of said coded combinations of indicia is respectively associated with one of said columnar regions, each of said coded combinations of indicia including at least a first coded group of indicia for indicating where in the associated columnar region a column segment having said second visual state begins and at least a second coded group of indicia for indicating where in said associated columnar region said column segment ends, electromagnetic radiation source means for scanning in a sequential columnar manner said electromagnetic radiation sensitive medium, means responsive to said first coded groups of indicia for energizing said electromagnetic radiation source means and means responsive to said second coded groups of indicia for deenergizing said electromagnetic radiation source means during each columnar scan.

12. In a system for presenting a line of characters to an electromagnetic radiation sensitive medium wherein each character includes an area divisible into columnar regions, said areas having a first visual state and including an array of linear portions having a second visual state, means for storing character blocks which are representations of said characters, each of said character blocks including a plurality of pattern blockettes which are coded combinations of indicia, each of the pattern blockettes of a character block corresponding respectively to one of the columnar regions of the area of the character represented by its character block, each of said pattern blockettes including at least a first coded group of indicia for indicating where in the associated columnar region a column segment having said second visual state begins and at least a second coded group of indicia for indicating where in said associated columnar region said column segment ends, electromagnetic radiation source means for scanning in a sequential columnar manner said electromagnetic radiation sensitive medium, means for sequential transferring said character blocks and the pattern blockettes thereof sequentially to said electromagnetic radiation source means, and said electromagnetic radiation source means including first means responsive during each columnar scan to said first coded group of indicia of the associated pattern blockette for energizing said electromagnetic radiation source means and second means responsive to said second coded group of indicia of the associated pattern blockette for deenergizing said electromagnetic radiation source means.

13. The system of claim 12 wherein each of said columnar regions is divisible into an equal plurality of elements, and wherein said first coded group of indicia represents the number of elements from one end of the associated columnar region to one end of the associated column segment and said second coded group is associated with the number of elements to the other end of said column segment, and said electromagnetic radiation source means further includes radiative scanning means for controllably emitting electromagnetic radiation, counting means for counting said elements in each columnar region and control means first responsive to said counting means and said first coded group of indicia for energizing said radiative scanning means to emit electromagnetic radiation and second responsive to said counting means and said second coded group of indicia for deenergizing said radiative scanning means.

14. In a system for presenting a line of characters to an electromagnetic radiation sensitive medium wherein each character includes an area divisible into columnar regions, said areas having a first visual state and including an array of linear portions in said area having a second visual state, means for storing character blocks which are representations of said characters, each of said character blocks including a plurality of pattern blockettes which are coded combinations of indicia and a format blockette, each of said pattern blockettes of a character block corresponding respectively to one of the columnar regions of the area of the character represented by its character block, each of said pattern blockettes including at least a first coded group of indicia for indicating where in the associated columnar region a column segment having said second visual state begins and at least a second coded group of indicia for indicating where in said associated columnar region said column segment ends, each of said format blockettes including at least a first coded combination of indicia for indicating the number of columnar regions on one side of the associated character area which have entirely said first visual state, electromagnetic radiation source means including means for radiatively scanning in a sequential columnar manner said electromagnetic radiation sensitive medium, means for sequential transmitting said character blocks and the format and pattern blockettes thereof sequentially to said electromagnetic radiation source means, and said electromagnetic radiation source means including first means controllably responsive during each columnar scan to said first coded groups of indicia of the associated pattern blockette for energizing said radiative scanning means to emit electromagnetic radiation while scanning, second means controllably responsive to said second coded group of indicia of the associated pattern blockette for denergizing said radiative scanning means to not radiate electromagnetic radiation while scanning and control means responsive to said format blockette for preventing the operation of said first and second means and for maintaining said radiative scanning means denergized for the number of column scans indicated by the first coded combination of indicia in said format blockette.

15. The system of claim 14 wherein: the format blockette of each character block includes a first coded combination of indicia for indicating the number of columnar regions on one side of the associated character area which are entirely of said first visual state, a second coded combination of indicia for indicating the number of columnar regions on the other side of the associated character area which are entirely of said first visual state and a third coded combination of indicia for indicating the number of pattern blockettes in the character block; the control means of said electromagnetic radiation source means further including column scan counting means for counting the column scans of each character and means sequentially first responsive to the first coded combination of indicia of a format blockette and said counting means for preventing the operation of at least said first means for the number of column scans indicated by said first coded combination, second responsive to the third coded combination of indicia of a format blockette and said counting means for permitting the operation of said first and second means for the number of column scans indicated by said third coded combination of indicia, and thirdly responsive to the second coded combination of indicia of a format blockette and said counting means for prevention of the operation of at least said first means for the number of column scans indicated by said second coded combination of indicia.

16. In a system for presenting at least one pattern selected from a plurality of patterns to an electromagnetic radiation sensitive medium wherein each of the patterns includes an area divisible into columnar regions, said areas having a first visual state and an array of linear portions in said areas having a second visual state, apparatus comprising means for storing pattern blocks which are representations of said patterns, each of said pattern blocks including a plurality of pattern blockettes which are coded combinations of indicia, each of said pattern blockettes of a pattern block corresponding respectively to one of the columnar regions of the area of the pattern represented by its pattern block, each of said pattern blockettes including at least a first coded group of indicia for indicating where in the associated columnar region of column segment having said second visual state begins and at least a second coded group of indicia for indicating where in said associated columnar region said column segment ends, a different pattern code associated with each pattern of said plurality of patterns, said storing means comprising a plurality of storage registers, each of said storage registers storing one of said pattern blocks, storage register selection means responsive to the receipt of pattern codes for selecting the storage register storing the pattern block associated with the received pattern code, means for transmitting to said selection means the pattern code of the pattern selected for presentation to said electromagnetic radiation sensitive medium, electromagnetic radiation source means for scanning in a sequential columnar manner said electromagnetic radiation sensitive medium, means for sequential transmitting the pattern blockettes of the pattern block stored in the selected storage register to said electromagnetic radiation source means, and said electromagnetic radiation source means including first means responsive during each columnar scan to said first coded group of indicia of the associated pattern blockette for energizing said electromagnetic radiation source means and second means responsive to said second coded group of indicia of the associated pattern blockette for deenergizing said electromagnetic radiation source means.

17. In a system for presenting characters to an electromagnetic radiation sensitive medium wherein each of said characters includes an area divisible into regions, said area having a first visual state and an array of portions in said area having a second visual state, character set storage means for storing a plurality of character sets wherein each character set includes a plurality of coded representations of different characters, each of said code representations including a plurality of coded combinations of indicia wherein at least one of said coded combinations of indicia is respectively associated with one of said regions, each of said coded combinations of indicia including at least a first coded group of indicia for indicating where in the associated region a portion having said second visual state begins and a second coded group of indicia for indicating where in said associated region said portion ends, each of said coded representations having associated therewith a character code and each of said character sets having associated therewith a character set code, a character selection means for transmitting a character set code followed by at least one character code, control means responsive to said character set code for selecting the character set from said character set storage means associated with the transmitted character set code, addressable storage means including a plurality of storage registers for receiving the coded representations of the selected character set, storage register selection means responsive to the transmitted character code for selecting the storage register containing the coded representation associated with the transmitted character code, electromagnetic radiation source means for scanning said electromagnetic radiation sensitive medium, means for transferring the coded representation from said selected storage register to said electromagnetic radiation source means, means included in said electromagnetic radiation source means responsive to said first coded groups of indicia for energizing said electromagnetic radiation source means and means responsive to said second coded groups of indicia for deenergizing said electromagnetic radiation source means during scans of said electromagnetic radiation sensitive medium.

18. In a system for presenting characters to an electromagnetic radiation sensitive medium wherein each of said characters includes an area divisible into columnar regions, said area having a first visual state and an array of linear portions in said area having a second visual state, type font storage means for storing a plurality of type fonts wherein each type font includes a plurality of coded representations of characters of the same set, each of said coded representations including a plurality of coded combinations of indicia where at least one of said coded combinations of indicia is respectively associated with one of said columnar regions, each of said coded combinations of indicia including a first coded group of indicia for indicating where in the associated columnar region a column segment having second visual state begins and a second coded group of indicia for indicating where in said associated columnar region said column segment ends, each of said coded representations having associated therewith a character code and each of said type fonts having associated therewith a type font code, a character selection means for transmitting a type font code followed by at least one character code, control means responsive to said type font code for selecting the type font from said type font storage means associated with the transmitted type font code, addressable storage means including a plurality of storage registers for receiving the coded representations of the selected type font, storage register selection means responsive to the transmitted character code for selecting the storage register containing the coded representation associated with the transmitted character code, electromagnetic radiation source means for scanning in a sequential columnar manner said electromagnetic radiation sensitive medium, means for transferring the coded representation from said selected storage register to said electromagnetic source means, means included in said electromagnetic radiation source means responsive to said first coded groups of indicia for energizing said electromagnetic radiation source means and means responsive to said second coded groups of indicia for deenergizing said electromagnetic radiation source means during each column scan.

19. In a system for presenting characters to an electromagnetic radiation sensitive medium wherein each of said characters includes an area divisible into regions, said area having a first visual state and an array of portions in said area having a second visual state, character set storage means for storing a plurality of character sets wherein each character set includes a plurality of character blocks which are representations of characters of the same set, each of said character blocks including a plurality of pattern blockettes which are coded combinations of indicia wherein each of said pattern blockettes is respectively associated with one of said regions, each of said pattern blockettes including a first coded group of indicia for indicating where in the associated region a portion having said second visual state begins and a second coded group of indicia for indicating wherein said associated region said portion ends, each of said character blocks further including a format blockette for indicating the lateral extent on at least one side of the character area that has completely said first visual state, each of said character blocks having associated therewith a character code and each of said character sets having associated therewith a character set code, a character selection means for transmitting a character set code followed by at least one character code, control means responsive to said character set code for selecting the character set from said character set storage means associated with the transmitted character set code, addressable storage means including a plurality of storage registers for receiving the character blocks of the selected character set, each of said storage registers receiving one of said character blocks, storage register selection means responsive to the transmitted character code for selecting the storage register containing the character block associated with the transmitted character code, electromagnetic radiation source means for scanning in a given manner said electromagnetic radiation sensitive medium, means for transferring the character block from said selected storage register to said electromagnetic radiation source means, means responsive to said first coded groups of indicia for energizing said electromagnetic radiation source means and means responsive to said second coded groups of indicia for deenergizing said electromagnetic radiation source means during portions of the scans, and means responsive to said format blockette for maintaining said electromagnetic radiation source means deenergized for a period of time indicated by said format blockette.

20. In a system for presenting characters to an electromagnetic radiation sensitive medium wherein each of said characters includes an area divisible into columnar regions, said area having a first visual state and an array of linear portions in said area having a second visual state, type font storage means for storing a plurality of type fonts wherein each type font includes a plurality of character blocks which are representations of characters of the same set, each of said character blocks including a plurality of pattern blockettes which are coded combinations of indicia wherein each of said pattern blockettes is respectively associated with one of said columnar regions, each of said pattern blockettes including a first coded group of indicia for indicating where in the associated columnar region a column segment having said second visual state begins and a second coded group of indicia for indicating where in said associated columnar region said column segment ends, each of said character blocks further including a format blockette for indicating the number of columnar regions at least on one side of the character area that has completely said first visual state, each of said character blocks having associated therewith a character code, a character selection means for transmitting a type font code followed by at least one character code, control means responsive to said type font code for selecting the type font from said type font storage means associated with the transmitted type font code, addressable storage means including a plurality of storage registers for receiving the character blocks of the selected type font, each of said storage registers receiving one of said character blocks, storage register selection means responsive to the transmitted character code for selecting the storage register containing the character block associated with the transmitted character code, electromagnetic radiation source means for scanning in a sequential columnar manner said electromagnetic radiation sensitive medium, means for transferring the character block from said selected storage register to said electromagnetic radiation source means, means responsive to said first coded groups of indicia for energizing said electromagnetic radiation source means and means responsive to said second coded groups of indicia for deenergizing said electromagnetic radiation source means during each column scan, and means responsive to said format blockette for maintaining said electromagnetic radiation source means deenergized during the number of column scans equal to the number of columnar regions indicated by said format blockette.

21. In a system for presenting a line of characters sequentially to an electromagnetic radiation sensitive medium wherein each character includes an area divisible into linear regions, said linear regions comprising portions having a first visual state and portions having a second visual state, means for storing character blocks which are representations of said characters, each of said character blocks including a plurality of pattern blockettes which are coded combinations of indicia, each of the pattern blockettes of a character block corresponding respectively to one of the linear regions of the area of the character represented by its character block, each of said pattern blockettes including at least a coded group of indicia for indicating the visual state of the portions of the associated linear region, electromagnetic radiation source means for scanning in a sequential linear manner said electromagnetic radiation sensitive medium, means for sequential transferring each of said character blocks, in its entirety, and the pattern blockettes thereof sequentially to said electromagnetic radiation source means, and said electromagnetic radiation source means including means responsive, during each linear scan, to said coded group of indicia of the associated pattern blockette for selectively energizing said electromagnetic radiation source means.

22. In a system for presenting a line of characters sequentially to an electromagnetic radiation sensitive medium wherein each character includes an area divisible into linear regions, said linear regions comprising portions having a first visual state and portions having a second visual state, means for storing character blocks which are representations of said characters, each of said character blocks including a plurality of pattern blockettes which are coded combinations of indicia and a format blockette, each of said pattern blockettes of a character block corresponding respectively to one of the linear regions of the area of the character represented by its character block, each of said pattern blockettes including at least a coded group of indicia for indicating the visual state of the portions of the associated linear region, each of said format blockettes including at least a first coded combination of indicia for indicating the extent of the region on one side of the associated character area which has entirely said first visual state, electromagnetic radiation source means including means for radiatively scanning in a sequential linear manner said electromagnetic radiation sensitive medium, means for sequential transmitting each of said character blocks, in its entirety, and the format and pattern blockettes thereof sequentially to said electromagnetic radiation source means, and said electromagnetic radiation source means including first means controllably responsive during each linear scan to said coded groups of indicia of the associated pattern blockette for selectively energizing said radiative scanning means to emit electromagnetic radiation while scanning, and control means responsive to said format blockette for preventing the operation of said first means and for maintaining said radiative scanning means deenergized while being moved to a region of said medium indicated by the first coded combination of indicia in said format blockette.

23. A system for presenting a line of selected characters sequentially to an electromagnetic radiation sensitive medium wherein each character includes an area divisible into linear regions, said linear regions comprising portions having a first visual state and portions having a second visual state, comprising storage means for storing character blocks which are representations of the characters, each of said character blocks including a plurality of pattern blockettes which are coded combinations of indicia, each of said pattern blockettes of a character block corresponding respectively to one of the linear regions of the area of the character represented by its character block, each of said pattern blockettes including at least a coded group of indicia for indicating the visual state of the portions of the associated linear region, a different character code associated with each different character of said plurality of characters, said storing means comprising a plurality of storage registers, each storing one of said character blocks, storage register selection means responsive to the receipt of character codes for sequentially selecting the storage registers storing the character blocks associated with the received character codes, means for sequentially transmitting to said storage register selection means character codes associated with selected characters that will be adjacent to each other on the presented line of characters, electromagnetic radiation source means for scanning in a sequential linear manner said electromagnetic radiation sensitive medium, transfer means for sequential transmitting said character blocks in their entirety and the pattern blockettes thereof sequentially selected by said storage register selection means to said electromagnetic radiations source means, and said electromagnetic radiation source means including means responsive, during each linear scan, to said coded groups of indicia of the associated pattern blockette for selectively energizing said electromagnetic radiation source means.

24. In a system for presenting characters to an electromagnetic radiation sensitive medium wherein each of said characters includes an area divisible into linear regeions, said linear regions comprising portions having a first visual state and portions having a second visual state, type font storage means for storing a plurality of type fonts wherein each type font includes a plurality of coded representations of characters of the same set, each of said coded representations including a plurality of coded combinations of indicia wherein at least one of said coded combinations of indicia is respectively associated with one of said linear regions, each of said coded combinations of indicia representing the visual states of the portions of the associated linear region, each of said coded representations having associated therewith a character code and each of said type fonts having associated therewith a type font code, a character selection means for transmitting a type font code followed by at least one character code, control means responsive to said type font code for selecting the type font from said type font storage means associated with the transmitted type font code, addressable storage means including a plurality of storage registers for receiving the coded representations of the selected type font, storage register selection means responsive to the transmitted character code for selecting the storage register storing the coded representation associated with the transmitted character code, electromagnetic radiation source means for scanning in a sequential linear manner said electromagnetic radiation sensitive medium, means for transferring the coded representation from said selected storage register to said electromagnetic radiation source means, means included in said electromagnetic radiation source means responsive to said coded groups of indicia for selectively energizing said electromagnetic radiation source means.

References Cited by the Examiner

UNITED STATES PATENTS 3,165,045 1/1965 Troll ---------------- 95—4.5

ROBERT C. BAILEY, *Primary Examiner.*

R. B. ZACHE, *Assistant Examiner.*